United States Patent
Takegami et al.

(10) Patent No.: US 7,028,502 B2
(45) Date of Patent: Apr. 18, 2006

(54) REFRIGERATION EQUIPMENT

(75) Inventors: Masaaki Takegami, Osaka (JP); Takeo Ueno, Osaka (JP); Kenji Tanimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 175 days.

(21) Appl. No.: 10/489,322

(22) PCT Filed: Jul. 2, 2003

(86) PCT No.: PCT/JP03/08445

§ 371 (c)(1),
(2), (4) Date: Mar. 11, 2004

(87) PCT Pub. No.: WO2004/005811

PCT Pub. Date: Jan. 15, 2004

(65) Prior Publication Data

US 2004/0237578 A1    Dec. 2, 2004

(30) Foreign Application Priority Data

Jul. 4, 2002  (JP) .............................. 2002-195477

(51) Int. Cl.
*F25B 13/00* (2006.01)
(52) U.S. Cl. ...................... 62/324.6; 62/175; 62/196.2; 62/228.5
(58) Field of Classification Search .................. 62/175, 62/196.2, 198, 228.5, 324.6, 335, 510, 511, 62/528
See application file for complete search history.

(56) References Cited

U.S. PATENT DOCUMENTS

| 4,209,996 | A | * | 7/1980 | Shaw ........................... 62/175 |
| 5,564,281 | A | * | 10/1996 | Calton et al. .................. 62/90 |
| 5,570,585 | A |   | 11/1996 | Vaynberg |
| 6,003,323 | A | * | 12/1999 | Sumida et al. ................ 62/175 |
| 6,131,401 | A | * | 10/2000 | Ueno et al. ................... 62/175 |
| 6,698,217 | B1 | * | 3/2004 | Tanimoto et al. ............. 62/175 |

FOREIGN PATENT DOCUMENTS

| JP | 02-027580 | B2 | 6/1990 |
| JP | 08-054157 | A | 2/1996 |
| JP | 2974381 | B2 | 9/1999 |
| JP | 2000-346478 | A | 12/2000 |
| JP | 2001-280749 | A | 10/2001 |
| JP | 2002-181406 | A | 6/2002 |

* cited by examiner

*Primary Examiner*—Melvin Jones
(74) *Attorney, Agent, or Firm*—Birch, Stewart, Kolasch & Birch, LLP

(57) ABSTRACT

In a refrigerating apparatus comprising a plurality of application-side heat exchangers (41), (45, 51) for air-conditioning and for cold-storage/freezing, it is configured so as to be capable of corresponding to various types of operation patterns when a compression mechanism (2) is configured by two compressors (2A, 2B). In order to continue operation even if one compressor is broken, a switching mechanism such as a four-way selector valve (3C) is provided on the suction side of the two compressors (2A, 2B), so that a plurality of operation patterns can be performed in a predetermined operation mode.

6 Claims, 34 Drawing Sheets

REFRIGERATION EQUIPMENT

TECHNICAL FIELD

The present invention relates to a refrigerating apparatus, and in particular, to a refrigerating apparatus which has application-side heat exchangers for a plurality of channels such as channels for cold-storage/freezing and for air-conditioning and whose compression mechanism is configured by two compressors.

BACKGROUND ART

Refrigerating apparatuses which perform a refrigerating cycle are conventionally known and widely utilized as an air-conditioning machine for performing air-cooling/heating in a room or a cooling machine such as a refrigerator for storing foods. Among the refrigerating apparatuses, there is a refrigerating apparatus which performs air-conditioning and cold-storage/freezing as disclosed in Japanese Patent Application Laid-Open (JP-A) No. 2001-280749. This type of refrigerating apparatus comprises a plurality of application-side heat exchangers, e.g., for air-conditioning channel and cold-storage/freezing channel (air-conditioning heat exchanger, cold-storage heat exchanger, freezing heat exchanger and the like), and is installed at a convenience store and the like. By installing one refrigerating apparatus, air-conditioning within a store and air-cooling for showcases can be performed.

In accordance with this type of the refrigerating apparatus, in order to widely vary the capacity of a compressor depending on operational states of the plurality of application-side heat exchangers, a compression mechanism is configured by two compressors in some cases. For example, the compression mechanism may be configured by connecting an inverter compressor for an inverter control in parallel to a non-inverter compressor for an on-off control.

It is desired in the above-described type of the refrigerating apparatus that various operation modes are realized such as an operation of only air-cooling or air-heating, an operation of only cold-storage/freezing and an operation in which air-cooling/heating is combined with cold-storage/freezing. When two compression mechanisms are simply connected in parallel, this configuration cannot sufficiently correspond to a large number of operation modes. When one compressor is dedicated to air-conditioning and the other compressor is dedicated to cold-storage/freezing, if one of the compressors is broken, operation cannot be continued. Especially when the compressor for cold-storage/freezing channel is broken, influences may exert on quality of products such as frozen foods. Thus, this becomes a more serious problem as compared to the case in which the compressor for the air-conditioning channel is broken.

Then, the applicant of the present application has suggested a technique in which in this type of the refrigerating apparatus, a compression mechanism is configured by combining three compressors, and compressors to be used for the air-conditioning side and the cold-storage/freezing side can be appropriately selected from these three compressors (e.g., Japanese Patent Application No. 2001-192702). This refrigerating apparatus is configured so that three compressors can be freely combined in accordance with various patterns and then operated, such that these three compressors are used for the cold-storage/freezing side, two compressors are used for the cold-storage/freezing side and one compressor is used for the air-conditioning side or operation is performed by one compressor, and so that even if one compressor is broken, the operation can be continued by other compressors.

Problems to be Solved

When three compressors are used, however the structure of the apparatus must be complicated, e.g., a mechanism for switching a refrigerant flow at suction and discharge sides of pipes is required. If the switching mechanism is complicated, control thereof is also complicated. For this reason, especially when a relatively compact system is considered in a refrigerating apparatus which performs air-cooling/heating and cold-storage/freezing, desirably, while the structure is simplified by configuring a compression mechanism with two compressors, operation patterns are increased.

The present invention was developed in view of such points of view and an object of the present invention is to, in a refrigerating apparatus comprising a plurality of application-side heat exchangers for air-conditioning and for cold-storage/freezing, increase operation patterns when a compression mechanism is configured by two compressors and thus to continue operation even if one of the compressors is broken.

DISCLOSURE OF INVENTION

In accordance with the present invention, operation patterns can be increased by providing a switching mechanism such as a four-way selector valve (3C) or open/close valve (23) at the suction side of two compressors (2A, 2B).

In accordance with a first and second inventions, it is presupposed to provide a refrigerating apparatus in which expansion mechanisms (46, 52) and application-side heat exchangers (45, 51) in a first channel and an expansion mechanism (42) and an application-side heat exchanger (41) in a second channel are connected in parallel to a compression mechanism (2) and a heat-source side heat exchanger (4), the compression mechanism (2) is configured by a first compressor (2A) and a second compressor (2B) and a plurality of operation modes obtained by combining air-cooling/heating and cold-storage/freezing can be set.

In accordance with the first invention, it is characterized in that the compression mechanism (2) is configured so as to be capable of being switched between at least two operation patterns, in a predetermined operation mode, among a first pattern of driving both of the first compressor (2A) and the second compressor (2B), a second pattern of driving only the first compressor (2A) and a third pattern of driving only the second compressor (2B).

In accordance with the second invention, it is characterized in that the compression mechanism (2) is configured so as to be capable of being switched between a first pattern of driving both of the first compressor (2A) and the second compressor (2B), a second pattern of driving only the first compressor (2A) and a third pattern of driving only the second compressor (2B) in a predetermined operation mode.

In the first and second inventions, switching between the operation pattern of using two compressors (2A, 2B) and the operation pattern of using one of the two compressors (2A, 2B) is possible in any of a plurality of operation modes. For this reason, when the first compressor (2A) is broken, operation can be continued by using the second compressor (2B). When the second compressor (2B) is broken adversely, the operation can be continued by using the first compressor (2A).

Next, in accordance with third to sixth inventions, a refrigerant circuit relating to the first and second inventions is specified.

In these inventions, it is presupposed to provide a refrigerating apparatus in which expansion mechanisms (46, 52) and application-side heat exchangers (45, 51) in a first channel and an expansion mechanism (42) and an application-side heat exchanger (41) in a second channel are connected in parallel to a compression mechanism (2) and a heat-source side heat exchanger (4), and the compression mechanism (2) is configured by a first compressor (2A) and a second compressor (2B).

In accordance with the third invention, as shown in FIG. 1, discharge pipes (5a, 5b) of the compressors (2A, 2B) are connected in parallel to a high-pressure gas pipe (8), and the high-pressure gas pipe (8) is connected via directional selector valves (3A, 3B) to high-pressure gas lines (9, 17) in the first and second channels. A four-way selector valve (3C) which is configured so as to be capable of being switched between a first state in which a first port (P1) communicates with a fourth port (P4) and a second port (P2) communicates with a third port (P3) and a second state in which the first port (P1) communicates with the second port (P2) and the third port (P3) communicates with the fourth port (P4) is provided on the suction side of the compression mechanism (2). A low-pressure gas line (15) in the first channel connected to a suction pipe (6a) for the first compressor (2A) is connected to the first port (P1) for the four-way selector valve (3C). A suction pipe (6b) for the second compressor (2B) is connected to the second port (P2). Low-pressure gas lines (17, 9) in the second channel are connected via the directional selector valves (3A, 3B) to the third port (P3). A high-pressure side pipe (28a) for a refrigerant circuit (1E) is connected to the fourth port (P4).

In accordance with the third invention, various operation modes shown in FIGS. 2 through 14 can be performed by appropriately switching the directional switching valves (3A, 3B). Further, by appropriately switching the four-way selector valve (3C) in an operation mode, combinations of the compressors (2A, 2B) to be used can be changed. Namely, an operation pattern of driving only the first compressor (2A), an operation pattern of driving only the second compressor (2B) or an operation pattern of driving both of the compressors (2A, 2B) can be performed. Thus, when the first compressor (2A) is broken, operation can be continued by using the second compressor (2B). When the second compressor (2B) is broken adversely, the operation can be continued by using the first compressor (2A).

In accordance with the fourth invention, as shown in FIG. 15, discharge pipes (5a, 5b) for the compressors (2A, 2B) are connected in parallel to a high-pressure gas pipe (8), and the high-pressure gas pipe (8) is connected via directional selector valves (3A, 3B) to high-pressure gas lines (9, 17) in the first and second channels. A suction pipe (6a) for the first compressor (2A) is connected to a low-pressure gas line (15) in the first channel, and a suction pipe (6b) for the second compressor (2B) is connected via the directional selector valves (3A, 3B) to low-pressure gas lines (17, 9) in the second channel. The suction pipes (6a, 6b) for the compressors (2A, 2B) are connected with each other by a first communication pipe (22a) and a second communication pipe (22b) provided in parallel. The first communication pipe (22a) is provided with a check valve (7) for allowing only a refrigerant flow from the first compressor (2A) side toward the second compressor (2B) side. The second communication pipe (22b) is provided with a check valve (7) for allowing only a refrigerant flow from the second compressor (2B) side toward the first compressor (2A) side and an open/close valve (23) for opening/closing the second communication pipe (22b).

In accordance with the fourth invention, by appropriately switching the directional selector valves (3A, 3B), various operation modes as shown in FIGS. 16 through 34 can be performed. By appropriately switching the open/close valve (23) in an operation mode, combinations of the compressors (2A, 2B) to be used can be changed. Namely, an operation pattern of driving only the first compressor (2A), an operation pattern of driving only the second compressor (2B) or an operation pattern of driving both of the compressors (2A, 2B) can be performed. Thus, when the first compressor (2A) is broken, operation can be continued by using the second compressor (2B). When the second compressor (2B) is broken adversely, the operation can be continued by using the first compressor (2A).

In accordance with the fifth invention, in the refrigerating apparatus of the third or fourth invention, the application-side heat exchangers (45, 51) in the first channel are configured by cooling heat exchangers used for cold-storage/freezing, and the application-side heat exchanger (41) in the second channel is configured by an air-conditioning heat exchanger used for air-conditioning.

Because of such structure, in an apparatus that performs air-conditioning in a first channel and cold-storage/freezing in a second channel, when the second compressor (2B) is broken, operation can be continued by the first compressor.

Further, in accordance with the sixth invention, in the refrigerating apparatus of the third or fourth invention, the first four-way selector valve (3A) and the second four-way selector valve (3B) are comprised as the directional selector valves (3A, 3B). The discharge pipes (5a, 5b) for the first compressor (2A) and the second compressor (2B) are joined and the joined pipe is connected via the first four-way selector valve (3A) to the heat-source side heat exchanger (4) and the application-side heat exchanger (41) in the second channel so as to be switchable therebetween, and the suction pipes (6a, 6b) for the compression mechanism (2) are connected via the first four-way selector valve (3A) and the second four-way selector valve (3B) to the application-side heat exchanger (41) in the second channel and the heat-source side heat exchanger (4) so as to be switchable therebetween.

Because of such structure, a direction that a refrigerant circulates may be reversible in the second channel. Thus, when the second channel is used as the air-conditioning channel, air-cooling/heating can be performed.

Effects

In accordance with the first invention, the compression mechanism can be switched between at least two operation patterns among the first pattern of driving both the first compressor (2A) and the second compressor (2B), the second pattern of driving only the first compressor (2A) and the third pattern of driving only the second compressor (2B). In accordance with the second invention, switching between these three operation patterns can be performed. Thus, if the first compressor (2A) is broken, operation can be continued by using the second compressor (2B). If the second compressor (2B) is broken adversely, the operation can be continued by using the first compressor (2A).

In accordance with the third invention with its structure being shown in FIG. 1, as shown in FIGS. 2 through 14, for example, seven kinds of operation modes can be performed. In a predetermined operation mode, either one of two compressors (2A, 2B) may be used or both of the two compressors may be used. Various operations can be performed, and thus even if one of the two compressors (2A, 2B) is broken, the operation can be continued.

In the compression mechanism formed of two compressors (2A, 2B), even if one of the compressors (2A, 2B) is broken, the operation can be continued by using another one. Thus, the structure and control can be simplified as compared to the case of using three compressors.

In the third invention, when the first channel serves as a cold-storage/freezing channel and the second channel serves as an air-conditioning channel as in the fifth invention, especially in the case of the operation of the cold-storage/freezing channel, either of two compressors (2A, 2B) may be used or two compressors may be used. Accordingly, various operations can be performed in the cold-storage/freezing channel in which stop of the operation presents problems as compared to the case of the air-conditioning channel. Thus, even if one of the two compressors (2A, 2B) is broken during the cold-storage/freezing operation, the operation can be securely continued.

In accordance with the fourth invention, as shown in FIGS. 16 through 34, for example, seven kinds of operation modes can be performed, and various operations can be realized as compared to the third invention. Accordingly, even if one of the two compressors (2A, 2B) is broken, the operation can be continued even further securely.

In the fourth invention, when the first channel serves as a cold-storage/freezing channel and the second channel serves as an air-conditioning channel as in the fifth invention, during the operation of the air-conditioning channel as well as the operation of the cold-storage/freezing channel, even if one of the two compressors (2A, 2B) is broken, the operation can be securely continued.

BEST MODE FOR CARRYING OUT THE INVENTION

[First Embodiment]

A first embodiment of the present invention will be described in detail hereinafter based on the drawings.

Figure 1:
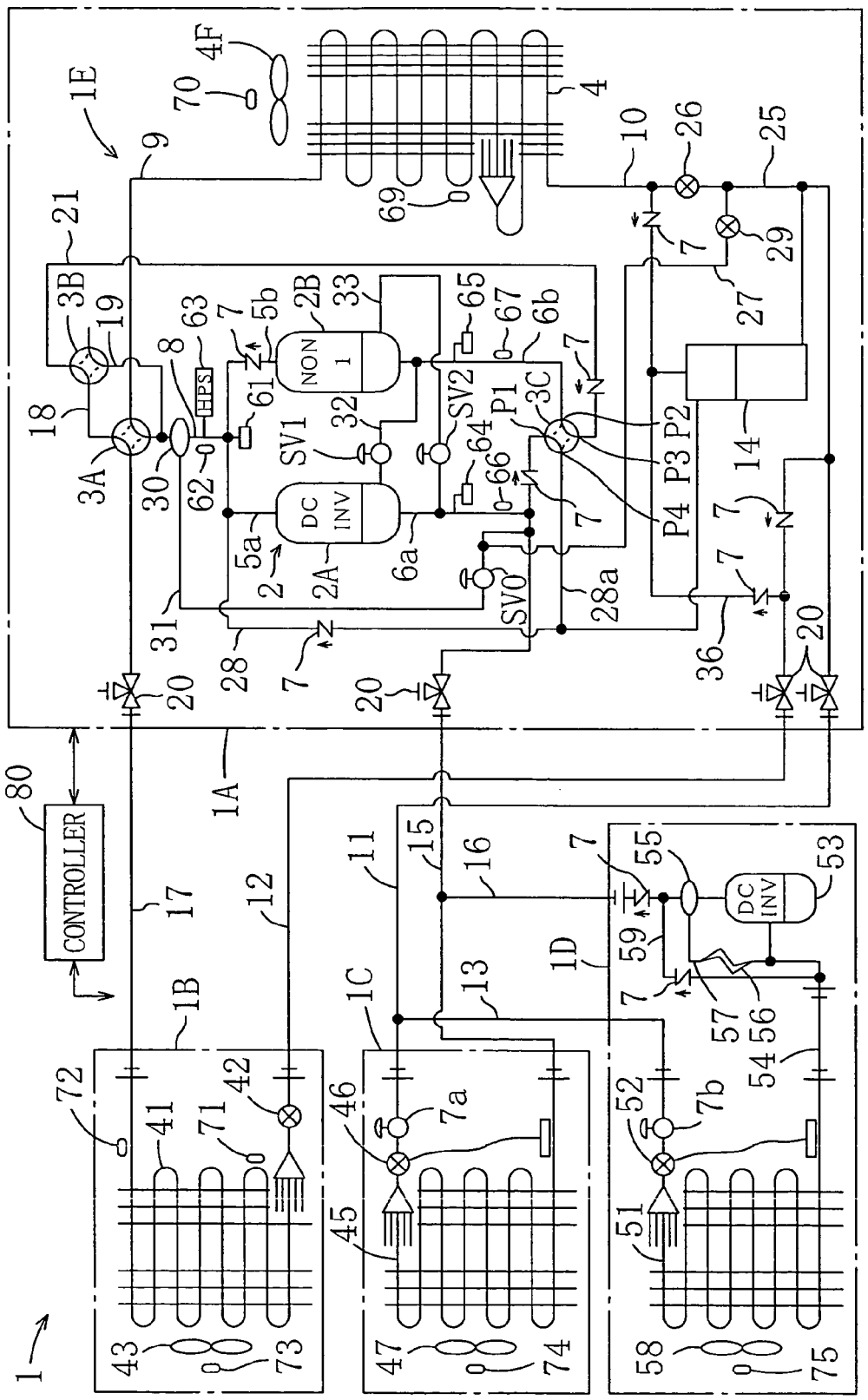
FIG. 1 is a refrigerant circuit diagram of a refrigerating apparatus according to a first embodiment of the present invention.

FIG. 1 is a refrigerant circuit diagram of a refrigerating apparatus (1) according to the first embodiment. This refrigerating apparatus (1) is installed at convenience stores and is used to perform cooling of cold-storage showcases and freezing showcases and air-cooling/heating in the stores.

The refrigerating apparatus (1) has an outdoor unit (1A), an indoor unit (1B), a cold-storage unit (1C) and a freezing unit (1D), and comprises a refrigerant circuit (1E) performing a vapor-compression refrigerating cycle. The refrigerant circuit (1E) is provided with a first channel side circuit for cold-storage/freezing and a second channel side circuit for air conditioning in parallel. The refrigerant circuit (1E) is configured so as to be capable of switching the second channel for air conditioning between an air-cooling cycle and an air-heating cycle.

The indoor unit (1B) is installed at, e.g., salesrooms and is configured to perform an air-cooling operation or air-heating operation. The cold-storage unit (1C) is installed at cold-storage showcases to cool air within the showcases. The freezing unit (1D) is installed at freezing showcases to cool air within the showcases. Although only one indoor unit (1B), one cold-storage unit (1C) and one freezing unit (1D) are illustrated in the figure, the number of units (1B, 1C, 1D) installed may be appropriately changed. In the case of a compact system for convenience stores, for example, one indoor unit (1B), three cold-storage units (1C) and one freezing unit (1D) are connected.

<Outdoor Unit>

The outdoor unit (1A) comprises a compression mechanism (2) in which two compressors (2A, 2B) are connected in parallel. Further, the outdoor unit (1A) comprises a first four-way selector valve (directional selector valve) (3A), a second four-way selector valve (directional selector valve) (3B), a third four-way selector valve (3C) and an outdoor heat exchanger (4) serving as a heat-source side heat exchanger.

The compression mechanism (2) is configured by an inverter compressor (2A) serving as the first compressor and a non-inverter compressor (2B) serving as the second compressor. The inverter compressor (2A) is configured by a high-pressure dome type scroll compressor that the interior of a dome has high pressures during the operation of the compressor. The non-inverter compressor (2B) is configured by a low-pressure dome type scroll compressor that the interior of a dome has low pressures during the operation of the compressor. The inverter compressor (2A) is a compressor having a variable capacity in which an electric motor is controlled by an inverter such that the capacity is varied stepwise or continuously. The non-inverter compressor (2B) is a compressor having a constant capacity in which an electric motor is rotated at certain revolutions.

Discharge pipes (5a, 5b) for the above-described inverter compressor (2A) and non-inverter compressor (2B) are connected to a high-pressure gas pipe (discharge pipe) (8), and the high-pressure gas pipe (8) is connected to a port of the first four-way selector valve (3A). The discharge pipe (5b) for the non-inverter compressor (2B) is provided with a check valve (7) for preventing a reverse flow of a refrigerant.

A gas side end portion of the outdoor heat exchanger (4) is connected to a port of the first four-way selector valve (3A) by an outdoor gas pipe (9) serving as a low-pressure gas line in the second channel at the time of air-heating, a high-pressure gas line in the second channel at the time of air-cooling or a high-pressure gas line in the first channel. Connected to a liquid side end portion of the outdoor heat exchanger (4) is one end of a liquid pipe (10) serving as a liquid line. A receiver (14) is provided in the half-way of the liquid pipe (10). The other end of the liquid pipe (10) is branched into a first communication liquid pipe (11) and a second communication liquid pipe (12).

The outdoor heat exchanger (4) is, e.g., a fin-and-tube heat exchanger of cross-fin type, and an outdoor fan (4F) serving as a heat source fan is disposed so as to be adjacent to the exchanger (4).

Connected to a port for the first four-way selector valve (3A) is a communication gas pipe (17) serving as a high-pressure gas line in the second channel at the time of air-heating, a low-pressure gas line in the second channel at the time of air-cooling or a high-pressure gas line in the first channel. A port for the first four-way selector valve (3A) is connected to a port for the second four-way selector valve (3B) by a first connecting pipe (18).

A port for the second four-way selector valve (3B) is connected to the high-pressure pipe (8) by an auxiliary gas pipe (19). A port for the second four-way selector valve (3B) is connected to a port (third port (P3)) of the third four-way selector valve (3C) by a second connecting pipe (21). A port for the second four-way selector valve (3B) is configured as a closed port. Namely, the second four-way selector valve (3B) may be a three-way selector valve.

The first four-way selector valve (3A) is configured so as to be switched between a first state (see the solid lines in FIG. 1) in which the high-pressure gas pipe (8) communicates with the outdoor gas pipe (9) and the first connecting pipe (18) communicates with the communication gas pipe (17) and a second state (see the broken lines in FIG. 1) in which the high-pressure gas pipe (8) communicates with the communication gas pipe (17) and the first connecting pipe (18) communicates with the outdoor gas pipe (9).

The second four-way selector valve (3B) is configured so as to be switched between a first state (see the solid lines in FIG. 1) in which the auxiliary gas pipe (19) communicates with the closed port and the first connecting pipe (18) communicates with the second connecting pipe (21) and a second state (see the broken lines in FIG. 1) in which the auxiliary gas pipe (19) communicates with the first connecting pipe (18) and the closed port communicates with the second connecting pipe (21).

A suction pipe (6a) for the inverter compressor (2A) is connected to the low-pressure gas pipe (15) serving as a low-pressure gas line for a first channel side circuit. The low-pressure gas pipe (15) is connected to a first port (P1) for the third four-way selector valve (3C). The low-pressure gas pipe (15) is provided with the check valve (7) allowing only a refrigerant flow toward the third four-way selector valve (3C) between a connecting point with the suction pipe (6a) and the first port (P1).

A suction pipe (6b) for the non-inverter compressor (2B) is connected to a second port (P2) for the third four-way selector valve (3C). Connected to the third port (P3) for the third four-way selector valve (3C) is the second connecting pipe (21) via the check valve (7) allowing only a refrigerant flow toward the third four-way selector valve (3C). Further, connected to a fourth port (P4) for the third four-way selector valve (3C) is, as described later, a branch pipe (28a) branched from a gas vent pipe (28) from the receiver (14).

The third four-way selector valve (3C) is configured so as to be switched between a first state (see the solid lines in the figure) in which the first port (P1) communicates with the fourth port (P4) and the second port (P2) communicates with the third port (P3) and a second state (see the broken lines in the figure) in which the first port (P1) communicates with the second port (P2) and the third port (P3) communicates with the fourth port (P4).

The first communication liquid pipe (11), the second communication liquid pipe (12), the communication gas pipe (17) and the low-pressure gas pipe (15) are extended outside from the outdoor unit (1A). Stop valves (20) are provided within the outdoor unit (1A) so as to correspond to such pipes. The second communication liquid pipe (12) is provided with the check valve (7) at its branch side end portion from the liquid pipe (10), and the check valve (7) is configured so that a refrigerant flows from the receiver (14) toward the stop valve (20).

An auxiliary liquid pipe (25) for bypassing the receiver (14) is connected to the liquid pipe (10). A refrigerant flows in the auxiliary liquid pipe (25) mainly at the time of air-heating. The auxiliary liquid pipe (25) is provided with an outdoor expansion valve (26) serving as an expansion mechanism. The check valve (7) allowing only a refrigerant flow toward the receiver (14) is provided between the outdoor heat exchanger (4) and the receiver (14) on the liquid pipe (10). The check valve (7) is placed between a connecting point with the auxiliary liquid pipe (25) and the receiver (14) on the liquid pipe (10).

The liquid pipe (10) is branched into a branch liquid pipe (36) between the check valve (7) and the receiver (14). The branch liquid pipe (36) is connected between the stop valve (20) and the check valve (7) on the second liquid pipe (12). The branch liquid pipe (36) is provided with the check valve (7) allowing only a refrigerant flow from the second liquid pipe (12) toward the receiver (14).

A liquid injection pipe (27) is connected between the auxiliary liquid pipe (25) and the low-pressure gas pipe (15). The liquid injection pipe (27) is provided with an electronic expansion valve (29) for adjusting a flow rate of refrigerant at the time of performing liquid injection. The gas vent pipe (28) is connected between the upper portion of the receiver (14) and the discharge pipe (5a) for the inverter compressor (2A). The gas vent pipe (28) is provided with the check valve (7) allowing only a refrigerant flow from the receiver (14) toward the discharge pipe (5a). As described above, the branch pipe (28a) from the gas vent pipe (28) is connected to the fourth port (P4) of the third four-way selector valve (3C).

An oil separator (30) is provided at the high-pressure gas pipe (8). One end of an oil return pipe (31) is connected to the oil separator (30). The oil return pipe (31) joins the liquid injection pipe (27) at its other end and is connected, together with the liquid injection pipe (27), to the low-pressure gas pipe (15). A solenoid valve (SV0) is provided at the oil return pipe (31) between a connecting point with the liquid injection pipe (27) and the oil separator (30).

A first oil-level equalizing pipe (32) is connected between the dome (oil pool) of the inverter compressor (2A) and the suction pipe (6b) for the non-inverter compressor (2B). A second oil-level equalizing pipe (33) is connected between the dome of the non-inverter compressor (2B) and the suction pipe (6a) for the inverter compressor (2A). The first oil-level equalizing pipe (32) and the second oil-level equalizing pipe (33) are respectively provided with solenoid valves (SV1, SV2) as open/close mechanisms.

In accordance with the first embodiment, by appropriately opening/closing these solenoid valves (SV1, SV2, SV3) in a plurality of operation modes, oil is returned from the oil separator (30) and oil-level equalization is performed between the compressors (2A, 2B).

<Indoor Unit>

The indoor unit (1B) includes an indoor heat exchanger (air-conditioning heat exchanger) (41) serving as an application-side heat exchanger and an indoor expansion valve (42) serving as an expansion mechanism. The gas side of the indoor heat exchanger (41) is connected to the communication gas pipe (17). The liquid side of the indoor heat exchanger (41) is connected via the indoor expansion valve (42) to the second communication liquid pipe (12).

The indoor heat exchanger (41) is, e.g., a fin-and-tube heat exchanger of cross-fin type. An indoor fan (43) serving as an application-side fan is disposed so as to be adjacent to the indoor heat exchanger (41). The indoor expansion valve (42) is configured by an electronic expansion valve.

<Cold-Storage Unit>

The cold-storage unit (1C) includes a cold-storage heat exchanger (45) serving as a cooling heat exchanger (evaporator) and a cold-storage expansion valve (46) serving as an expansion mechanism. The liquid side of the cold-storage heat exchanger (45) is connected via the cold-storage expansion valve (46) and a solenoid valve (7a) to the first communication liquid pipe (11). Namely, the cold-storage expansion valve (46) and the solenoid valve (7a) serving as an open/close valve are provided at the upstream side of the cold-storage heat exchanger (45). The solenoid valve (7a) is used for a thermo-off operation. The gas side of the cold-storage heat exchanger (45) is connected to the low-pressure gas pipe (15).

A refrigerant pressure (evaporation pressure) of the cold-storage heat exchanger (45) is lower than that of the indoor heat exchanger (41). As a result, a refrigerant evaporation temperature of the cold-storage heat exchanger (45) is, e.g., −10° C., and the refrigerant evaporation temperature of the indoor heat exchanger (41) is, e.g., +5° C. The refrigerant circuit (1E) structures a circuit for performing evaporation at different temperatures.

The cold-storage expansion valve (46) is a temperature-sensitive expansion valve and a temperature sensing bulb is mounted to the gas side of the cold-storage heat exchanger (45). The opening of the cold-storage expansion valve (46) is adjusted on a basis of a refrigerant temperature at the exit side of the cold-storage heat exchanger (45). The cold-storage heat exchanger (45) is, e.g., a fin-and-tube heat exchanger of cross-fin type. A cold-storage fan (47) serving as a cooling fan is disposed so as to be adjacent to the cold-storage heat exchanger (45).

<Freezing Unit>

The freezing unit (1D) includes a freezing heat exchanger (51) serving as a cooling heat exchanger, a freezing expansion valve (52) serving as an expansion mechanism and a booster compressor (53) serving as a freezing compressor. Connected to the liquid side of the freezing heat exchanger (51) is a branch liquid pipe (13) branched from the first communication liquid pipe (11) via a solenoid valve (7b) and the freezing expansion valve (52).

The gas side of the freezing heat exchanger (51) is connected to the suction side of the booster compressor (53)

by a connecting gas pipe (54). A branch gas pipe (16) branched from the low-pressure gas pipe (15) is connected to the discharge side of the booster compressor (53). The branch gas pipe (16) is provided with the check valve (7) and an oil separator (55). An oil return pipe (57) having a capillary tube (56) is connected between the oil separator (55) and the connecting gas pipe (54).

The booster compressor (53) compresses a refrigerant by two steps with the compression mechanism (2) so that the refrigerant evaporation temperature of the freezing heat exchanger (51) is lower than that of the cold-storage heat exchanger (45). The refrigerant evaporation temperature of the freezing heat exchanger (51) is set to be, e.g., −40° C.

The freezing expansion valve (52) is a temperature-sensitive expansion valve and a temperature sensing bulb is mounted to the gas side of the freezing heat exchanger (51). The freezing heat exchanger (51) is, e.g., a fin-and-tube heat exchanger of cross-fin type. A freezing fan (58) serving as a cooling fan is disposed so as to be adjacent to the freezing heat exchanger (51).

A bypass pipe (59) having the check valve (7) is connected between the connecting gas pipe (54) at the suction side of the booster compressor (53) and the upstream side of the check valve (7) on the branch gas pipe (16) at the discharge side of the booster compressor (53). The bypass pipe (59) is configured so as to bypass the booster compressor (53) to enable flowing of a refrigerant when the booster compressor (53) is stopped because of failures.

<Control channel>

The refrigerant circuit (1E) is provided with various sensors and switches. The high-pressure gas pipe (8) in the outdoor unit (1A) is provided with a high-level pressure sensor (61) serving as pressure detection means for detecting a high refrigerant pressure, a discharge temperature sensor (62) serving as temperature detection means for detecting a high-pressure refrigerant temperature and a pressure switch (63) which is opened when the high-level refrigerant pressure reaches a predetermined value.

The suction pipes (6a, 6b) of the inverter compressor (2A) and the non-inverter compressor (2B) are respectively provided with low-pressure sensors (64, 65) serving as pressure detection means for detecting a low-level refrigerant pressure and suction temperature sensors (66, 67) serving as temperature detection means for detecting a low-pressure refrigerant temperature.

The outdoor heat exchanger (4) is provided with an outdoor heat exchanger sensor (69) serving as temperature detection means for detecting an evaporation temperature or condensation temperature which is a refrigerant temperature in the outdoor heat exchanger (4). The outdoor unit (1A) is provided with an outside air temperature sensor (70) serving as temperature detection means for detecting an outdoor air temperature.

The indoor heat exchanger (41) is provided with an indoor heat exchanger sensor (71) serving as temperature detection means for detecting an evaporation temperature or condensation temperature which is a refrigerant temperature in the indoor heat exchanger (41). Further, a gas temperature sensor (72) serving as temperature detection means for detecting a gas refrigerant temperature is provided at the gas side of the indoor heat exchanger (41). Moreover, the indoor unit (1B) is provided with a room temperature sensor (73) serving as temperature detection means for detecting an indoor air temperature.

A cold-storage temperature sensor (74) serving as temperature detection means for detecting a temperature within cold-storage showcases is provided in the cold-storage unit (1C). A freezing temperature sensor (75) serving as temperature detection means for detecting a temperature within freezing showcases is provided in the freezing unit (1D).

Output signals from various sensors and switches are inputted to a controller (80). This controller (80) is configured so as to control the operation of the refrigerant circuit (1E) and to perform control by switching seven kinds of operation modes to be described later. The controller (80) controls, at the time of operation, start, stop and capacity control for the inverter compressor (2A), start and stop for the non-inverter compressor (2B) and opening adjustment for the outdoor expansion valve (26) and the indoor expansion valve (42). Further, the controller (80) performs switching of the four-way selector valves (3A, 3B) and open/close operations for the solenoid valves (SV0, SV1, SV2) of the oil return pipe (31) and the oil-level equalizing pipes (32, 33) and the electronic expansion valve (29) of the liquid injection pipe (27). Moreover, the controller (80) controls the solenoid valve (7a) in the cold-storage unit (1C) and the solenoid valve (7b) in the freezing unit (1D) to be closed at the time of thermo-off.

Operation

Next, operations performed by the above-described refrigerating apparatus (1) will be described.

In accordance with the first embodiment, it is configured so as to be capable of setting seven kinds of operation modes as follows. Specifically, it is configured so as to be capable of performing ① air-cooling operation of performing only cooling in the indoor unit (1B), ② air-cooling/freezing operation of simultaneously performing air-cooling in the indoor unit (1B) and cooling in the cold-storage unit (1C) and the freezing unit (1D), ③ freezing operation of performing only cooling in the cold-storage unit (1C) and the freezing unit (1D), ④ air-heating operation of performing only air-heating in the indoor unit (1B), ⑤ first air-heating/freezing operation of performing air-heating in the indoor unit (1B) and cooling in the cold-storage unit (1C) and the freezing unit (1D) by 100% of recovered heat without using the outdoor heat exchanger (4), ⑥ second air-heating/freezing operation performed when an air-heating ability of the indoor unit (1B) remains at the time of the first air-heating/freezing operation and ⑦ third air-heating/freezing operation performed when the air-heating ability of the indoor unit (1B) is insufficient at the time of the first air-heating/freezing operation.

These operation modes can be carried out by at least either of the compressors. In particular, among these operation modes, for ③ freezing operation, ⑤ first air-heating/freezing operation and ⑥ second air heating/freezing operation, either of the compressors (2A, 2B) may be used, or both of them may be used.

The respective operation modes will be described specifically.

<① Air-Cooling Operation>

The air-cooling operation is an operation of performing only air-cooling in the indoor unit (1B). At the time of the air-cooling operation, as shown in FIG. 2, only the non-inverter compressor (2B) is driven and the inverter compressor (2A) is stopped.

Figure 2:
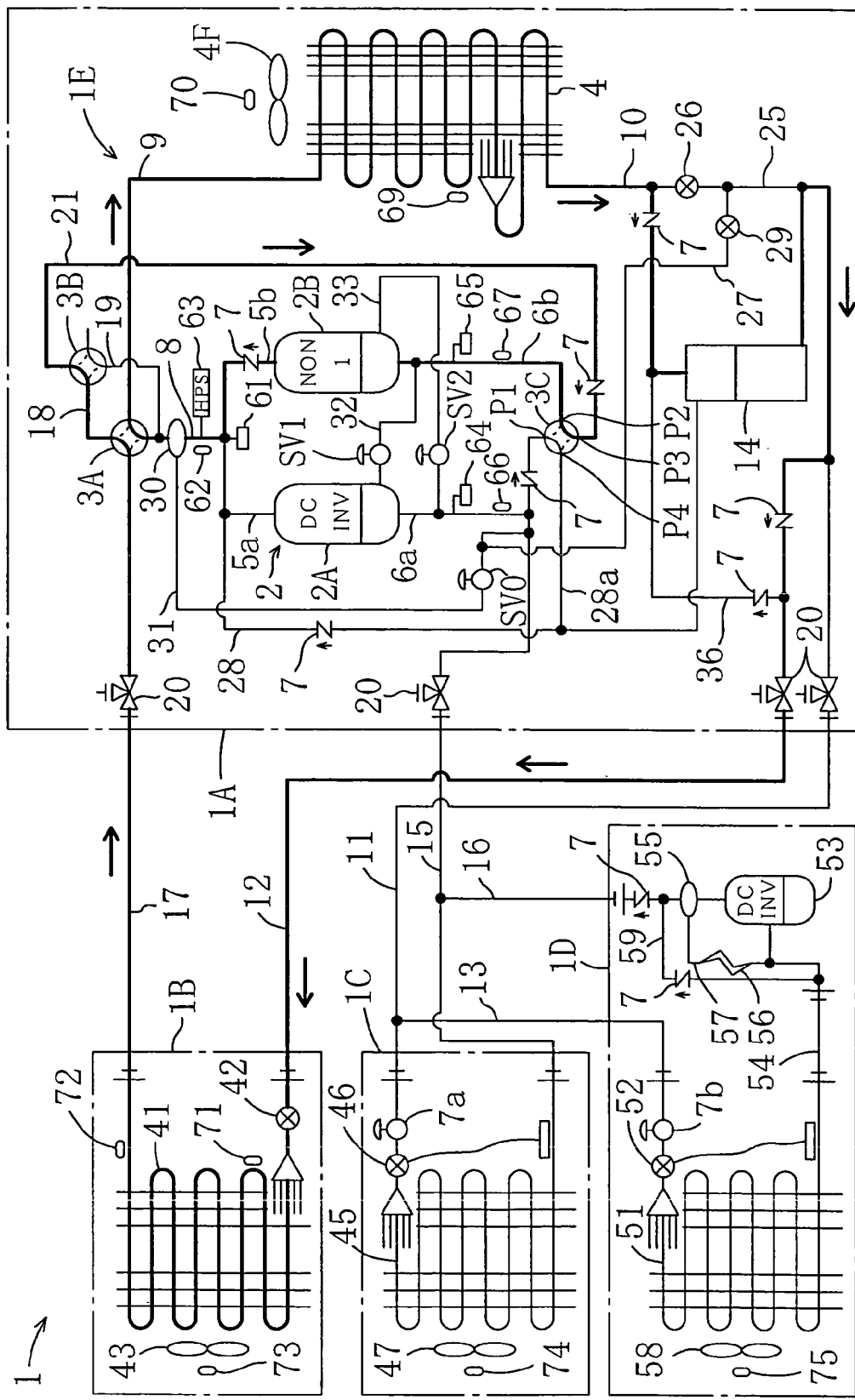
FIG. 2 is a diagram illustrating a refrigerant flow in the refrigerant circuit shown in FIG. 1 at the time of an air-cooling operation mode.

As shown by the solid lines in FIG. 2, the first four-way selector valve (3A), the second four-way selector valve (3B) and the third four-way selector valve (3C) are switched to be in the first state. Further, the outdoor expansion valve (26), the solenoid valve (7a) in the cold-storage unit (1C) and the solenoid valve (7b) in the freezing unit (1D) are closed. The electronic expansion valve (29) of the liquid injection pipe (27) is closed.

Under this state, a refrigerant discharged from the non-inverter compressor (2B) flows from the first four-way selector valve (3A) through the outdoor gas pipe (9) into the outdoor heat exchanger (4) and is condensed. The condensed refrigerant flows through the liquid pipe (10), the receiver (14), the second communication liquid pipe (12), the indoor expansion valve (42) into the indoor heat exchanger (41) and then is evaporated. The evaporated gas refrigerant flows from the communication gas pipe (17) through the first four-way selector valve (3A) and the second four-way selector valve (3B) into the second connecting pipe (21). Finally, the evaporated gas refrigerant returns to the non-inverter compressor (2B) through the third four-way selector valve (3C). By the refrigerant repeating such circulation, cooling within a store is performed.

<② Air-Cooling/Freezing Operation>

This air-cooling/freezing operation is an operation of simultaneously performing air-cooling in the indoor unit (1B) and cooling in the cold-storage unit (1C) and the freezing unit (1D). The cooling in the cold-storage unit (1C) and the freezing unit (1D) includes cooling only in the cold-storage unit (1C), cooling only in the freezing unit (1D) and cooling in both of the cold-storage unit (1C) and the freezing unit (1D). A case of performing cooling in the both units (1C, 1D) will be described herein.

Figure 3:
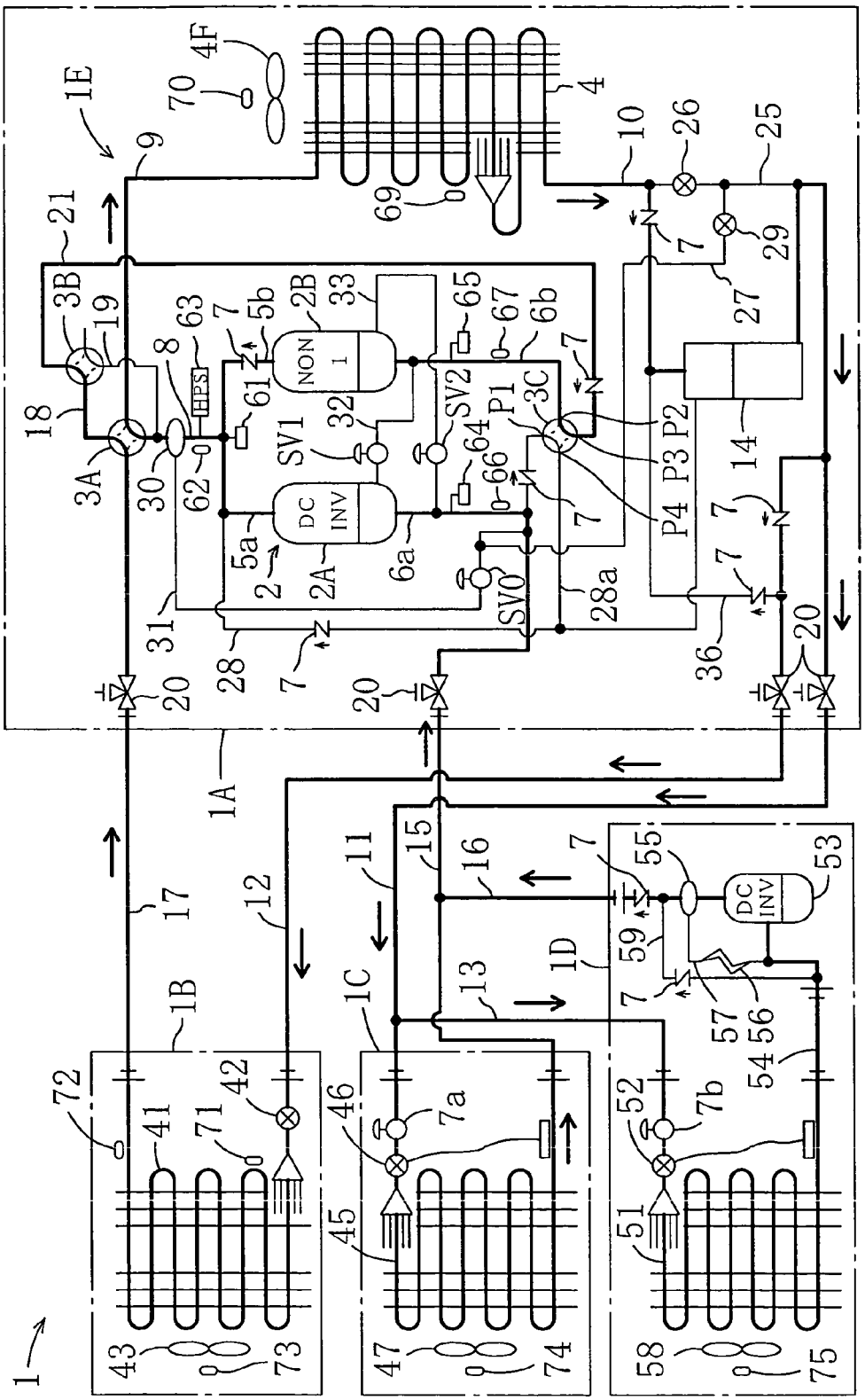
FIG. 3 is a diagram illustrating a refrigerant flow in the refrigerant circuit shown in FIG. 1 at the time of an air-cooling/freezing operation mode.

As shown in FIG. 3, during the air-cooling/freezing operation, both the inverter compressor (2A) and the non-inverter compressor (2B) are driven, and the booster compressor (53) is also driven.

As shown by the solid lines in FIG. 3, the first four-way selector valve (3A), the second four-way selector valve (3B) and the third four-way selector valve (3C) are switched to be in the first state. The solenoid valve (7a) in the cold-storage unit (1C) and the solenoid valve (7b) in the freezing unit (1D) are opened, while the outdoor expansion valve (26) is closed. The indoor expansion valve (42) is controlled so as to have a predetermined opening. Further, the opening of the electronic expansion valve (29) on the liquid injection pipe (27) is adjusted so as to control a degree of superheat of a refrigerant sucked into the inverter compressor (2A).

Under this state, a refrigerant discharged from the inverter compressor (2A) joins a refrigerant discharged from the non-inverter compressor (2B) at the high-pressure gas pipe (8). The resultant joined refrigerant flows from the first four-way selector valve (3A) through the outdoor gas pipe (9) into the outdoor heat exchanger (4), and then is condensed therein. The condensed refrigerant flows through the liquid pipe (10) and the receiver (14), and then branched into the first communication liquid pipe (11) and the second communication liquid pipe (12).

The liquid refrigerant flowing in the second communication liquid pipe (12) flows through the indoor expansion valve (42) into the indoor heat exchanger (41), and then is evaporated therein. The evaporated gas refrigerant flows from the communication gas pipe (17) through the first four-way selector valve (3A) and the second four-way selector valve (3B) into the second connecting pipe (21). Finally, the evaporated gas refrigerant returns through the third four-way selector valve (3C) to the non-inverter compressor (2B).

A part of the liquid refrigerant flowing in the first communication liquid pipe (11) flows through the cold-storage expansion valve (46) into the cold-storage heat exchanger (45) and then is evaporated therein. The other part of the liquid refrigerant flowing in the first communication liquid pipe (11) flows through the branch liquid pipe (13) and the freezing expansion valve (52) into the freezing heat exchanger (51) and then is evaporated therein. The gas refrigerant evaporated by the freezing heat exchanger (51) is sucked by the booster compressor (53), compressed therein and then discharged into the branch gas pipe (16).

The gas refrigerant evaporated by the cold-storage heat exchanger (45) joins the gas refrigerant discharged from the booster compressor (53) at the low-pressure gas pipe (15) and the joined gas refrigerant returns to the inverter compressor (2A).

In accordance with the operation mode for the air-cooling/freezing operation, by the refrigerant repeating such circulation, air-cooling within a store is performed and the interiors of cold-storage showcases and freezing showcases are cooled.

<③ Freezing Operation>

The freezing operation is an operation of stopping the indoor unit (1B) and performing cooling in the cold-storage unit (1C) and the freezing unit (1D). The freezing operation includes an operation of performing only cooling in the cold-storage unit (1C), an operation of performing only cooling in the freezing unit (1D) and an operation of performing cooling in the cold-storage unit (1C) and the freezing unit (1D). A case of performing cooling in both of the units (1C, 1D) will be described herein.

Figure 4:
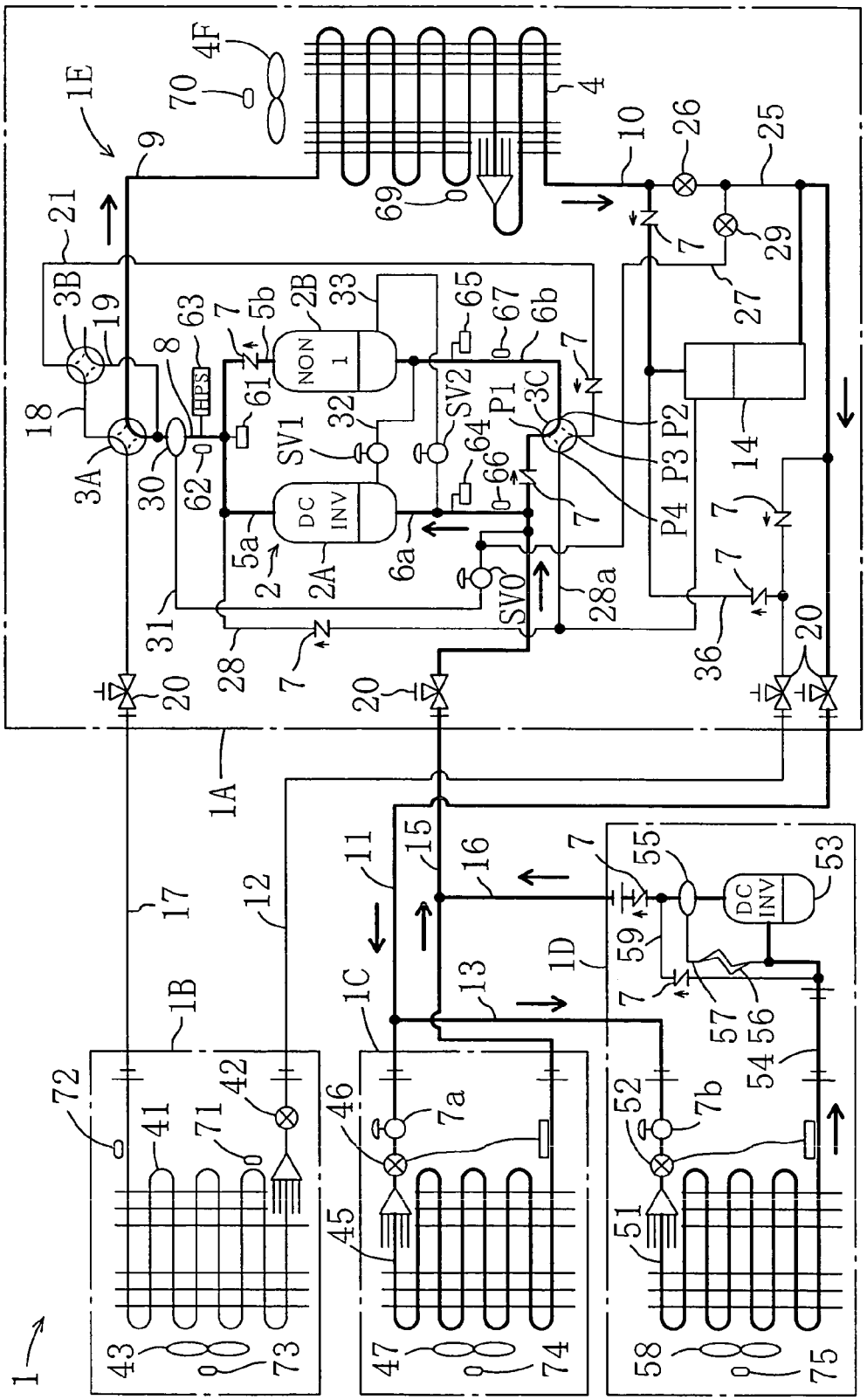
FIG. 4 is a diagram illustrating a refrigerant flow in the refrigerant circuit shown in FIG. 1 at the time of a first pattern for a freezing operation mode.
Figure 5:
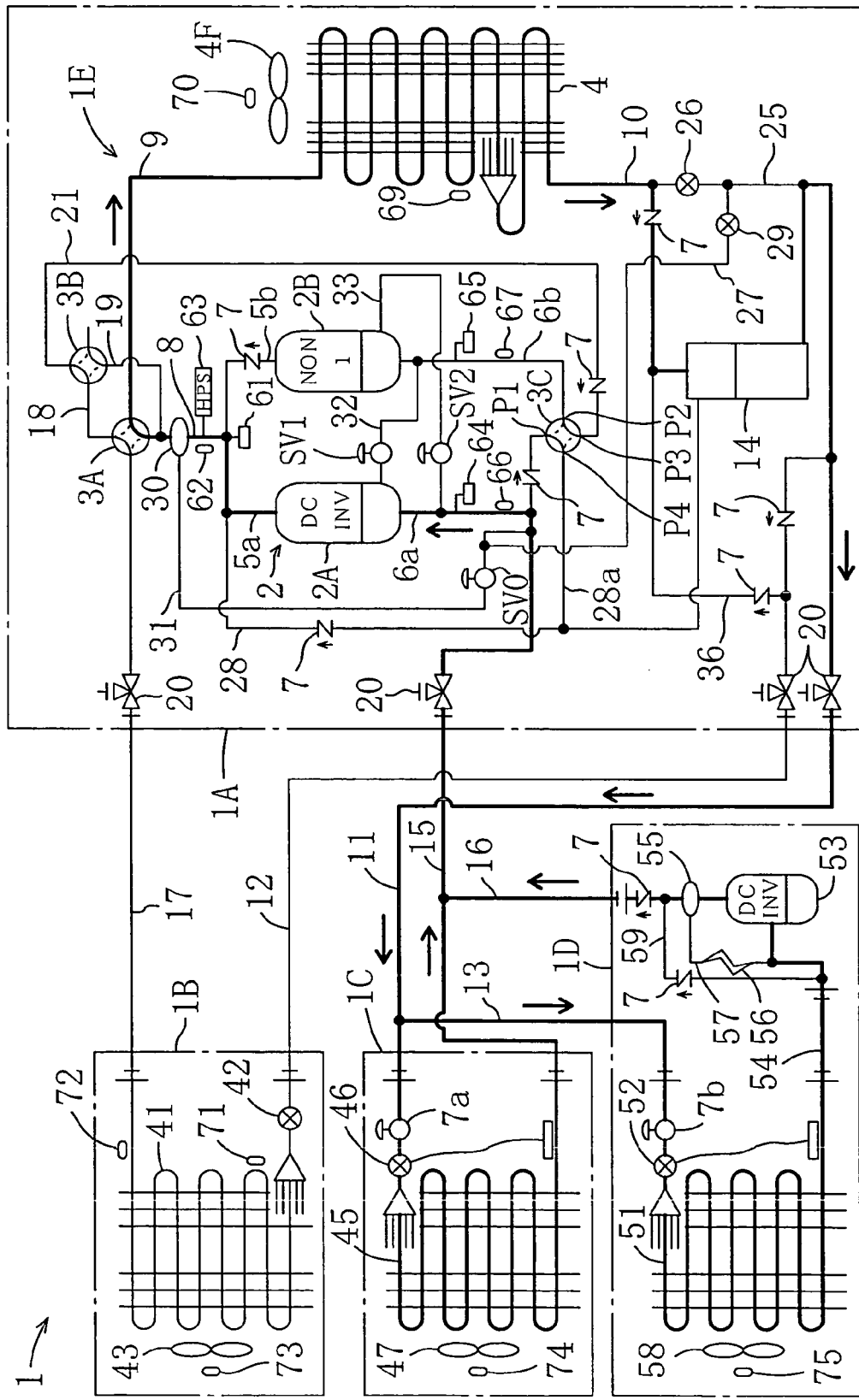
FIG. 5 is a diagram illustrating a refrigerant flow in the refrigerant circuit shown in FIG. 1 at the time of a second pattern for the freezing operation mode.
Figure 6:
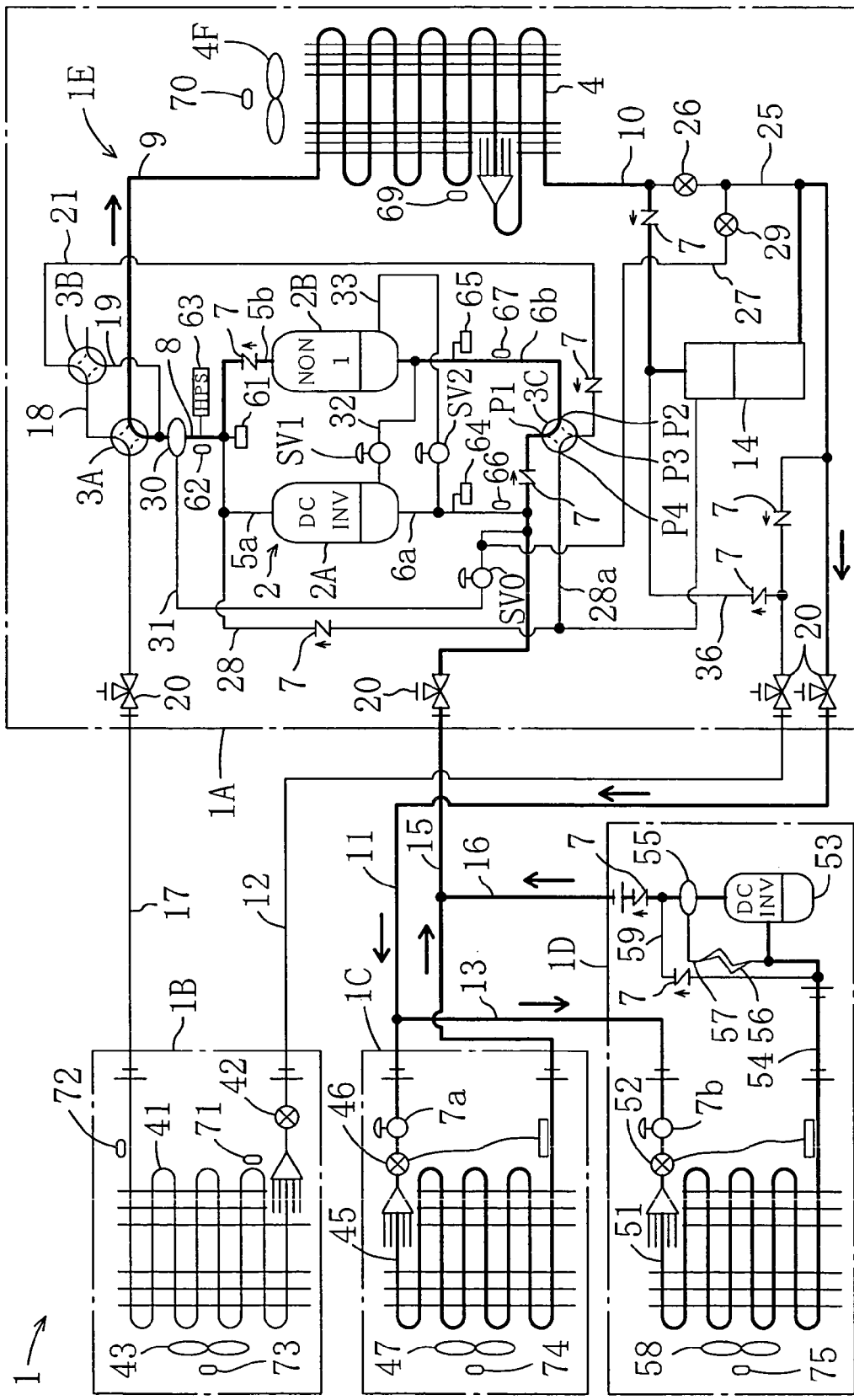
FIG. 6 is a diagram illustrating a refrigerant flow in the refrigerant circuit shown in FIG. 1 at the time of a third pattern for the freezing operation mode.

At the time of the freezing operation, there are provided a first pattern shown in FIG. 4 for driving the inverter compressor (2A) and the non-inverter compressor (2B), a second pattern shown in FIG. 5 for driving only the inverter compressor (2A) and a third pattern shown in FIG. 6 for driving only the non-inverter compressor (2B) when the inverter compressor (2A) is broken. During such operations, the booster compressor (53) is driven.

The operation in the second pattern is usually performed. The first pattern is performed at the time of high load and the third pattern is performed when the inverter compressor (2A) is broken.

First Pattern

The first pattern for the freezing operation shown in FIG. 4 will be firstly described.

The first four-way selector valve (3A) and the second four-way selector valve (3B) are switched to be in the first state, and the third four-way selector valve (3C) is switched to be in the second state. The solenoid valve (7a) of the cold-storage unit (1C) and the solenoid valve (7b) of the freezing unit (1D) are opened, and the outdoor expansion valve (26) and the indoor expansion valve (42) are closed. The opening of the electronic expansion valve (29) of the liquid injection pipe (27) is adjusted in order to control a degree of superheat for sucked refrigerant.

At the time of thermo-off in the cold-storage in which cooling in the cold-storage unit (1C) is stopped, the solenoid valve (7a) is closed. At the time of thermo-off in the freezing in which cooling in the freezing unit (1D) is stopped, the solenoid valve (7b) is closed and the booster compressor (53) is stopped. This is applied to the second and third patterns.

Under this state, a refrigerant discharged from the inverter compressor (2A) and the non-inverter compressor (2B) flows from the first four-way selector valve (3A) through the outdoor gas pipe (9) into the outdoor heat exchanger (4) and then is condensed therein. The condensed liquid refrigerant flows through the liquid pipe (10) and the receiver (14) into the first communication liquid pipe (11). Then, a part of the condensed liquid refrigerant flows through the cold-storage expansion valve (46) into the cold-storage heat exchanger (45) and then is evaporated therein.

The other part of the liquid refrigerant flowing the first communication liquid pipe (11) flows through the branch liquid pipe (13) and the freezing expansion valve (52) into the freezing heat exchanger (51) and then is evaporated therein. The gas refrigerant evaporated in the freezing heat exchanger (51) is sucked by the booster compressor (53), compressed thereby and then discharged into the branch gas pipe (16).

The gas refrigerant evaporated by the cold-storage heat exchanger (45) joins the gas refrigerant discharged from the booster compressor (53) at the low-pressure gas pipe (15). A part of the joined gas refrigerant returns to the inverter compressor (2A) and the remainder thereof returns to the non-inverter compressor (2B) via the third four-way selector valve (3C). By the refrigerant repeating such circulation, cold-storage showcases and freezing showcases are cooled.

A degree-of-superheat control utilizing a temperature sensing bulb is performed for the opening of the cold-storage expansion valve (46) and the freezing expansion valve (52). This is also performed in the following operation patterns.

Second Pattern

In accordance with the second pattern for the freezing operation, as shown in FIG. 5, only the inverter compressor (2A) is driven and the non-inverter compressor (2B) is stopped. The third four-way selector valve (3C) is switched to be in the first state. Settings for other valves are the same as those in the first pattern.

Under this state, a refrigerant discharged from the inverter compressor (2A) circulates, as in the first pattern, in the refrigerant circuit (1E) with the outdoor heat exchanger (4) being a condenser and the cold-storage heat exchanger (45) and the freezing heat exchanger (51) being evaporators. The second pattern is different from the first pattern in that the non-inverter compressor (2B) is not used. As in the first pattern, by the circulation of the refrigerant, cold-storage showcases and freezing showcases can be cooled.

Third Pattern

In accordance with the third pattern for the freezing operation, as shown in FIG. 6, only the non-inverter compressor (2B) is driven and the inverter compressor (2A) is stopped. In accordance with the third pattern, as in the first pattern, settings for the valves are the same as those in the first pattern, including that the third four-way selector valve (3C) is switched to be in the second state, while the inverter compressor (2A) is stopped.

Under this state, a refrigerant discharged from the non-inverter compressor (2B) circulates, as in the first and second patterns, in the refrigerant circuit (1E) with the outdoor heat exchanger (4) being a condenser and the cold-storage heat exchanger (45) and the freezing heat exchanger (51) being evaporators. The third pattern is different from the first and second patterns in that the inverter compressor (2A) is not used. As in the first and second patterns, by the circulation of the refrigerant, cold-storage showcases and freezing showcases can be cooled.

As described above, at the time of the freezing operation, there are provided three operation patterns, i.e., the first pattern of using both of the inverter compressor (2A) and the non-inverter compressor (2B), the second pattern of using only the inverter compressor (2A) and the third pattern of using only the non-inverter compressor (2B). The operation is usually performed in the second pattern of using only the inverter compressor (2A). When the inverter compressor (2A) is broken, the third pattern of using the non-inverter compressor (2B) is performed. Thus, the freezing operation can be continued. As a result, in accordance with this embodiment, even if the inverter compressor (2A) is damaged, quality of products can be maintained without stopping cold-storage/freezing.

<④ Air-Heating Operation>

The air-heating operation is an operation of performing only air-heating in the indoor unit (1B). At the time of the air-heating operation, as shown in FIG. 7, only the non-inverter compressor (2B) is driven.

Figure 7:
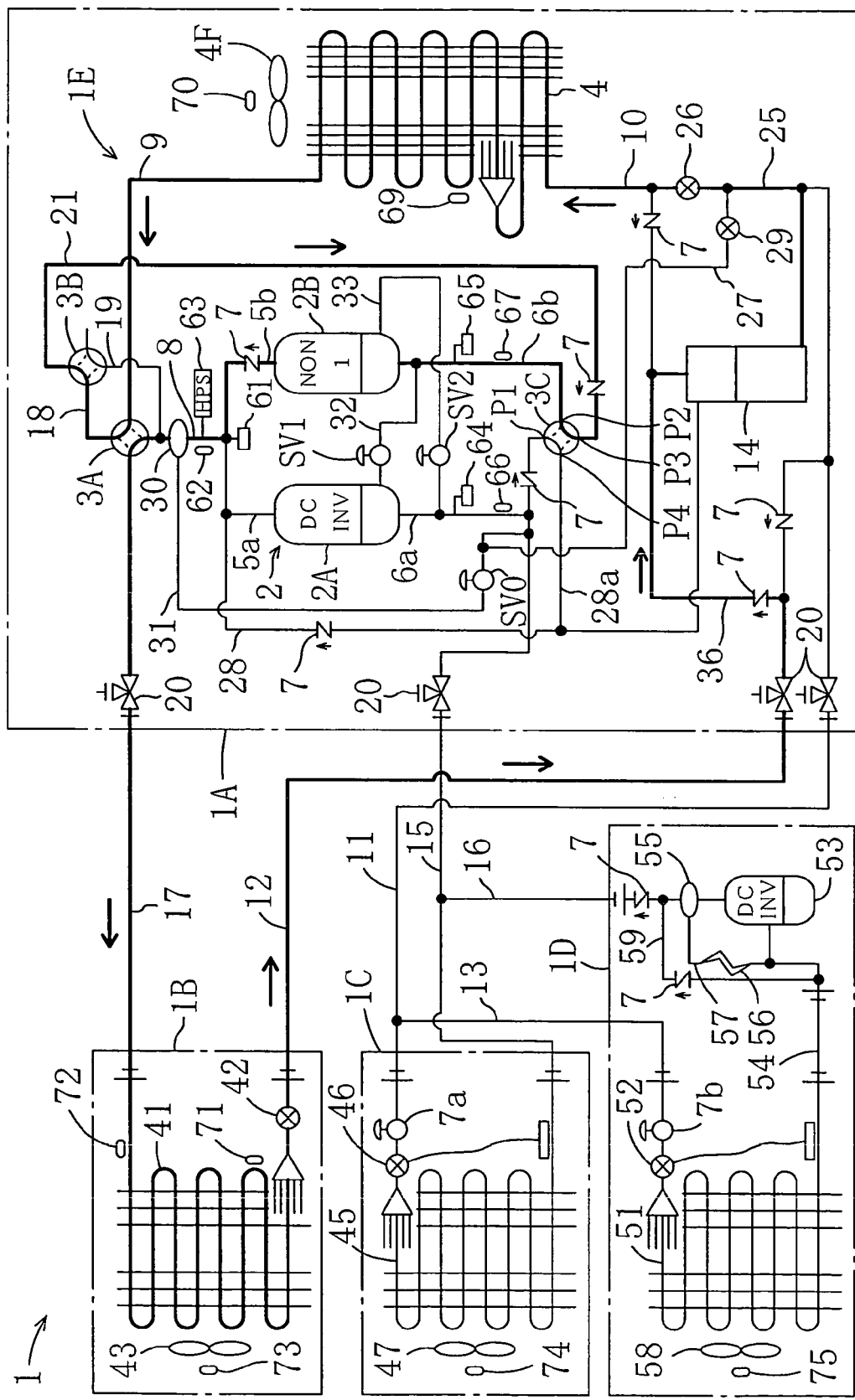
FIG. 7 is a diagram illustrating a refrigerant flow in the refrigerant circuit shown in FIG. 1 at the time of an air-heating operation mode.

As shown by the solid lines in FIG. 7, the first four-way selector valve (3A) is switched to be in the second state, the second four-way selector valve (3B) is switched to be in the first state and the third four-way selector valve (3C) is switched to be in the first state. The solenoid valve (7a) in the cold-storage unit (1C), the solenoid valve (7b) in the freezing unit (1D) and the electronic expansion valve (29) on the liquid injection pipe (27) are closed. Openings of the outdoor expansion valve (26) and the indoor expansion valve (42) are controlled to predetermined values on a basis of a set room temperature and detected values of the sensors.

Under this state, a refrigerant discharged from the non-inverter compressor (2B) flows from the first four-way selector valve (3A) through the communication gas pipe (17) into the indoor heat exchanger (41) and then is condensed therein. The condensed liquid refrigerant flows through the second communication liquid pipe (12) and the branch liquid pipe (36) into the receiver (14). Then, the liquid refrigerant flows through the outdoor expansion valve (26) on the auxiliary liquid pipe (25) into the outdoor heat exchanger (4), and then is evaporated therein. The evaporated gas refrigerant flows from the outdoor gas pipe (9) through the first four-way selector valve (3A) and the second four-way selector valve (3B). Further, the evaporated gas refrigerant returns from the second connecting pipe (21) through the third four-way selector valve (3C) to the non-inverter compressor (2B). By the refrigerant repeating such circulation, air-heating within a store is performed.

<⑤ First Air-Heating/Freezing Operation>

The first air heating/freezing operation is a 100% heat recovery operation of performing air-heating in the indoor unit (1B) and cooling in the cold-storage unit (1C) and the freezing unit (1D) without using the outdoor heat exchanger (4). In accordance with the first air heating/freezing operation, there are provided a first pattern shown in FIG. 8 for driving the inverter compressor (2A) and the non-inverter compressor (2B), a second pattern shown in FIG. 9 for driving only the inverter compressor (2A) and a third pattern shown in FIG. 10 for driving only the non-inverter compressor (2B) when the inverter compressor (2A) is broken. At the time of such operations, the booster compressor (53) is driven.

The operation is usually performed in the first or second pattern. When the inverter compressor (2A) is broken, the operation is performed in the third pattern.

First Pattern

Figure 8:
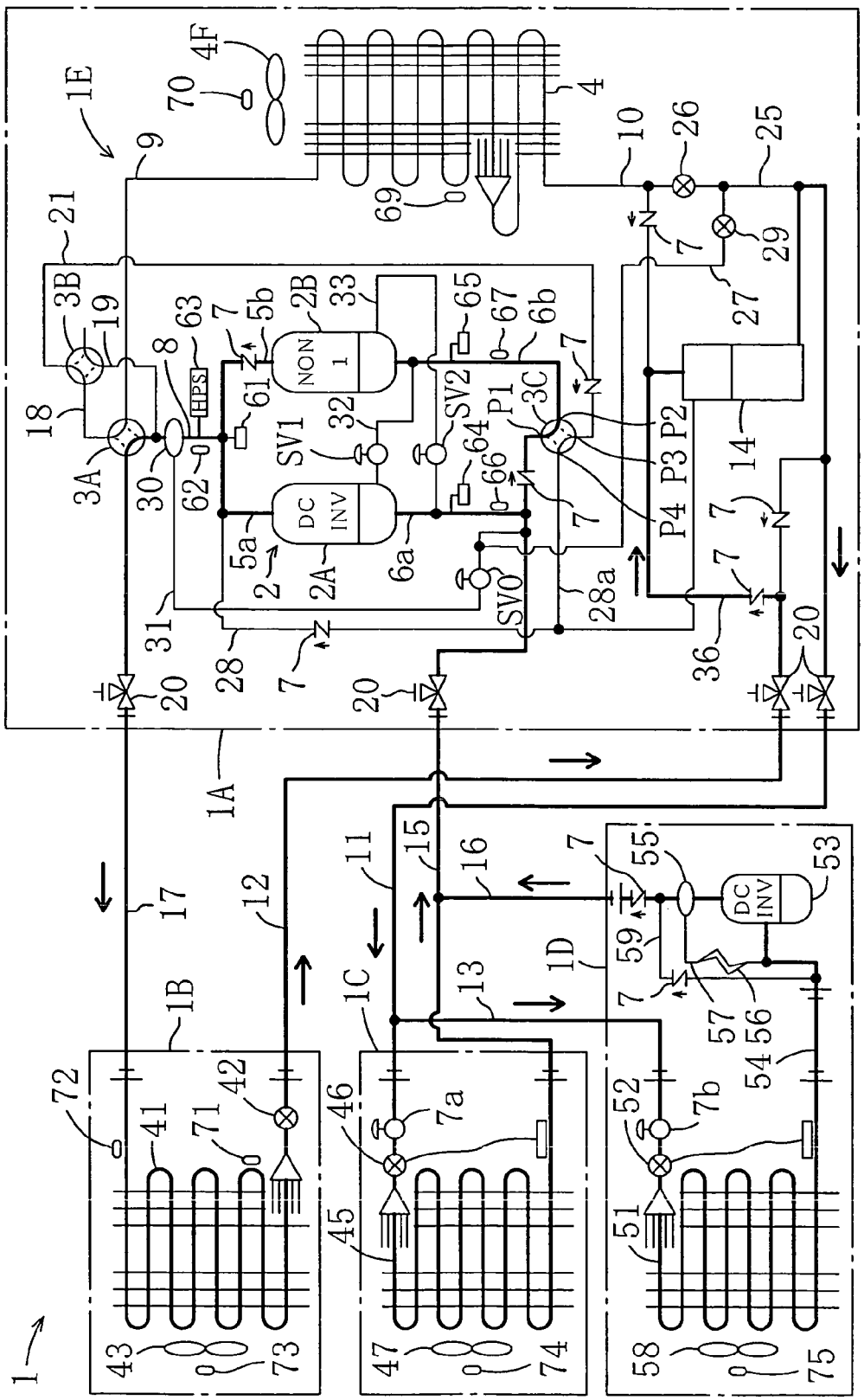
FIG. 8 is a diagram illustrating a refrigerant flow in the refrigerant circuit shown in FIG. 1 at the time of a first pattern for a first air-heating/freezing operation mode.

The first pattern for the first air-heating/freezing operation shown in FIG. 8 will be firstly described.

The first four-way selector valve (3A) is switched to be in the second state, the second four-way selector valve (3B) is switched to be in the first state and the third four-way selector valve (3C) is switched to be in the second state. The solenoid valve (7*a*) in the cold-storage unit (1C) and the solenoid valve (7*b*) in the freezing unit (1D) are opened, and the outdoor expansion valve (26) is closed. Openings of the indoor expansion valve (42) and the electronic expansion valve (29) on the liquid injection pipe (27) are controlled to predetermined values.

Under this state, a refrigerant discharged from the inverter compressor (2A) and the non-inverter compressor (2B) flows from the first four-way selector valve (3A) through the communication gas pipe (17) into the indoor heat exchanger (41) and then is condensed therein. The condensed liquid refrigerant flows from the second communication liquid pipe (12) through the branch liquid pipe (36) and the receiver (14) into the first communication liquid pipe (11).

A part of the liquid refrigerant flowing in the first communication liquid pipe (11) flows through the cold-storage expansion valve (46) into the cold-storage heat exchanger (45) and then is evaporated therein. The other part of the liquid refrigerant flowing in the first communication liquid pipe (11) flows through the branch liquid pipe (13) and the freezing expansion valve (52) into the freezing heat exchanger (51) and then is evaporated therein. The gas refrigerant evaporated by the freezing heat exchanger (51) is sucked by the booster compressor (53), compressed thereby and discharged into the branch gas pipe (16).

The gas refrigerant evaporated in the cold-storage heat exchanger (45) joins the gas refrigerant discharged from the booster compressor (53) at the low-pressure gas pipe (15). A part of the joined gas refrigerant returns to the inverter compressor (2A). The remainder thereof returns through the third four-way selector valve (3C) to the non-inverter compressor (2B). By the refrigerant repeating such circulation, air-heating within a store is performed, and the interiors of cold-storage showcases and freezing showcases are cooled.

As described above, in accordance with the first air-heating/freezing operation, cooling abilities (amounts of evaporation heat) of the cold-storage unit (1C) and the freezing unit (1D) are balanced with an air-heating ability (amount of condensation heat) of the indoor unit (1B), so that 100% of heat is recovered.

Second Pattern

Figure 9:
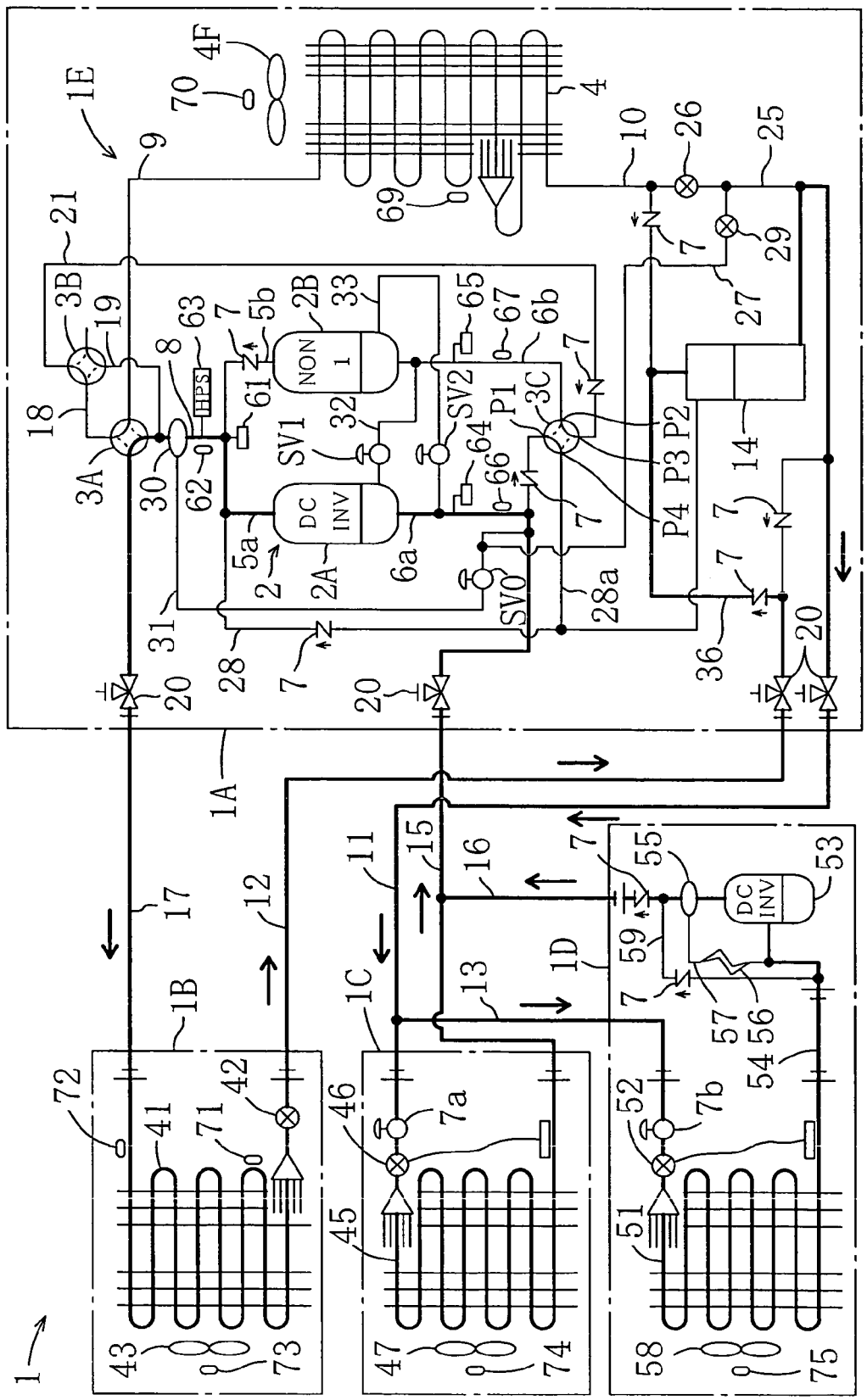
FIG. 9 is a diagram illustrating a refrigerant flow in the refrigerant circuit shown in FIG. 1 at the time of a second pattern for the first air-heating/freezing operation mode.

In accordance with the second pattern for the first air-heating/freezing operation, as shown in FIG. 9, only the inverter compressor (2A) is driven and the non-inverter compressor (2B) is stopped. The third four-way selector valve (3C) is switched to be in the first state. Settings for other valves are the same as those in the first pattern.

Under this state, a refrigerant discharged from the inverter compressor (2A) is circulated, as in the first pattern, in the refrigerant circuit (1E) with the indoor heat exchanger (41) being a condenser and the cold-storage heat exchanger (45) and the freezing heat exchanger (51) being evaporators. The second pattern is different from the first pattern only in that the non-inverter compressor (2B) is not used. As in the first pattern, air-heating within a store is performed and the interiors of cold-storage showcases and freezing showcases are cooled.

Third Pattern

Figure 10:
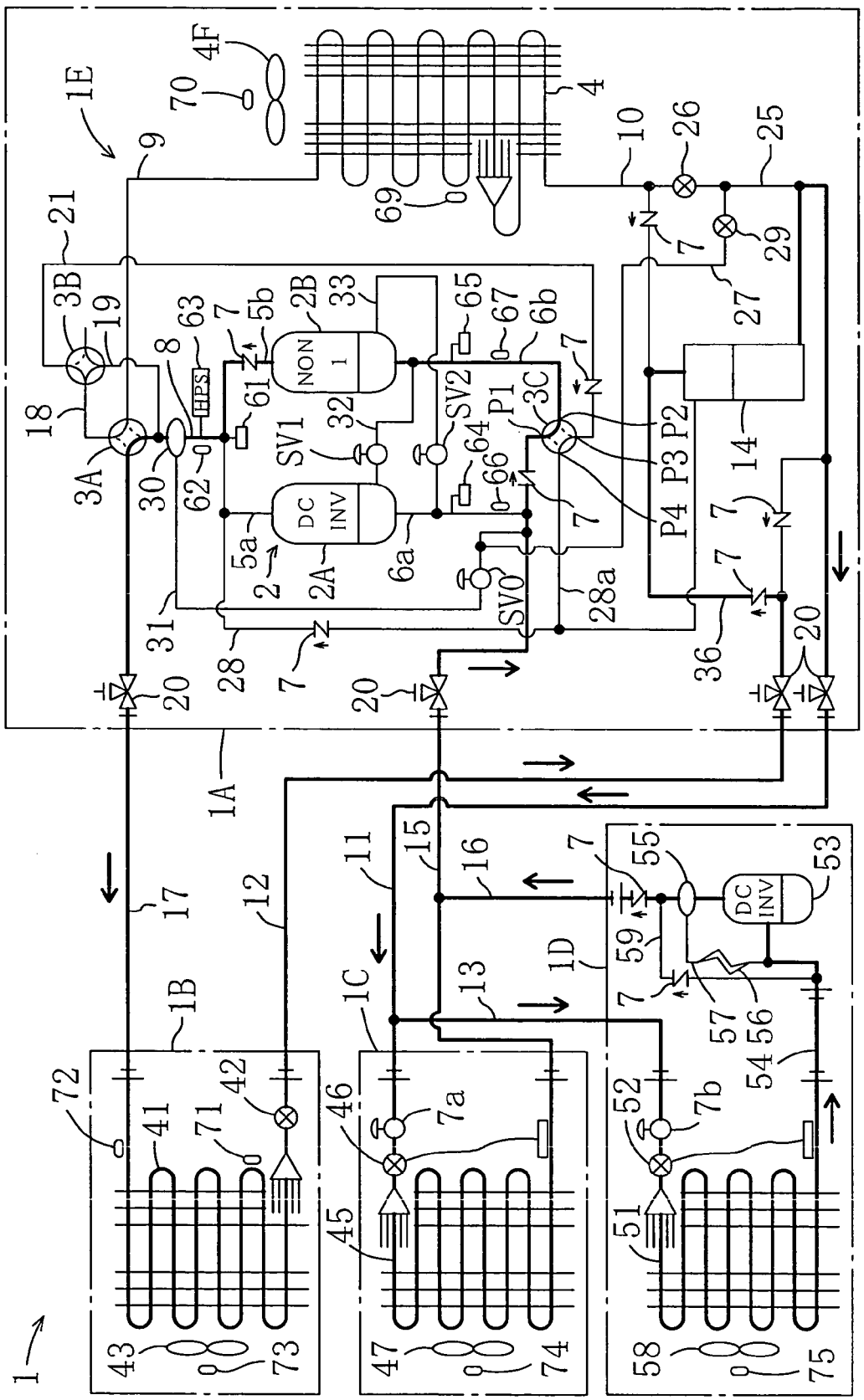
FIG. 10 is a diagram illustrating a refrigerant flow in the refrigerant circuit shown in FIG. 1 at the time of a third pattern for the first air-heating/freezing operation mode.

In accordance with the third pattern for the first air-heating/freezing operation, as shown in FIG. 10, only the non-inverter compressor (2B) is driven and the inverter compressor (2A) is stopped. As in the first pattern, the third four-way selector valve (3C) is switched to be in the second state. Settings for other valves are the same as those in the first pattern.

Under this state, a refrigerant discharged from the non-inverter compressor (2B) is, as in the first and second patterns, circulated in the refrigerant circuit (1E) with the indoor heat exchanger (41) being a condenser and the cold-storage heat exchanger (45) and the freezing heat exchanger (51) being evaporators. The third pattern is different from the first and second patterns only in that the inverter compressor (2A) is not used. By the refrigerant being circulated, as in the first and second patterns, air-heating within a store is performed and the interiors of cold-storage showcases and freezing showcases are cooled.

As described above, in accordance with the first air-heating/freezing operation, there are provided the first pattern of using both of the inverter compressor (2A) and the non-inverter compressor (2B), the second pattern of using only the inverter compressor (2A) and the third pattern of using only the non-inverter compressor (2B). Operation is usually performed in the first pattern of using the both compressors (2A) or the second pattern of using only the inverter compressor (2A). If the inverter compressor (2A) is broken, the third pattern of using the non-inverter compressor (2B) is performed, so that the operation is continued. Accordingly, in accordance with this embodiment, even if the inverter compressor (2A) is broken, cold-storage/freezing is not stopped and thus quality of products can be maintained. Further, air-heating within a store can be continuously performed.

<⑥ Second Air-Heating/Freezing Operation>

The second air-heating/freezing operation is an operation with excess air-heating ability in which during the first air-heating/freezing operation, the air-heating ability of the indoor unit (1B) remains. The second air-heating/freezing operation is performed with the same settings as those in the first air-heating/freezing operation except that in the first air-heating/freezing operation, the second four-way selector valve (3B) is switched to be in the second state as shown by the solid lines in FIGS. 11 through 13.

Figure 11:
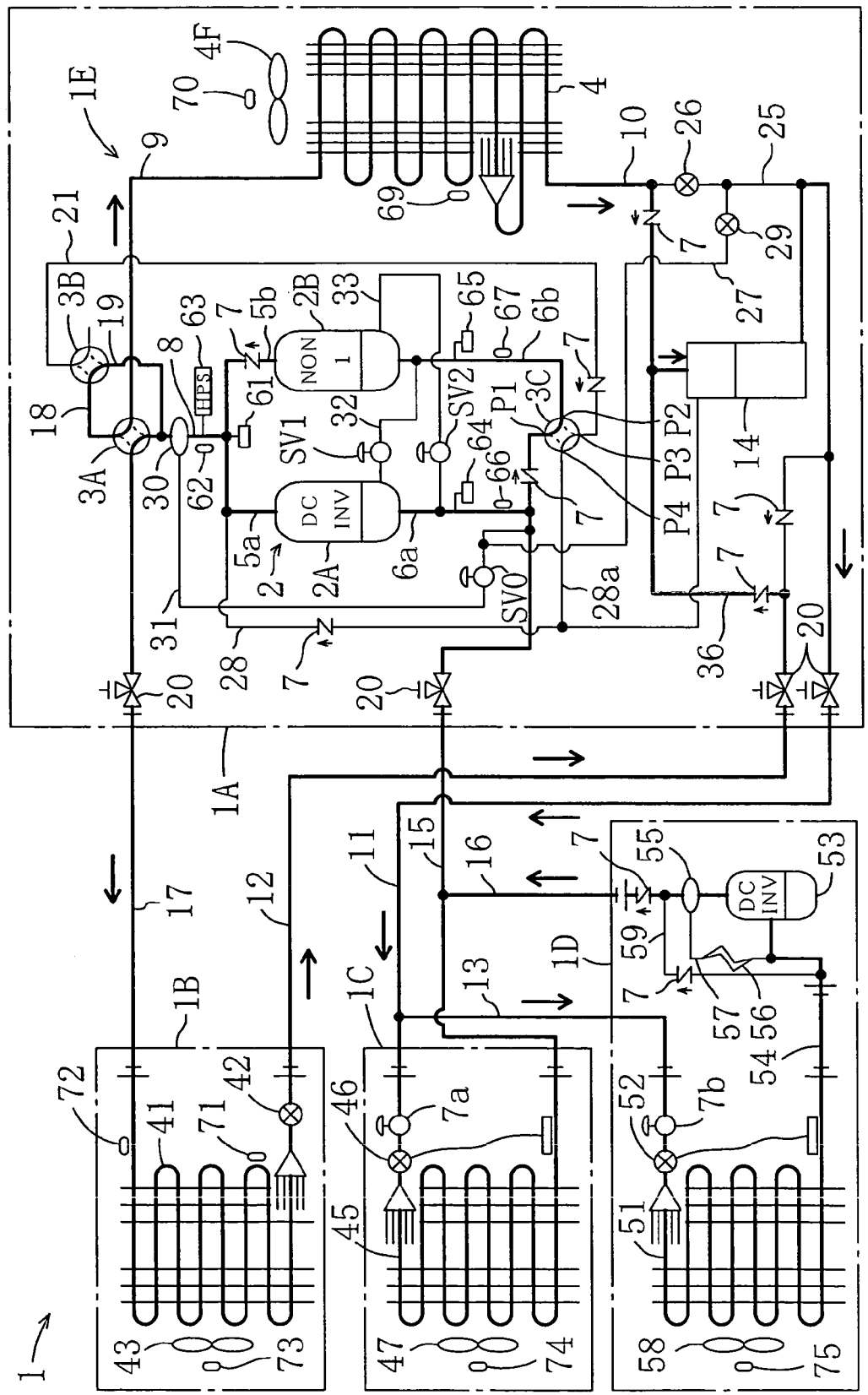
FIG. 11 is a diagram illustrating a refrigerant flow in the refrigerant circuit shown in FIG. 1 at the time of a first pattern for a second air-heating/freezing operation mode.
Figure 12:
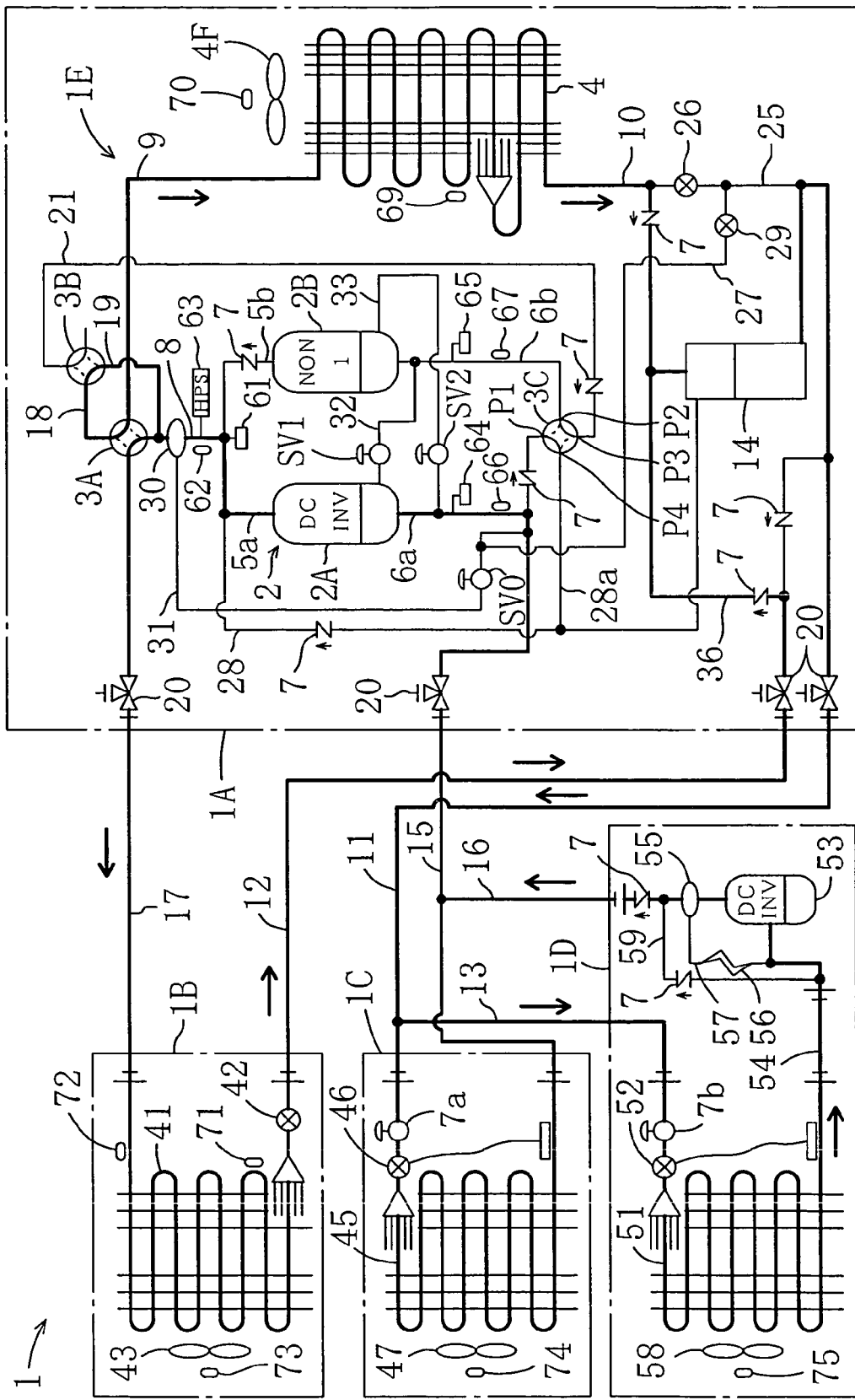
FIG. 12 is a diagram illustrating a refrigerant flow in the refrigerant circuit shown in FIG. 1 at the time of a second pattern for the second air-heating/freezing operation mode.
Figure 13:
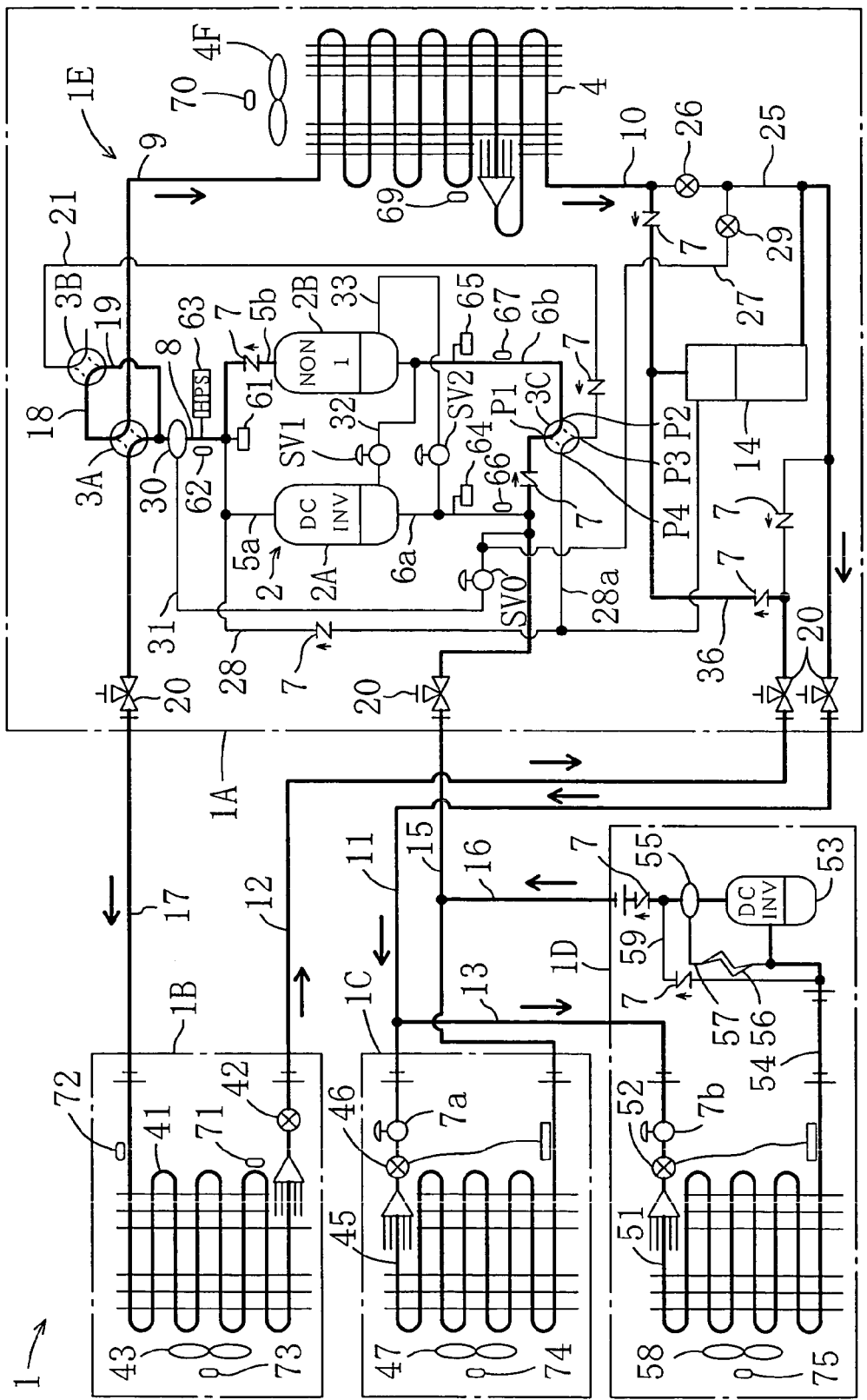
FIG. 13 is a diagram illustrating a refrigerant flow in the refrigerant circuit shown in FIG. 1 at the time of a third pattern for the second air-heating/freezing operation mode.

In accordance with the second air-heating/freezing operation, there are provided a first pattern of driving the inverter compressor (2A) and the non-inverter compressor (2B) as shown in FIG. 11, a second pattern of driving only the inverter compressor (2A) shown in FIG. 12 and a third pattern of driving only the non-inverter compressor (2B) when the inverter compressor (2A) is broken as shown in FIG. 13. At the time of such operations, the booster compressor (53) is driven.

Operation is usually performed in the second pattern. The first pattern is performed at a time of high load, and the third pattern is performed when the inverter compressor (2A) is broken.

First Pattern

In accordance with the first pattern for the second air-heating/freezing operation shown in FIG. 11, a part of refrigerant discharged from the inverter compressor (2A) and the non-inverter compressor (2B) flows in the indoor heat exchanger (41) and then is condensed therein as in the first air-heating/freezing operation. The condensed liquid refrigerant flows from the second communication liquid pipe (12) through the branch liquid pipe (36) and the receiver (14) to the first communication liquid pipe (11).

The other part of the refrigerant discharged from the inverter compressor (2A) and the non-inverter compressor (2B) flows from the auxiliary gas pipe (19) through the second four-way selector valve (3B) and the first four-way selector valve (3A) to the outdoor gas pipe (9). Then, the refrigerant is condensed in the outdoor heat exchanger (4).

The condensed liquid refrigerant flows through the liquid pipe (10), and joins the liquid refrigerant from the second communication liquid pipe (12). The joined refrigerant flows through the receiver (14) to the first communication liquid pipe (11).

A part of the liquid refrigerant flowing in the first communication liquid pipe (11) flows in the cold-storage heat exchanger (45) and is evaporated therein. The other part of the liquid refrigerant flowing in the first communication liquid pipe (11) flows in the freezing heat exchanger (51), is evaporated and sucked into the booster compressor (53). The gas refrigerant evaporated in the cold-storage heat exchanger (45) joins the gas refrigerant discharged from the booster compressor (53) at the low-pressure gas pipe (15). A part of the joined refrigerant returns to the inverter compressor (2A), and the remainder thereof returns through the third four-way selector valve (3C) switched to be in the second state to the non-inverter compressor (2B). By repeating such circulation, air-heating within a store is performed, and the interiors of cold-storage showcases and freezing showcases are cooled.

As described above, in accordance with the second air-heating/freezing operation, cooling abilities (amounts of evaporation heat) of the cold-storage unit (1C) and the freezing unit (1D) are not balanced with the air-heating ability (amount of condensation heat) of the indoor unit (1B), and excess condensed heat is discharged outdoor by the outdoor heat exchanger (4).

Second Pattern

In accordance with the second pattern for the second air-heating/freezing operation, as shown in FIG. 12, only the inverter compressor (2A) is driven and the non-inverter compressor (2B) is stopped. The third four-way selector valve (3C) is switched to be in the first state. Settings for other valves are the same as those of the first pattern.

Under this state, a refrigerant discharged from the inverter compressor (2A) is circulated in the refrigerant circuit (1E) with the indoor heat exchanger (41) and the outdoor heat exchanger (4) being condensers and the cold-storage heat exchanger (45) and the freezing heat exchanger (51) being evaporators as in the first pattern. The second pattern is different from the first pattern only in that the non-inverter compressor (2B) is not used. As in the first pattern, by the circulation of the refrigerant, air-heating within a store is performed and the interiors of cold-storage showcases and freezing showcases are cooled.

Third Pattern

In accordance with the third pattern for the second air-heating/freezing operation, as shown in FIG. 13, only the non-inverter compressor (2B) is driven and the inverter compressor (2A) is stopped. As in the first pattern, the third four-way selector valve (3C) is switched to be in the second state. Further, settings for valves are the same as in the first pattern.

Under this state, a refrigerant discharged from the non-inverter compressor (2B) is circulated in the refrigerant circuit (1E) with the indoor heat exchanger (41) and the outdoor heat exchanger (4) being condensers and the cold-storage heat exchanger (45) and the freezing heat exchanger (51) being evaporators as in the first and second patterns. The third pattern is different from the first and second patterns only in that the inverter compressor (2A) is not used. By the circulation of the refrigerant, air-heating within a store is performed, and the interiors of cold-storage showcases and freezing showcases are cooled.

As described above, in accordance with the second air-heating/freezing operation, there are provided three operation patterns, i.e., the first pattern of using both the inverter compressor (2A) and the non-inverter compressor (2B), the second pattern of using only the inverter compressor (2A) and the third pattern of using only the non-inverter compressor (2B). Operation is usually performed in the second pattern of using only the inverter compressor (2A). If the inverter compressor (2A) is broken, the third pattern is performed by the non-inverter compressor (2B). Thus, the operation can be continued. In accordance with this embodiment, even if the inverter compressor (2A) is broken, cold-storage/freezing is not stopped and thus quality of products can be maintained. Further, air-heating within a store can be continued.

<⑦ Third Air-Heating/Freezing Operation>

Figure 14:
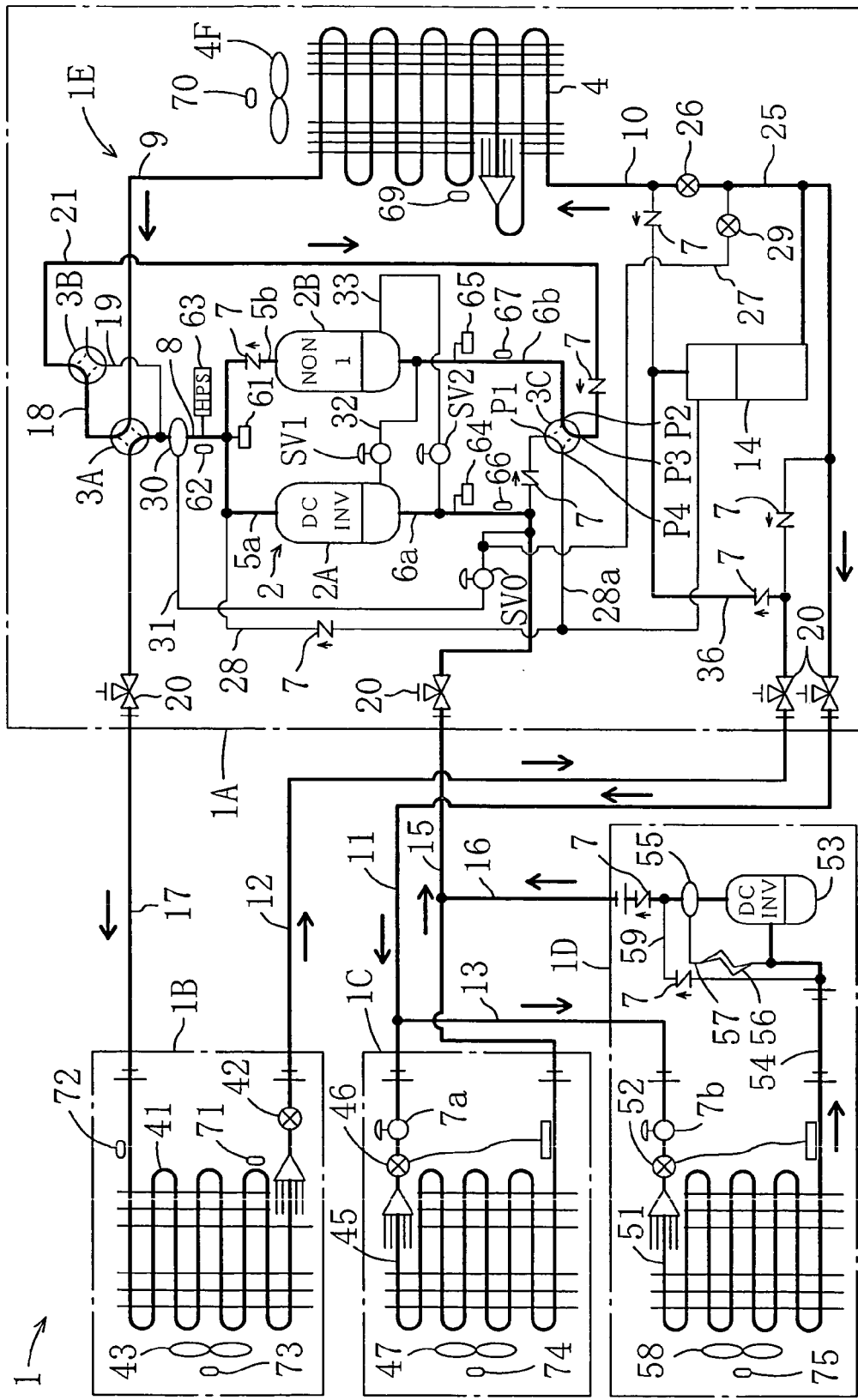
FIG. 14 is a diagram illustrating a refrigerant flow in the refrigerant circuit shown in FIG. 1 at the time of a third air-heating/freezing operation mode.

The third air-heating/freezing operation is an operation with insufficient air-heating ability in which during the first air-heating/freezing operation, the air-heating ability of the indoor unit (1B) is insufficient. In accordance with the third air-heating/freezing operation, as shown in FIG. 14, the inverter compressor (2A) and the non-inverter compressor (2B) are driven, and the booster compressor (53) is also driven.

The third air-heating/freezing operation is performed when the air-heating ability is insufficient in the first pattern for the first air-heating/freezing operation, i.e., is performed when an amount of evaporation heat is insufficient. The third air-heating/freezing operation is the same as the first pattern for the first air-heating/freezing operation except that the third four-way selector valve (3C) is switched to be in the second state and the opening of the outdoor expansion valve (26) is controlled. Setting for other valves are the same as those of the first pattern for the first air-heating/freezing operation.

A refrigerant discharged from the inverter compressor (2A) and the non-inverter compressor (2B) flows through the communication gas pipe (17) into the indoor heat exchanger (41) and then is condensed therein, as in the first air-heating/freezing operation. The condensed refrigerant flows from the second communication gas pipe (12) through the branch liquid pipe (36) into the receiver (14).

Then, a part of the liquid refrigerant from the receiver (14) flows through the first communication liquid pipe (11). A part of the liquid refrigerant flowing in the first communication liquid pipe (11) flows in the cold-storage heat exchanger (45) and is evaporated therein. The other part of the liquid refrigerant flowing in the first communication liquid pipe (11) flows in the freezing heat exchanger (51), is evaporated therein, and sucked into the booster compressor (53). The gas refrigerant evaporated by the cold-storage heat exchanger (45) joins the gas refrigerant discharged from the booster compressor (53) at the low-pressure gas pipe (15), and the joined gas refrigerant returns to the inverter compressor (2A).

The other part of the liquid refrigerant from the receiver (14) flows through the liquid pipe (10) and the outdoor expansion valve (26) to the outdoor heat exchanger (4), and then is evaporated therein. The evaporated gas refrigerant flows in the outdoor gas pipe (9). Further, the evaporated gas refrigerant passes through the first four-way selector valve (3A), the second four-way selector valve (3B), the second connecting pipe (21), and the third four-way selector valve (3C) and then returns to the non-inverter compressor (2B).

By repeating such circulation, air-heating within a store is performed and the interiors of cold-storage showcases and freezing showcases are cooled. Namely, cooling abilities (amounts of evaporation heat) of the cold-storage unit (1C) and the freezing unit (1D) are not balanced with the air-heating ability (amount of condensation heat) of the indoor unit (1B), and thus insufficient evaporated heat is obtained from the outdoor heat exchanger (4). Then, air-heating and cold-storage/freezing are performed simultaneously.

Effects of First Embodiment

As described above, in accordance with the first embodiment, as shown in FIGS. 2 through 14, seven kinds of operation modes can be performed. Especially, for ③ freezing operation, ⑤ first air-heating/freezing operation and ⑥ second air-heating/freezing operation, either of the compressors may be used or both compressors may be used in combination. Accordingly, in a cold-storage/freezing channel in which stop of operation becomes more problematic as compared to the case of the air-conditioning channel, various operations can be performed. Even if one of the two compressors (2A, 2B) is broken, the operation can be continued.

In particular, the inverter compressor (2A) is broken easier than the non-inverter compressor (2B). Thus, the first embodiment is effective for measure for the failure of the inverter compressor (2A).

In accordance with the first embodiment, in the compression mechanism formed of two compressors (2A, 2B), if one of the compressors (2A, 2B) is broken, the operation can be continued by another one. Thus, as compared to the case of using three compressors, the structure and control can be simplified.

[Second Embodiment]

Figure 15:
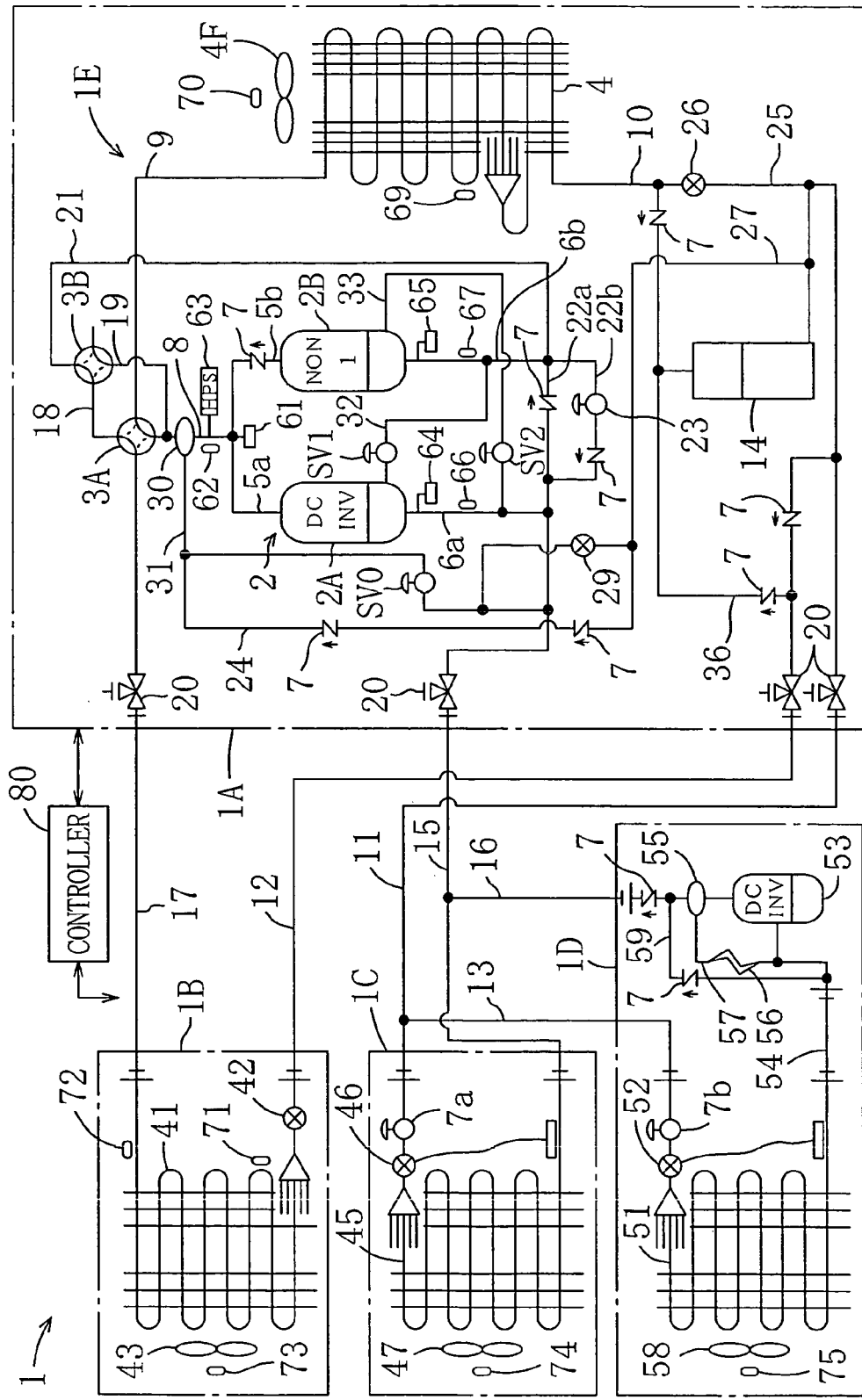
FIG. 15 is a refrigerant circuit diagram of a refrigerating apparatus according to a second embodiment of the present invention.

As shown in FIG. 15, in accordance with a second embodiment of the present invention, structures of suction-side pipes for the compression mechanism formed of two compressors (2A, 2B) are different from those of the first embodiment. The third four-way selector valve (3C) of the first embodiment is not used.

In accordance with the second embodiment, the suction pipe (6a) for the inverter compressor (2A) is connected to the suction pipe (6b) for the non-inverter compressor (2B) by the first communication pipe (22a) and the second communication pipe (22b). The first communication pipe (22a) and the second communication pipe (22b) are provided in parallel. The first communication pipe (22a) is provided with the check valve (7) for allowing only a refrigerant flow from the inverter compressor (2A) to the non-inverter compressor (2B). The second communication pipe (22b) is provided with the check valve (7) for allowing only a refrigerant flow from the non-inverter compressor (2B) to the inverter compressor (2A) and the solenoid valve (23) serving as an open/close valve for opening/closing the second communication pipe (22b).

The oil return pipe (31), the first and second oil-level equalizing pipes (32, 33) and the liquid injection pipe (27) are basically structured similarly to those of the first embodiment. In accordance with the second embodiment, the gas vent pipe (28) for the receiver (14) is not provided. The liquid injection pipe (27) is connected to the oil return pipe (31) by the communication pipe (24) at the position of the liquid injection pipe (27) between a connecting point with the liquid pipe (10) and the electronic expansion valve (29) and the position of the oil return pipe (31) between the oil separator (30) and the solenoid valve (SV0). The communication pipe (24) is provided with the check valve (7) for allowing only a refrigerant flow from the liquid injection pipe (27) to the oil return pipe (31).

Operations

Next, operations performed by the refrigerating apparatus (1) of the second embodiment will be described.

In accordance with the second embodiment, as in the first embodiment, it is capable of setting seven kinds of operation modes, i.e., ① air-cooling operation, ② air-cooling/freezing operation, ③ freezing operation, ④ air-heating operation, ⑤ first air-heating/freezing operation, ⑥ second air heating/freezing operation and ⑦ third air-heating/freezing operation. In accordance with the second embodiment, for ① air-cooling operation, ③ freezing operation, ④ air-heating operation, ⑤ first air-heating/freezing operation and ⑥ second air heating/freezing operation, either of the compressors (2A, 2B) may be used, or both of them may be used. For ② air-cooling/freezing operation and ⑦ third air-heating/freezing operation, both of the compressors (2A, 2B) may be used in combination or only the non-inverter compressor (2B) may be used.

The respective operations will be described below.

<① Air-Cooling Operation>

Figure 16:
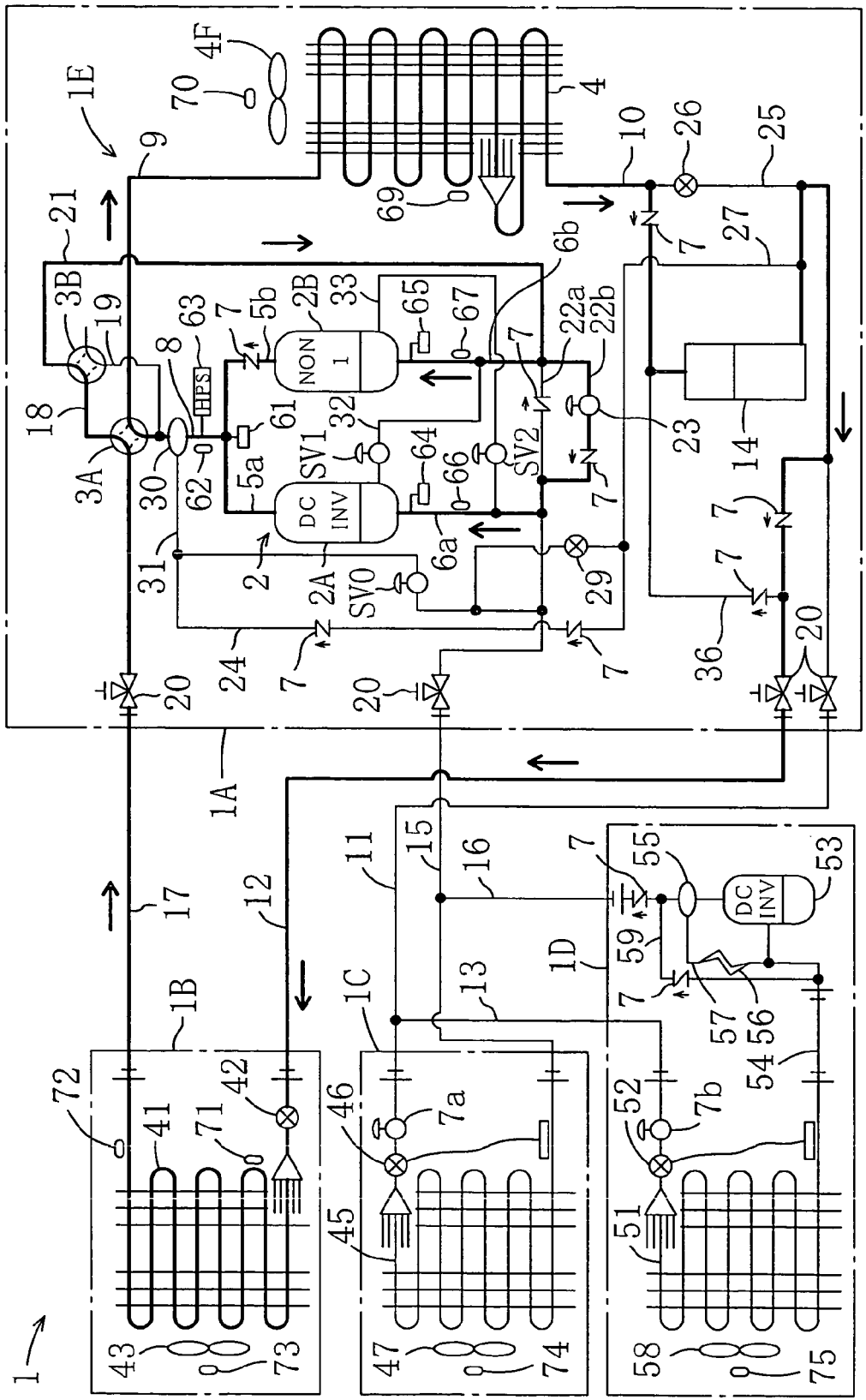
FIG. 16 is a diagram illustrating a refrigerant flow in a refrigerant circuit shown in FIG. 15 at the time of a first pattern for an air-cooling operation mode.
Figure 17:
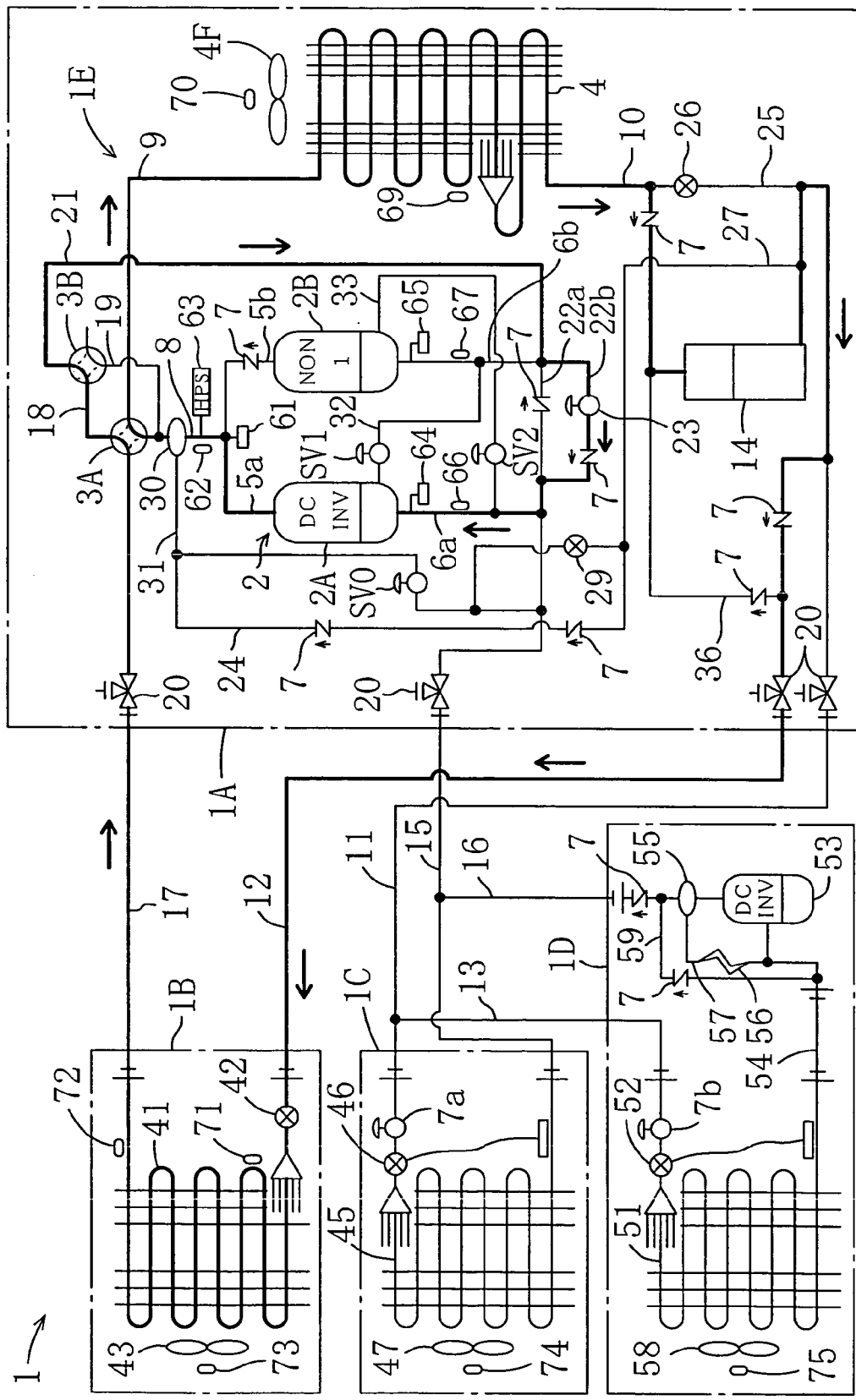
FIG. 17 is a diagram illustrating a refrigerant flow in the refrigerant circuit shown in FIG. 15 at the time of a second pattern for the air-cooling operation mode.
Figure 18:
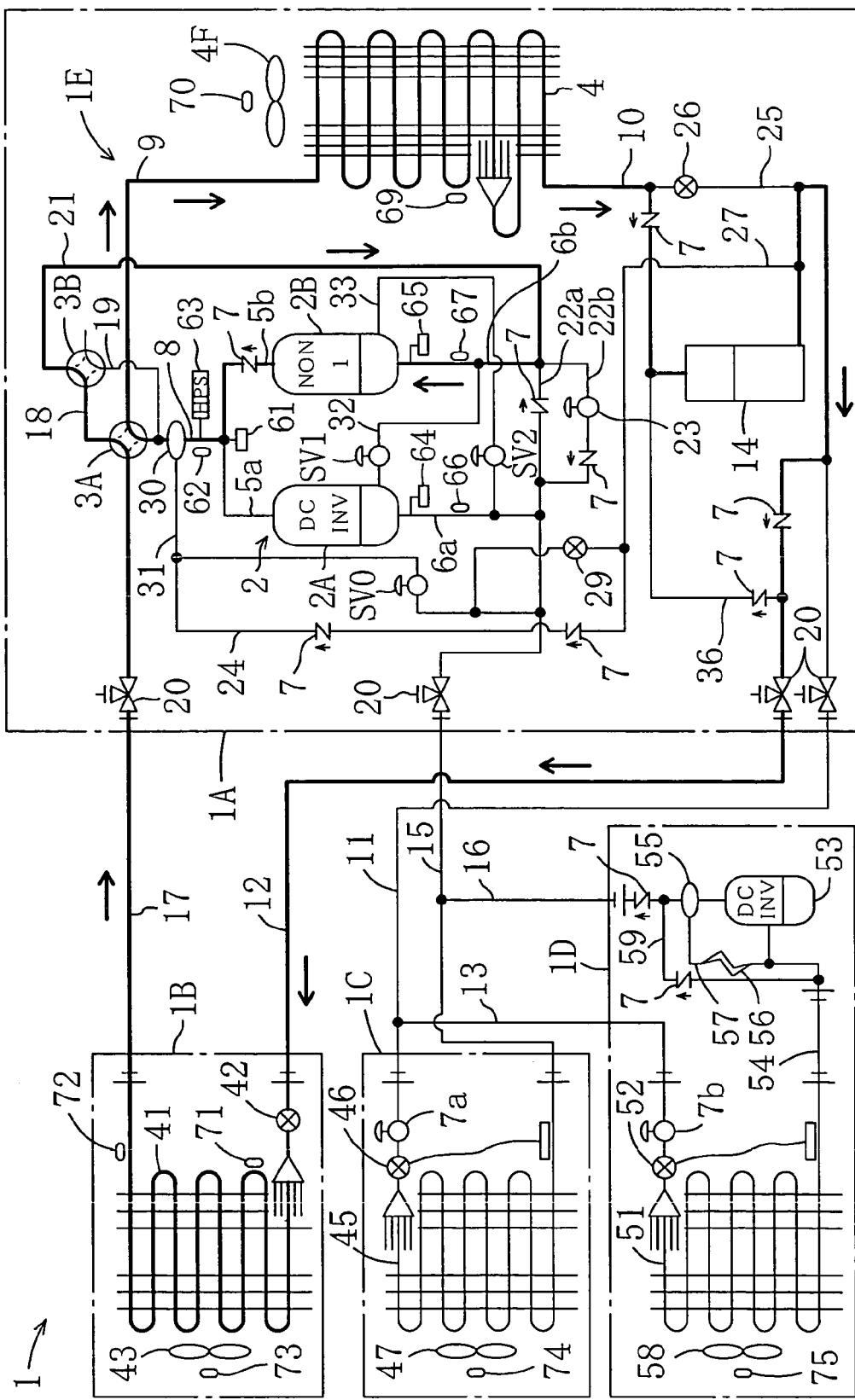
FIG. 18 is a diagram illustrating a refrigerant flow in the refrigerant circuit shown in FIG. 15 at the time of a third pattern for the air-cooling operation mode.

In the air-cooling operation, a first pattern of using both the inverter compressor (2A) and the non-inverter compressor (2B) as shown in FIG. 16, a second pattern of using only the inverter compressor (2A) as shown in FIG. 17 and a third pattern of using only the non-inverter compressor (2B) as shown in FIG. 18 can be performed. Operation is usually performed in the second pattern. If an air-cooling load is large, the operation is performed in the first pattern. The third pattern serves as an emergency operation pattern when the inverter compressor (2A) is broken. In the operation patterns for the air-cooling operation, the booster compressor (53) is stopped.

First Pattern

During the air-cooling operation, as shown by the solid lines in FIG. 16, the first four-way selector valve (3A) and the second four-way selector valve (3B) are switched to be in the first state. Further, the outdoor expansion valve (26), the electronic expansion valve (29) of the liquid injection pipe (27), the solenoid valve (7a) in the cold-storage unit (1C) and the solenoid valve (7b) in the freezing unit (1D) are closed. The indoor expansion valve (42) is controlled so as to have a predetermined opening. The solenoid valve (23) of the second communication pipe (22b) is opened.

Under this state, a refrigerant discharged from the inverter compressor (2A) and the non-inverter compressor (2B) flows from the first four-way selector valve (3A) through the outdoor gas pipe (9) into the outdoor heat exchanger (4) and is condensed. The condensed refrigerant flows through the liquid pipe (10), the receiver (14), the second communication liquid pipe (12), the indoor expansion valve (42) into the indoor heat exchanger (41) and then is evaporated. The evaporated gas refrigerant flows from the communication gas pipe (17) through the first four-way selector valve (3A) and the second four-way selector valve (3B), and a part of the evaporated gas refrigerant returns to the non-inverter compressor (2B) and the remainder thereof returns through the second communication pipe (22b) to the inverter compressor (2A). By the refrigerant repeating such circulation, cooling within a store is performed.

Second Pattern

In accordance with the second pattern for the air-cooling operation, as shown in FIG. 17, only the inverter compressor (2A) is driven and the non-inverter compressor (2B) is stopped. Settings for the valves are the same as in the first pattern. Namely, the outdoor expansion valve (26), the electronic expansion valve (29) of the liquid injection pipe (27), the solenoid valve (7a) in the cold-storage unit (1C) and the solenoid valve (7b) in the freezing unit (1D) are closed. The indoor expansion valve (42) is controlled so as to have a predetermined opening. The solenoid valve (23) of the second communication pipe (22b) is opened.

Under this state, a refrigerant discharged from the inverter compressor (2A) is circulated, as in the first pattern, in the refrigerant circuit (1E) with the outdoor heat exchanger (4) being a condenser and the indoor heat exchanger (41) being an evaporator. The refrigerant flown from the indoor heat exchanger (41) passes through the first and second four-way selector valves (3A, 3B). Then, the entire refrigerant flows through the second communication pipe (22b) and returns to the inverter compressor (2A). By the refrigerant circulating as described above, air-cooling within a store is performed in the second pattern.

Third Pattern

In accordance with the third pattern for the air-cooling operation, as shown in FIG. 18, only the non-inverter compressor (2B) is driven and the inverter compressor (2A) is stopped. Settings for the valves in the third pattern are the same as those of the first pattern except that the solenoid valve (23) of the second communication pipe (22b) is closed.

Under this state, as in the first and second patterns, a refrigerant discharged from the non-inverter compressor (2B) is circulated in the refrigerant circuit (1E) with the outdoor heat exchanger (4) being a condenser and the indoor heat exchanger (41) being an evaporator. Also in the third pattern, by the circulation of the refrigerant, air-cooling within a store can be performed.

As described above, during the air-cooling operation, there are provided three operation patterns, i.e., the first pattern of using both the inverter compressor (2A) and the non-inverter compressor (2B), the second pattern of using only the inverter compressor (2A) and the third pattern of using only the non-inverter compressor (2B). The operation is usually performed in the second pattern of using only the inverter compressor (2A). If the inverter compressor (2A) is broken, the third pattern of using the non-inverter compressor (2B) is performed, so that the operation can be continued. Accordingly even if the inverter compressor (2A) is broken in an apparatus which usually performs air-cooling in an inverter compressor, air-cooling can be continued.

<②> Air-Cooling/Freezing Operation>

Figure 19:
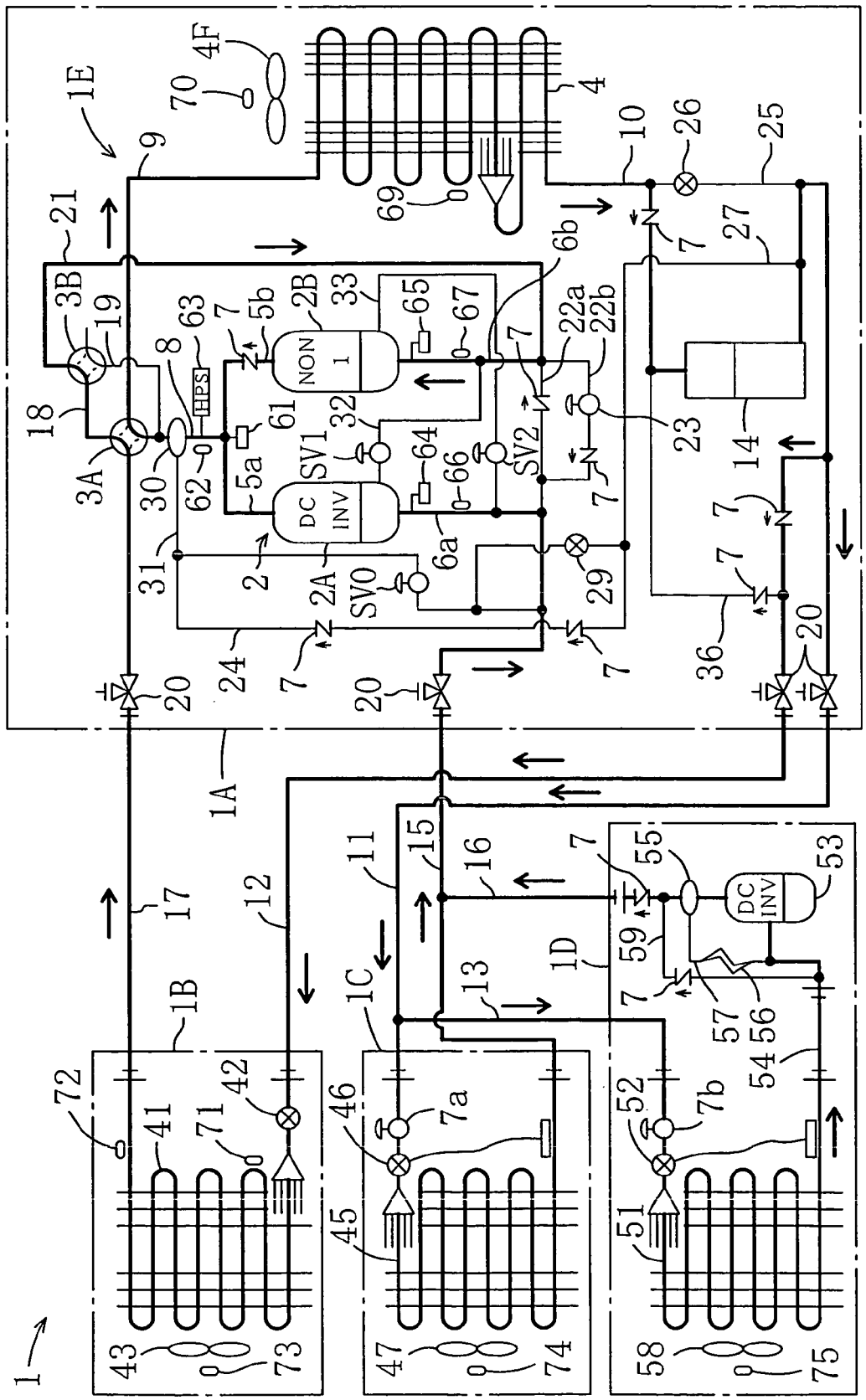
FIG. 19 is a diagram illustrating a refrigerant flow in the refrigerant circuit show in FIG. 15 at the time of a first pattern for an air-cooling/freezing operation mode.
Figure 20:
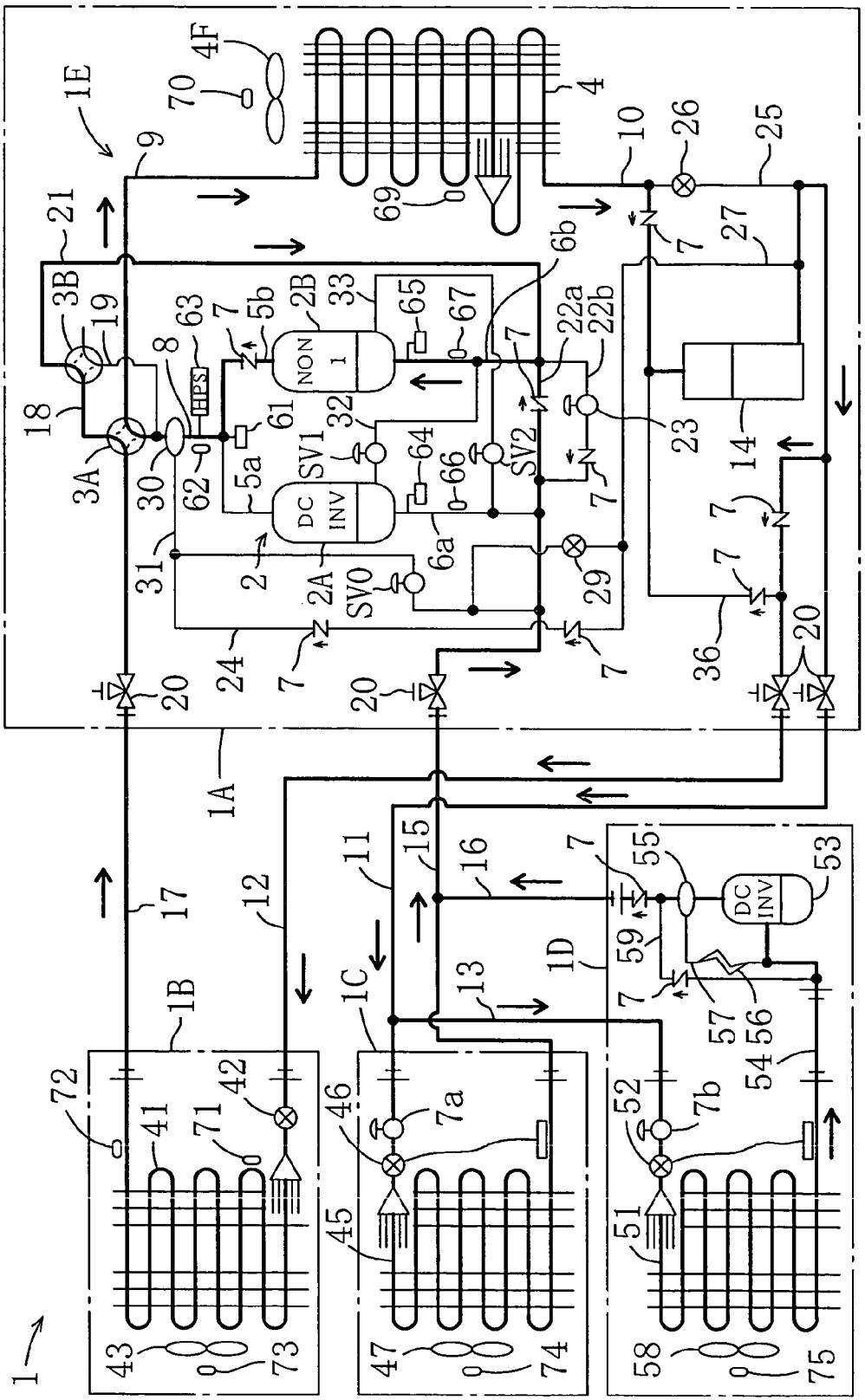
FIG. 20 is a diagram illustrating a refrigerant flow in the refrigerant circuit show in FIG. 15 at the time of a second pattern for the air-cooling/freezing operation mode.

During the air-cooling/freezing operation, there are provided a first pattern of using the inverter compressor (2A) and the non-inverter compressor (2B) as shown in FIG. 19 and a second pattern of using only the non-inverter compressor (2B) if the inverter compressor (2A) is broken, as shown in FIG. 20. Operation is usually performed in the first pattern. The second pattern is carried out as an operation pattern for emergency.

First Pattern

In the first pattern, the first four-way selector valve (3A) and the second four-way selector valve (3B) are respectively switched to be in the first state as shown by the solid lines in FIG. 19. The indoor expansion valve (42) is controlled so as to have a predetermined opening. The solenoid valve (7a) in the cold-storage unit (1C) and the solenoid valve (7b) in the freezing unit (1D) are opened, while the outdoor expansion valve (26) is closed. The opening of the electronic expansion valve (29) for the liquid injection pipe (27) is adjusted so as to control a degree of superheat for a refrigerant sucked into the inverter compressor (2A). The booster compressor (53) is activated and the solenoid valve (23) for the second communication pipe (22b) is closed.

Under this state a refrigerant discharged from the inverter compressor (2A) joins a refrigerant discharged from the non-inverter compressor (2B) at the high-pressure gas pipe (8). The joined refrigerant flows from the first four-way selector valve (3A) through the outdoor gas pipe (9) into the outdoor heat exchanger (4) and then is condensed therein. The condensed liquid refrigerant flows in the liquid pipe (10). Further, the liquid refrigerant flows through the receiver (14) and then is branched into the first communication liquid pipe (11) and the second communication liquid pipe (12).

The liquid refrigerant in the second communication liquid pipe (12) flows through the indoor expansion valve (42) into the indoor heat exchanger (41) and then is evaporated. The evaporated gas refrigerant flows from the communication gas pipe (17) through the first four-way selector valve (3A) and the second four-way selector valve (3B) to the second connecting pipe (21). Then, the refrigerant returns to the non-inverter compressor (2B).

A part of the liquid refrigerant flowing in the first communication liquid pipe (11) flows through the cold-storage expansion valve (46) to the cold-storage heat exchanger (45), and then is evaporated. The other part of the liquid refrigerant flowing in the first communication liquid pipe (11) flows form the branch liquid pipe (13) through the freezing expansion valve (52) into the freezing heat exchanger (51), and then is evaporated. The gas refrigerant evaporated in the freezing heat exchanger (51) is sucked into the booster compressor (53), compressed therein and discharged to the branch gas pipe (16).

The gas refrigerant evaporated in the cold-storage heat exchanger (45) joins the gas refrigerant discharged from the booster compressor (53) at the low-pressure gas pipe (15), and the joined gas refrigerant returns to the inverter compressor (2A).

During the air-cooling/freezing operation, by the refrigerant repeating such circulation, air-cooling within a store is performed and the interiors of cold-storage showcases and freezing showcases are cooled.

Second Pattern

Settings for the valves in the second pattern are the same as those of the first pattern. The second pattern is different from the first pattern in that the inverter compressor (2A) is stopped and only the non-inverter compressor (2B) is operated.

As shown in FIG. 20, a refrigerant discharged from the non-inverter compressor (2B) is condensed in the outdoor heat exchanger (4) and then branched. A part of the refrigerant is evaporated in the indoor heat exchanger, and the evaporated refrigerant flows through the first four-way selector valve (3A) and the second four-way selector valve (3B) and returns to the non-inverter compressor (2B). The remainder of the liquid refrigerant condensed in the outdoor heat exchanger is evaporated in the cold-storage heat exchanger (45) and the freezing heat exchanger (51). The refrigerant in the cold-storage heat exchanger (45) joins the refrigerant in the freezing heat exchanger (51) at the low-pressure gas pipe (15) and the joined refrigerant flows through the first communication pipe (22a) and returns to the non-inverter compressor (2B).

In accordance with the second pattern, as in the first pattern, air-cooling within a store is performed and the interiors of cold-storage showcases and freezing showcases are cooled. Even if the inverter compressor (2A) is broken, the operation can be continued only by the non-inverter compressor (2B).

<③ Freezing Operation>

As described in the first embodiment, the freezing operation is an operation of stopping the indoor unit (1B) and performing cooling in the cold-storage unit (1C) and the freezing unit (1D). The freezing operation includes an operation of performing only cooling in the cold-storage unit (1C), an operation of performing only cooling in the freezing unit (1D) and an operation of performing cooling in the cold-storage unit (1C) and the freezing unit (1D). A case of performing cooling in both of the units (1C, 1D) will be described herein.

Figure 21:
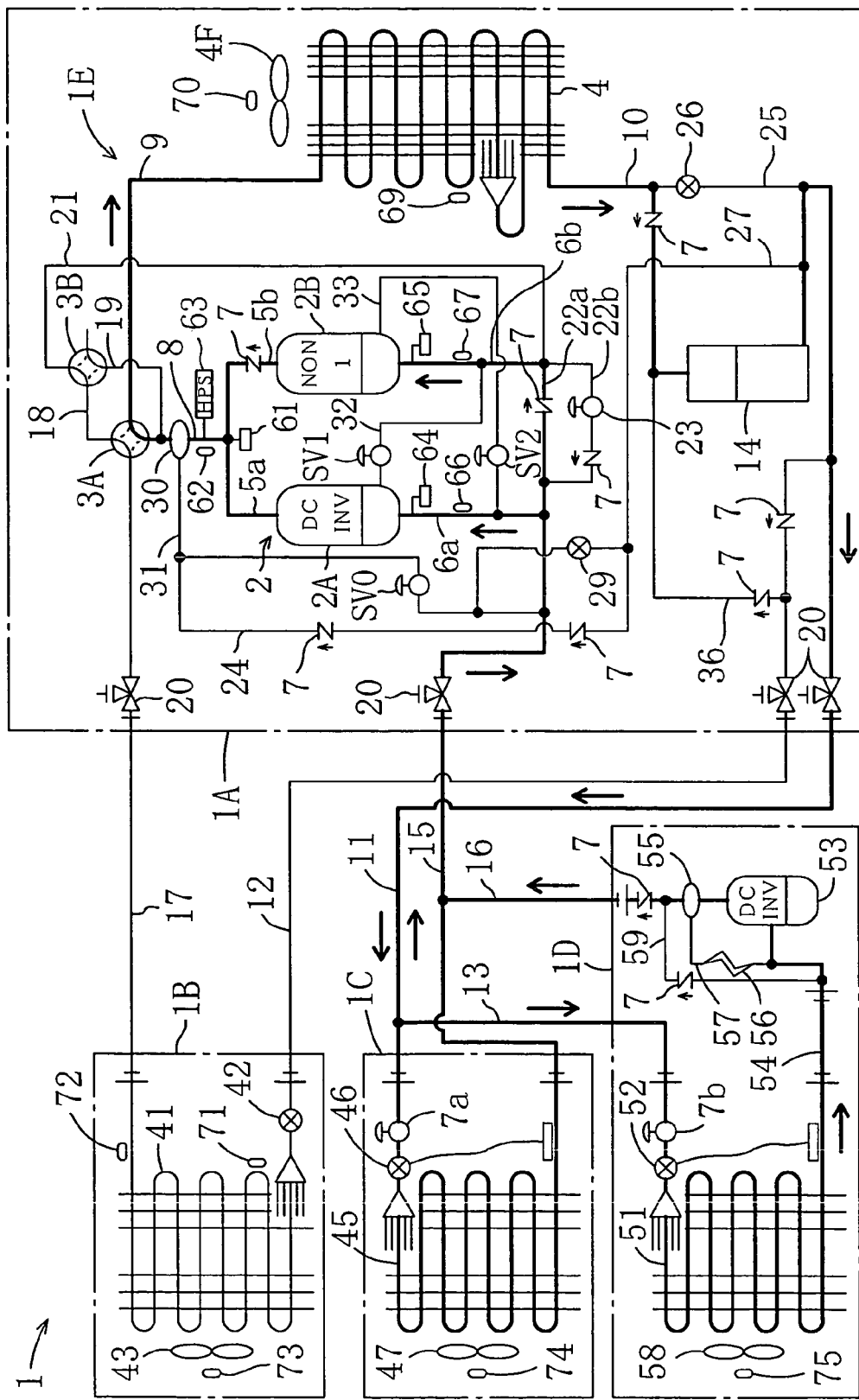
FIG. 21 is a diagram illustrating a refrigerant flow in the refrigerant circuit shown in FIG. 15 at the time of a first pattern for an freezing operation mode.
Figure 22:
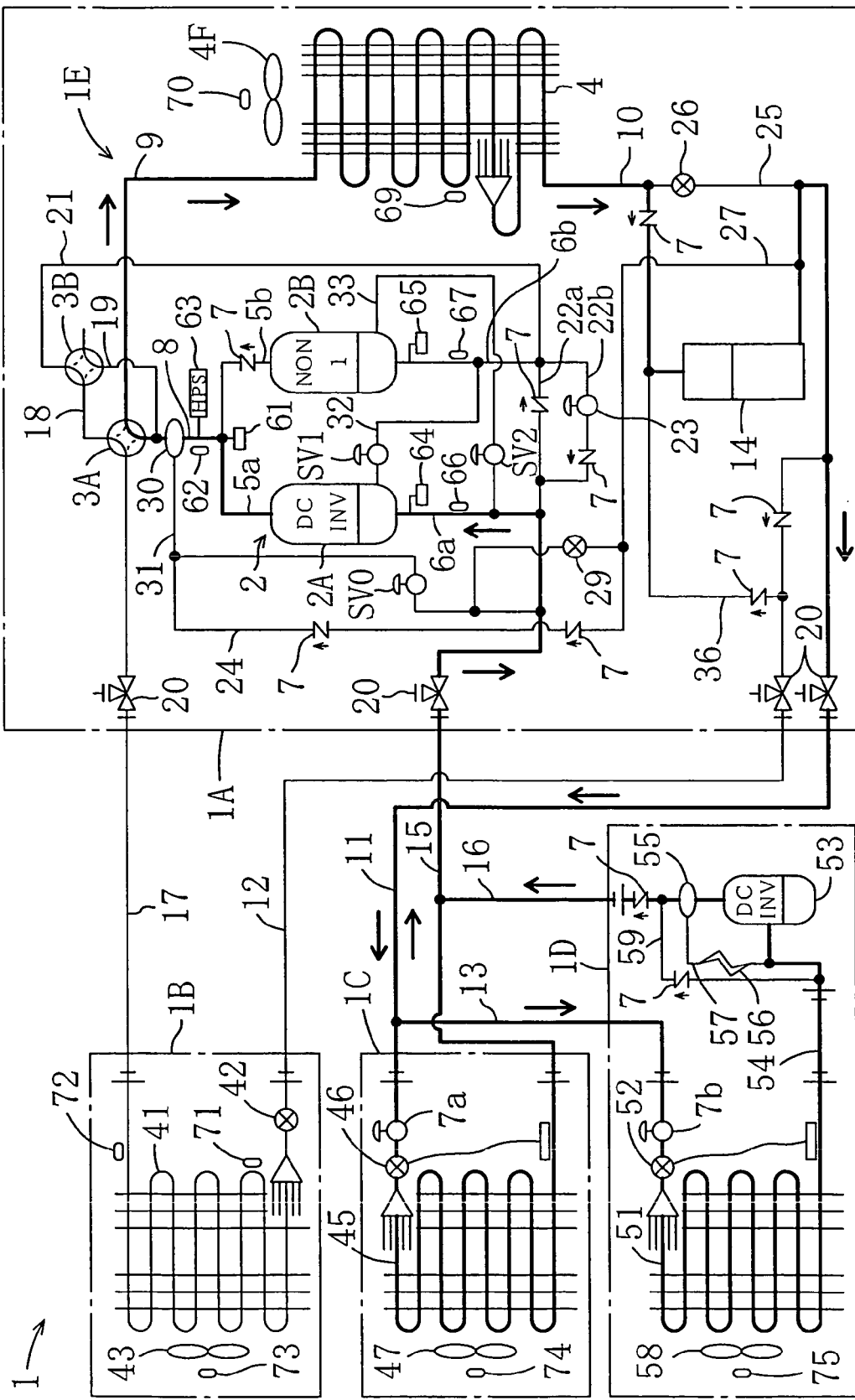
FIG. 22 is a diagram illustrating a refrigerant flow in the refrigerant circuit shown in FIG. 15 at the time of a second pattern for the freezing operation mode.
Figure 23:
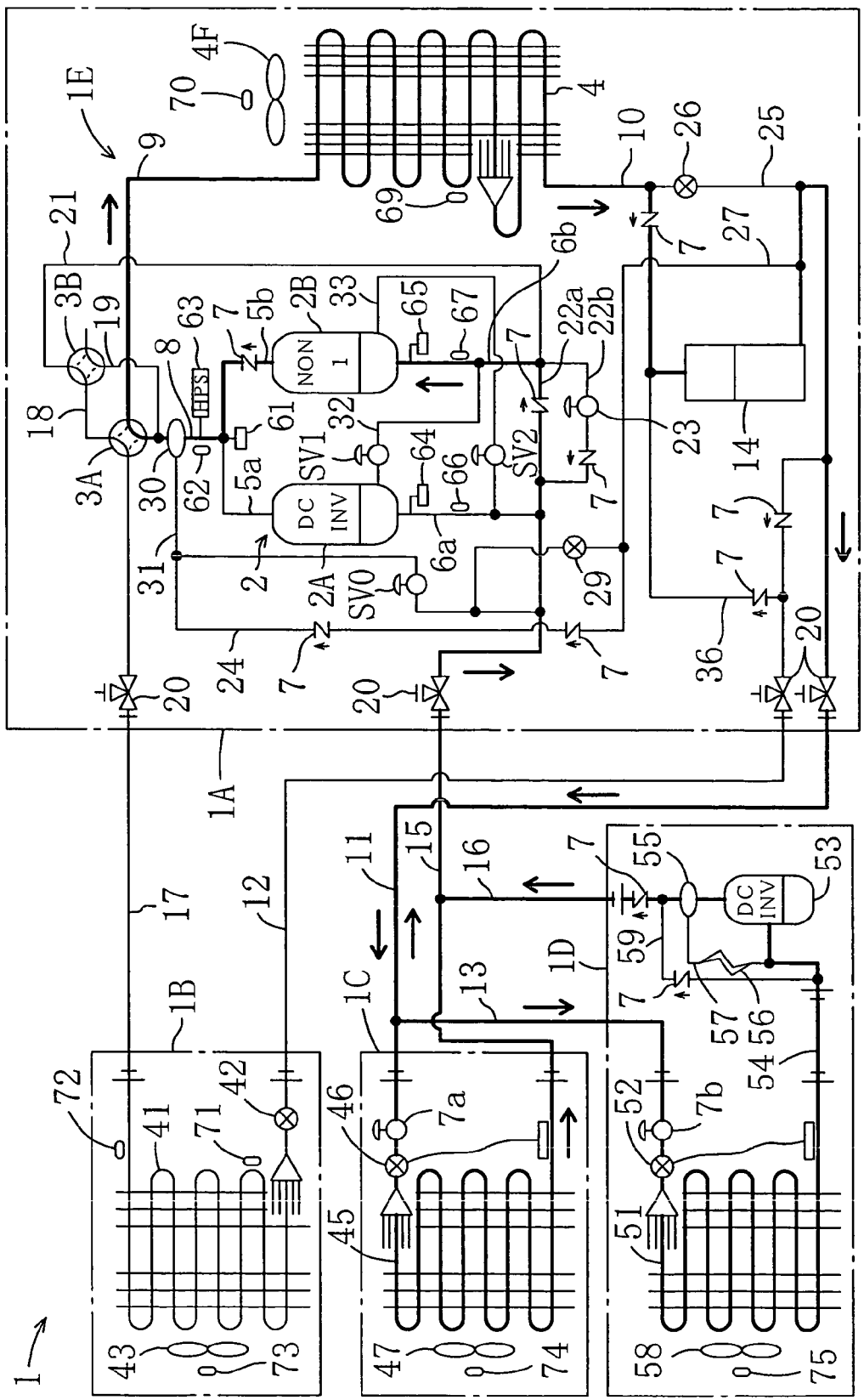
FIG. 23 is a diagram illustrating a refrigerant flow in the refrigerant circuit shown in FIG. 15 at the time of a third pattern for the freezing operation mode.

At the time of the freezing operation, there are provided a first pattern shown in FIG. 21 for driving the inverter compressor (2A) and the non-inverter compressor (2B), a second pattern shown in FIG. 22 for driving only the inverter compressor (2A) and a third pattern shown in FIG. 23 for driving only the non-inverter compressor (2B) when the inverter compressor (2A) is broken. The operation is usually performed in the second pattern. The first pattern is performed at the time of high load. The third pattern is performed when the inverter compressor (2A) is broken.

During the freezing operation, the booster compressor (53) is basically driven in all three operation patterns.

First Pattern

The first pattern for the freezing operation shown in FIG. 21 will be firstly described.

The first four-way selector valve (3A) and the second four-way selector valve (3B) are switched to be in the first state. The solenoid valve (7a) of the cold-storage unit (1C) and the solenoid valve (7b) of the freezing unit (1D) are opened, while the outdoor expansion valve (26) and the indoor expansion valve (42) are closed. The electronic expansion valve (29) of the liquid injection pipe (27) is controlled so as to have a predetermined opening in order to control a degree of superheat for sucked refrigerant. The solenoid valve (23) for the second communication pipe (22b) is closed.

At the time of stopping cooling in the cold-storage unit (1C), the solenoid valve (7a) is closed. At the time of stopping cooling in the freezing unit (1D), the solenoid valve (7b) is closed and the booster compressor (53) is stopped.

Under this state, a refrigerant discharged from the inverter compressor (2A) and the non-inverter compressor (2B) flows from the first four-way selector valve (3A) through the outdoor gas pipe (9) into the outdoor heat exchanger (4) and then is condensed therein. The condensed liquid refrigerant flows through the liquid pipe (10) and the receiver (14) into the first communication liquid pipe (11). Then, a part of the condensed liquid refrigerant flows through the cold-storage expansion valve (46) into the cold-storage heat exchanger (45) and then is evaporated therein.

The other part of the liquid refrigerant flowing in the first communication liquid pipe (11) flows through the branch liquid pipe (13) and the freezing expansion valve (52) into the freezing heat exchanger (51) and then is evaporated therein. The gas refrigerant evaporated in the freezing heat exchanger (51) is sucked by the booster compressor (53), compressed thereby and then discharged into the branch gas pipe (16).

The gas refrigerant evaporated by the cold-storage heat exchanger (45) joins the gas refrigerant discharged from the booster compressor (53) at the low-pressure gas pipe (15). A part of the joined gas refrigerant returns to the inverter compressor (2A) and the remainder thereof returns through the first communication pipe (22a) to the non-inverter compressor (2B). By the refrigerant repeating such circulation, the interiors of cold-storage showcases and freezing showcases are cooled.

A degree-of-superheat control utilizing a temperature sensing bulb is performed for the opening of the cold-storage expansion valve (46) and the freezing expansion valve (52). This is similarly performed in the following operation patterns.

Second Pattern

In accordance with the second pattern for the freezing operation, as shown in FIG. 22, only the inverter compressor (2A) is activated and the non-inverter compressor (2B) is stopped. Settings for valves are the same as those in the first pattern.

Under this state, a refrigerant discharged from the inverter compressor (2A) is circulated, as in the first pattern, in the refrigerant circuit (1E) with the outdoor heat exchanger (4) being a condenser and the cold-storage heat exchanger (45) and the freezing heat exchanger (51) being evaporators. The refrigerant evaporated in the cold-storage heat exchanger (45) and the freezing heat exchanger (51) returns from the low-pressure gas pipe (15) only to the inverter compressor (2A).

Third Pattern

In accordance with the third pattern for the freezing operation, as shown in FIG. 23, only the non-inverter compressor (2B) is driven and the inverter compressor (2A) is stopped. The third pattern is the same as the first pattern with respect to settings for the valves except that the inverter compressor (2A) is stopped.

Under this state, a refrigerant discharged from the non-inverter compressor (2B) circulates, as in the first and second patterns, in the refrigerant circuit (1E) with the outdoor heat exchanger (4) being a condenser and the cold-storage heat exchanger (45) and the freezing heat exchanger (51) being evaporators. The refrigerant evaporated in the cold-storage heat exchanger (45) and the freezing heat exchanger (51) returns from the low-pressure gas pipe (15) through the first communication pipe (22a) only to the non-inverter compressor (2B). In the third pattern also, by the circulation of the refrigerant, the interiors of cold-storage showcases and freezing showcases can be cooled.

As described above, at the time of the freezing operation, there are provided three operation patterns, i.e., the first pattern of using both of the inverter compressor (2A) and the non-inverter compressor (2B), the second pattern of using only the inverter compressor (2A) and the third pattern of using only the non-inverter compressor (2B). The operation is usually performed in the second pattern of using only the inverter compressor (2A). When the inverter compressor (2A) is broken, the third pattern of using the non-inverter compressor (2B) is performed. Thus, the freezing operation can be continued. As a result, in accordance with this second embodiment, even if the inverter compressor (2A) is damaged in an apparatus which usually performs cold-storage/freezing in the inverter compressor, cold-storage/freezing can be continued.

<④ Air-Heating Operation>

Figure 24:
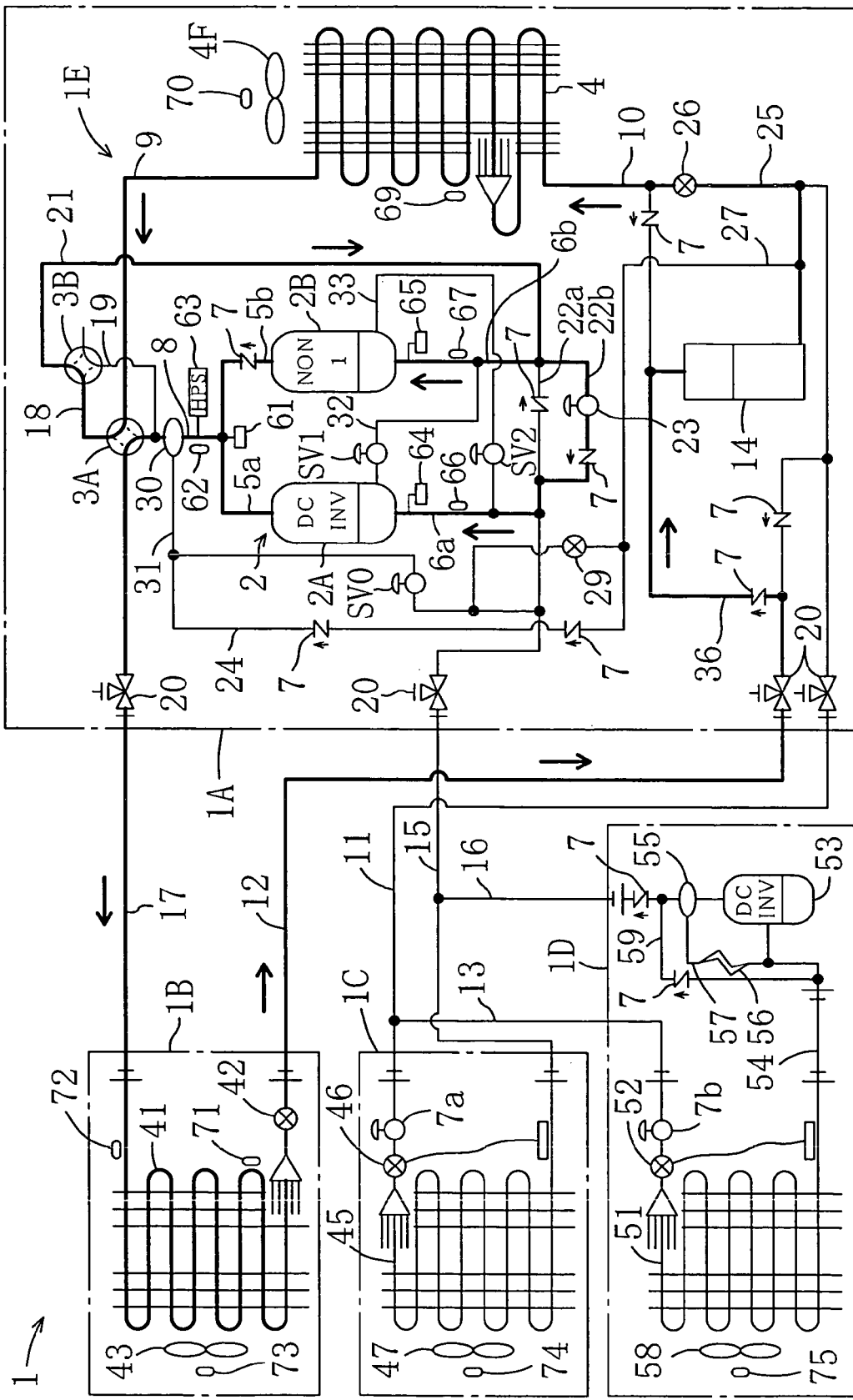
FIG. 24 is a diagram illustrating a refrigerant flow in the refrigerant circuit shown in FIG. 15 at the time of a first pattern for an air-heating operation mode.
Figure 25:
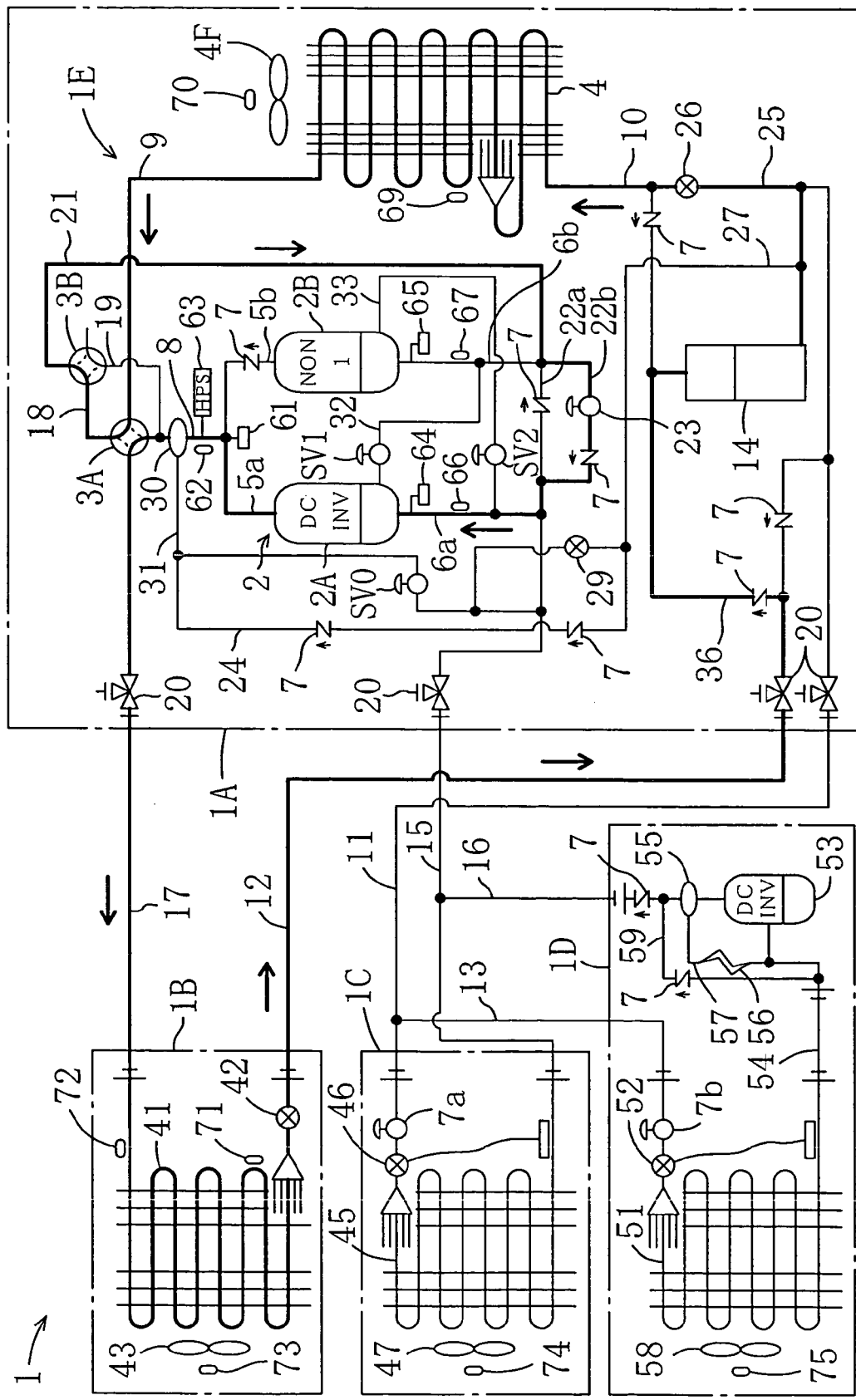
FIG. 25 is a diagram illustrating a refrigerant flow in the refrigerant circuit shown in FIG. 15 at the time of a second pattern for the air-heating operation mode.
Figure 26:
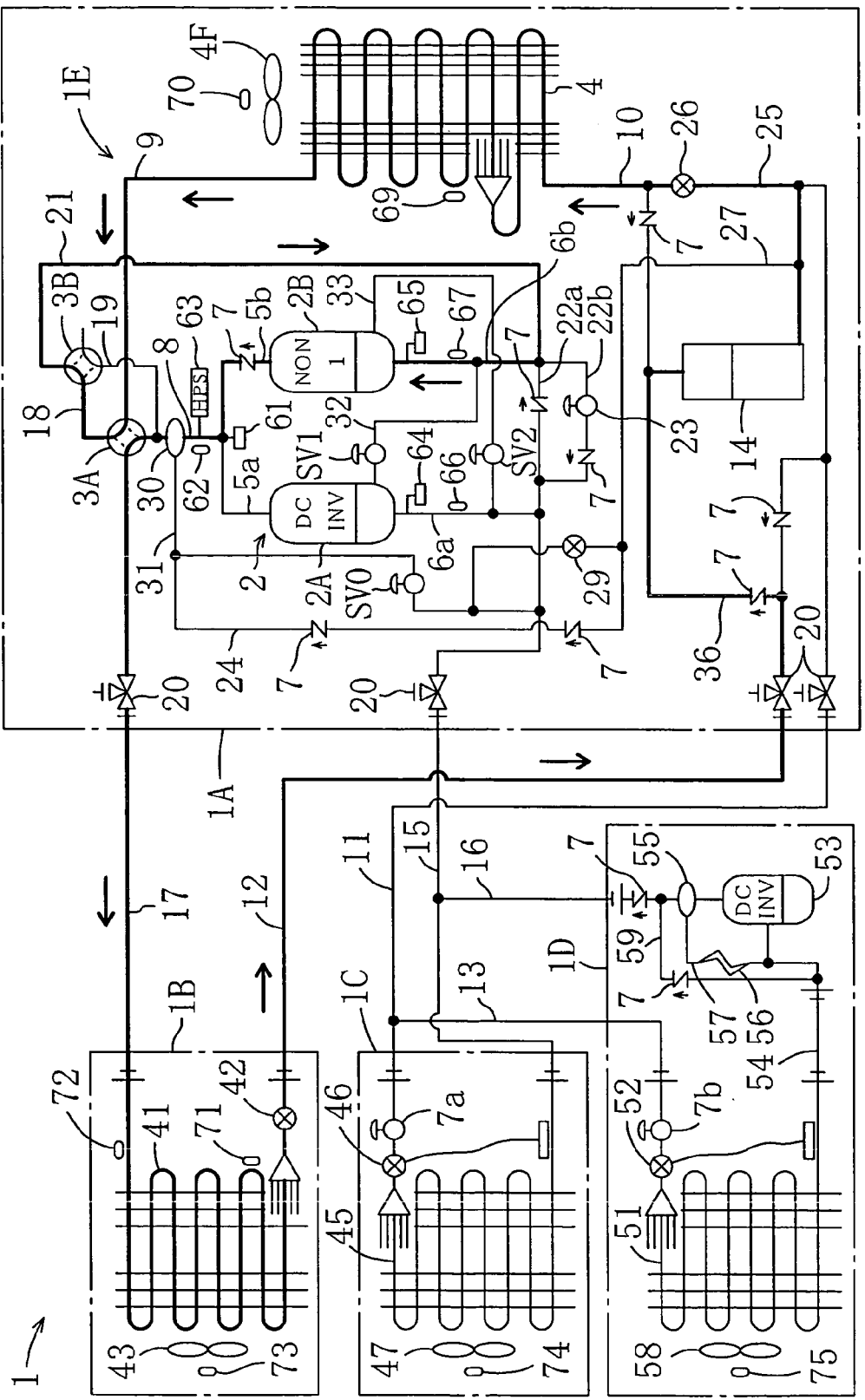
FIG. 26 is a diagram illustrating a refrigerant flow in the refrigerant circuit shown in FIG. 15 at the time of a third pattern for the air-heating operation mode.

In accordance with the air-heating operation, there are provided three patterns, i.e., a first pattern for driving the inverter compressor (2A) and the non-inverter compressor (2B) as shown in FIG. 24, a second pattern for driving only the inverter compressor (2A) as shown in FIG. 25 and a third pattern for driving only the non-inverter compressor (2B) if the inverter compressor (2A) is broken, as shown in FIG. 26. Also in the case of the air-heating operation, the operation is usually performed in the second pattern. The first pattern is performed at the time of high load. The third pattern is performed when the inverter compressor (2A) is broken.

First Pattern

In the first pattern, as shown by the solid lines in FIG. 24, the first four-way selector valve (3A) is switched to be in the second state, and the second four-way selector valve (3B) is switched to be in the first state. The solenoid valve (7a) in the cold-storage unit (1C) and the solenoid valve (7b) in the freezing unit (1D) are closed, and the openings of the outdoor expansion valve (26) and the indoor expansion valve (42) are controlled. The solenoid valve (23) for the second communication pipe (22b) is opened, and the electronic expansion valve (29) of the liquid injection pipe (27) is closed.

Under this state, a refrigerant discharged from the inverter compressor (2A) and the non-inverter compressor (2B) flows from the first four-way selector valve (3A) through the communication gas pipe (17) into the indoor heat exchanger (41) and then is condensed. The condensed liquid refrigerant flows from the second communication liquid pipe (12) through the branch liquid pipe (36) into the receiver (14). Then, the liquid refrigerant flows through the outdoor expansion valve (26) on the auxiliary liquid pipe (25) into the outdoor heat exchanger (4) and then is evaporated therein. The evaporated gas refrigerant flows from the outdoor gas pipe (9) through the first four-way selector valve (3A) and the second four-way selector valve (3B). Then, a part of the gas refrigerant returns to the non-inverter compressor (2B). The other part thereof returns to the inverter compressor (2A) through the second communication pipe (22b). By the refrigerant repeating such circulation, air-heating within a store is performed.

Second Pattern

In accordance with the second pattern for the air-heating operation, as shown in FIG. 25, only the inverter compressor (2A) is driven and the non-inverter compressor (2B) is stopped. Settings for the valves are the same as those of the first pattern.

Under this state, a refrigerant discharged from the inverter compressor (2A) is circulated in the refrigerant circuit (1E) with the indoor heat exchanger (41) being a condenser and the outdoor heat exchanger (4) being an evaporator as in the first pattern. The refrigerant evaporated in the outdoor heat exchanger (4) flows from the outdoor gas pipe (9) through the first four-way selector valve (3A) and the second four-way selector valve (3B). Further, the refrigerant returns through the second communication pipe (22b) only to the inverter compressor (2A). In this case also, by the circulation of the refrigerant, air-heating within a store is performed.

Third Pattern

In the third pattern for the air-heating operation, as shown in FIG. 26, only the non-inverter compressor (2B) is driven and the inverter compressor (2A) is stopped. The solenoid valve (23) for the second communication pipe (22b) is closed. Settings for other valves are the same as in the first and second patterns.

As in the first and second patterns, under this state, a refrigerant discharged from the non-inverter compressor (2B) is circulated in the refrigerant circuit (1E) with the indoor heat exchanger (41) being a condenser and the outdoor heat exchanger (4) being an evaporator. The refrigerant evaporated in the outdoor heat exchanger (4) flows from the outdoor gas pipe (9) through the first four-way selector valve (3A) and the second four-way selector valve (3B), and then returns only to the non-inverter compressor (2B). In accordance with the third pattern also, air-heating within a store is performed by the circulation of the refrigerant.

As described above, during the air-heating operation, there are provided three operation patterns, i.e., the first pattern of using the inverter compressor (2A) and the non-inverter compressor (2B), the second pattern of using only the inverter compressor (2A) and the third pattern of using only the non-inverter compressor (2B). The operation is usually performed in the second pattern of using only the inverter compressor (2A). If the inverter compressor (2A) is broken, the third pattern of using the non-inverter compressor (2B) is performed, so that the operation can be continued. Accordingly, in accordance with the second embodiment, even when the inverter compressor (2A) is broken in an apparatus which usually performs air-heating in the inverter compressor, air-heating can be continued.

<⑤> First Air-Heating/Freezing Operation>

The first air-heating/freezing operation is a 100% heat recovery operation of performing air-heating in the indoor unit (1B) and cooling in the cold-storage unit (1C) and the freezing unit (1D) without using the outdoor heat exchanger (4). In accordance with the first air-heating/freezing operation, there are provided a first pattern shown in FIG. 27 for driving the inverter compressor (2A) and the non-inverter compressor (2B), a second pattern shown in FIG. 28 for driving only the inverter compressor (2A) and a third pattern shown in FIG. 29 for driving only the non-inverter compressor (2B) when the inverter compressor (2A) is broken. At the time of such operations, the booster compressor (53) is driven.

The operation is usually performed in the first or second pattern. When the inverter compressor (2A) is broken, the operation is performed in the third pattern.

First Pattern

Figure 27:
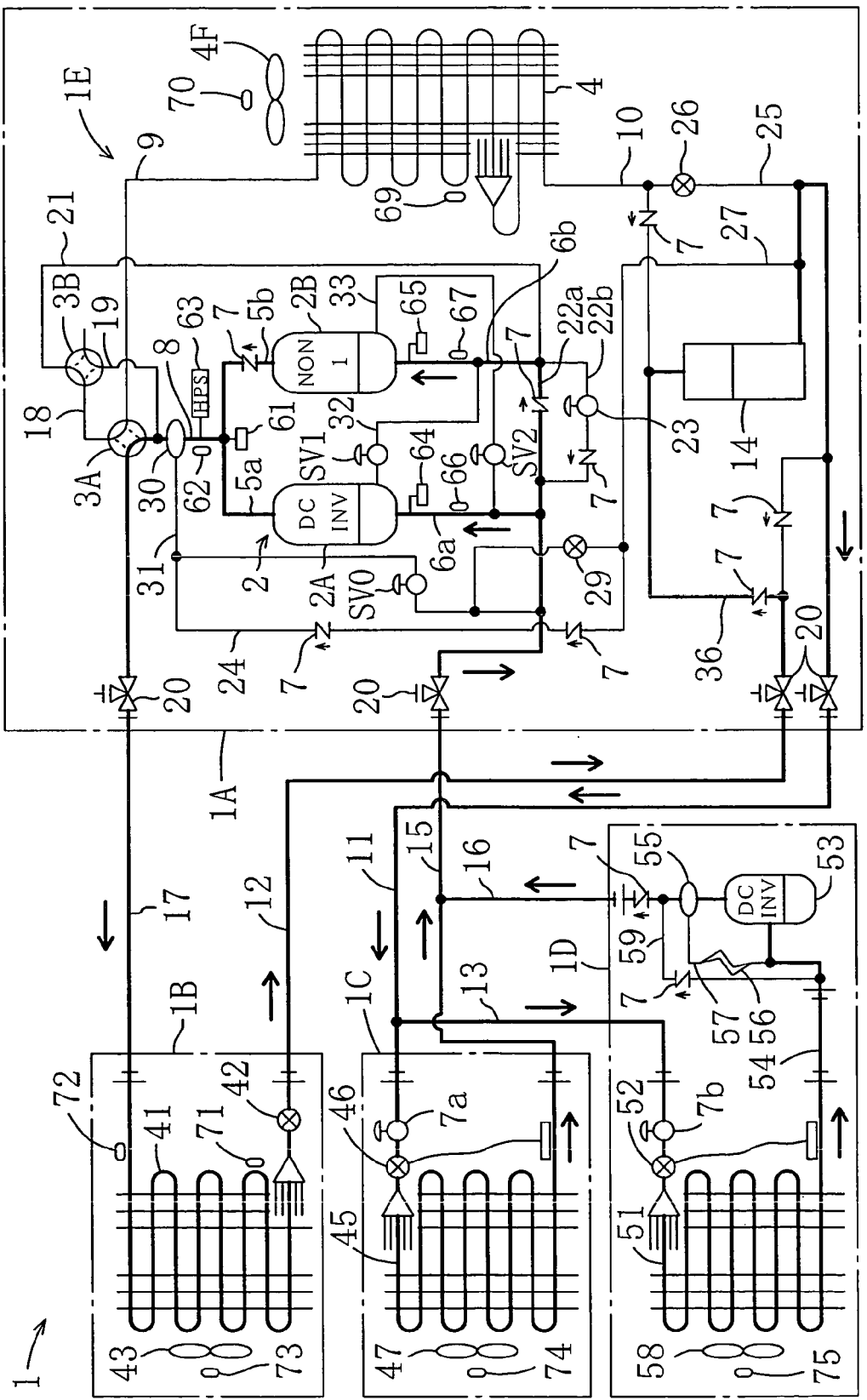
FIG. 27 is a diagram illustrating a refrigerant flow in the refrigerant circuit shown in FIG. 15 at the time of a first pattern for a first air-heating/freezing operation mode.

The first pattern for the first air-heating/freezing operation shown in FIG. 27 will be firstly described.

The first four-way selector valve (3A) is switched to be in the second state, the second four-way selector valve (3B) is switched to be in the first state. The solenoid valve (7a) in the cold-storage unit (1C) and the solenoid valve (7b) in the freezing unit (1D) are opened, and the outdoor expansion valve (26) is closed. Openings of the indoor expansion valve (42) and the electronic expansion valve (29) on the liquid injection pipe (27) are controlled to predetermined values. The solenoid valve (23) for the second communication pipe (22b) is closed.

Under this state, a refrigerant discharged from the inverter compressor (2A) and the non-inverter compressor (2B) flows from the first four-way selector valve (3A) through the communication gas pipe (17) into the indoor heat exchanger (41) and then is condensed therein. The condensed liquid refrigerant flows from the second communication liquid pipe (12) through the branch liquid pipe (36) and the receiver (14) into the first communication liquid pipe (11).

A part of the liquid refrigerant flowing in the first communication liquid pipe (11) flows through the cold-storage expansion valve (46) into the cold-storage heat exchanger (45) and then is evaporated therein. The other part of the liquid refrigerant flowing in the first communication liquid pipe (11) flows through the branch liquid pipe (13) and the freezing expansion valve (52) into the freezing heat exchanger (51) and then is evaporated therein. The gas refrigerant evaporated by the freezing heat exchanger (51) is sucked by the booster compressor (53), compressed thereby and then discharged into the branch gas pipe (16).

The gas refrigerant evaporated in the cold-storage heat exchanger (45) joins the gas refrigerant discharged from the booster compressor (53) at the low-pressure gas pipe (15). A part of the joined gas refrigerant returns to the inverter compressor (2A). The remainder thereof returns through the first communication pipe (22a) to the non-inverter compressor (2B).

By the refrigerant repeating such circulation, air-heating within a store is performed, and the interiors of cold-storage showcases and freezing showcases are cooled. In accordance with the first air-heating/freezing operation, cooling abilities (amounts of evaporation heat) of the cold-storage unit (1C) and the freezing unit (1D) are balanced with an air-heating ability (amount of condensation heat) of the indoor unit (1B), so that 100% of heat is recovered.

Second Pattern

Figure 28:
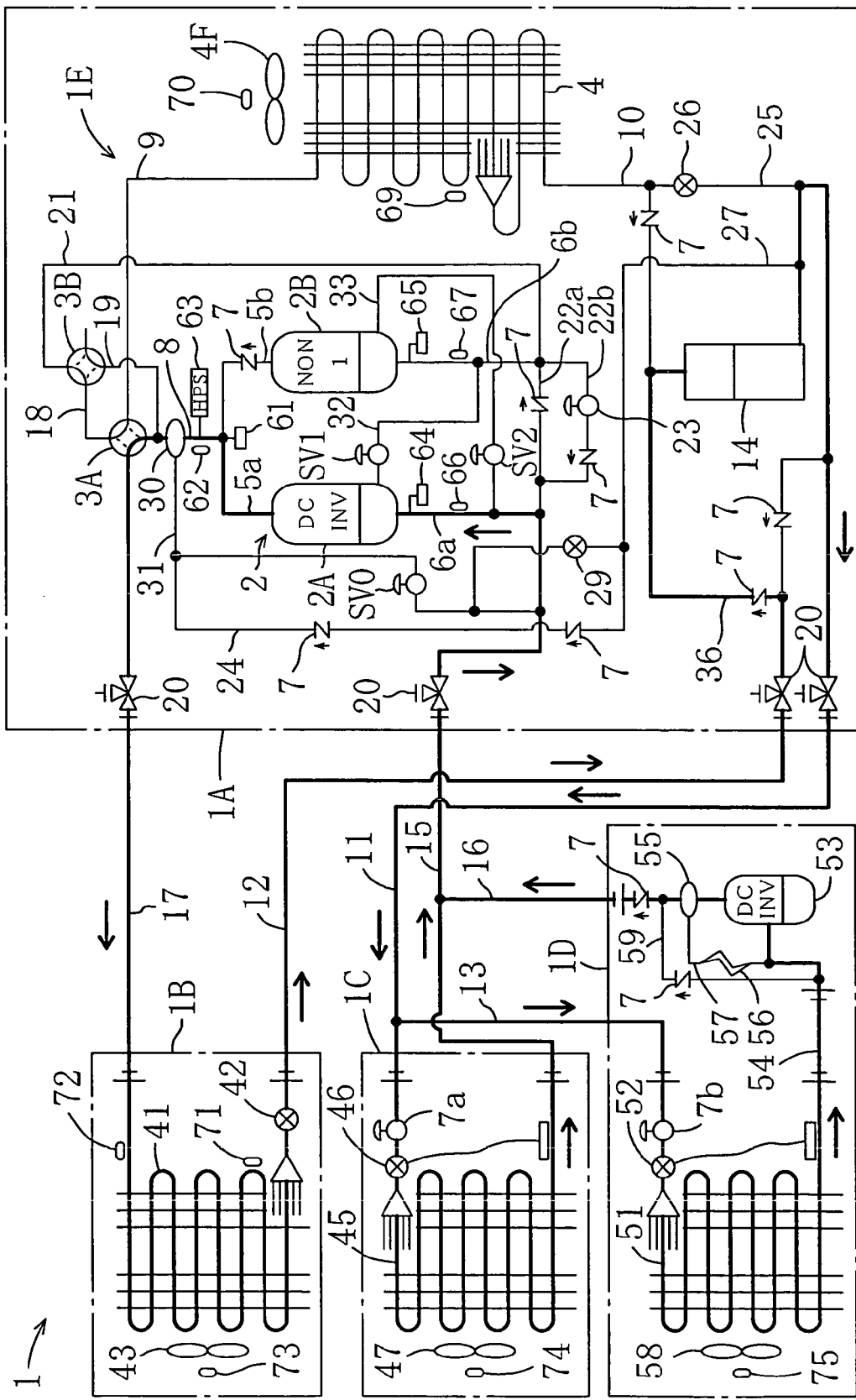
FIG. 28 is a diagram illustrating a refrigerant flow in the refrigerant circuit shown in FIG. 15 at the time of a second pattern for the first air-heating/freezing operation mode.

In accordance with the second pattern for the first air-heating/freezing operation, as shown in FIG. 28, only the inverter compressor (2A) is driven and the non-inverter compressor (2B) is stopped. Settings for valves are the same as those in the first pattern.

Under this state, as in the first pattern, a refrigerant discharged from the inverter compressor (2A) is circulated in the refrigerant circuit (1E) with the indoor heat exchanger (41) being a condenser and the cold-storage heat exchanger (45) and the freezing heat exchanger (51) being evaporators. The second pattern is different from the first pattern only in that the non-inverter compressor (2B) is not used. As in the first pattern, by the refrigerant repeating such circulation, air-heating within a store is performed and the interiors of cold-storage showcases and freezing showcases are cooled.

Third Pattern

Figure 29:
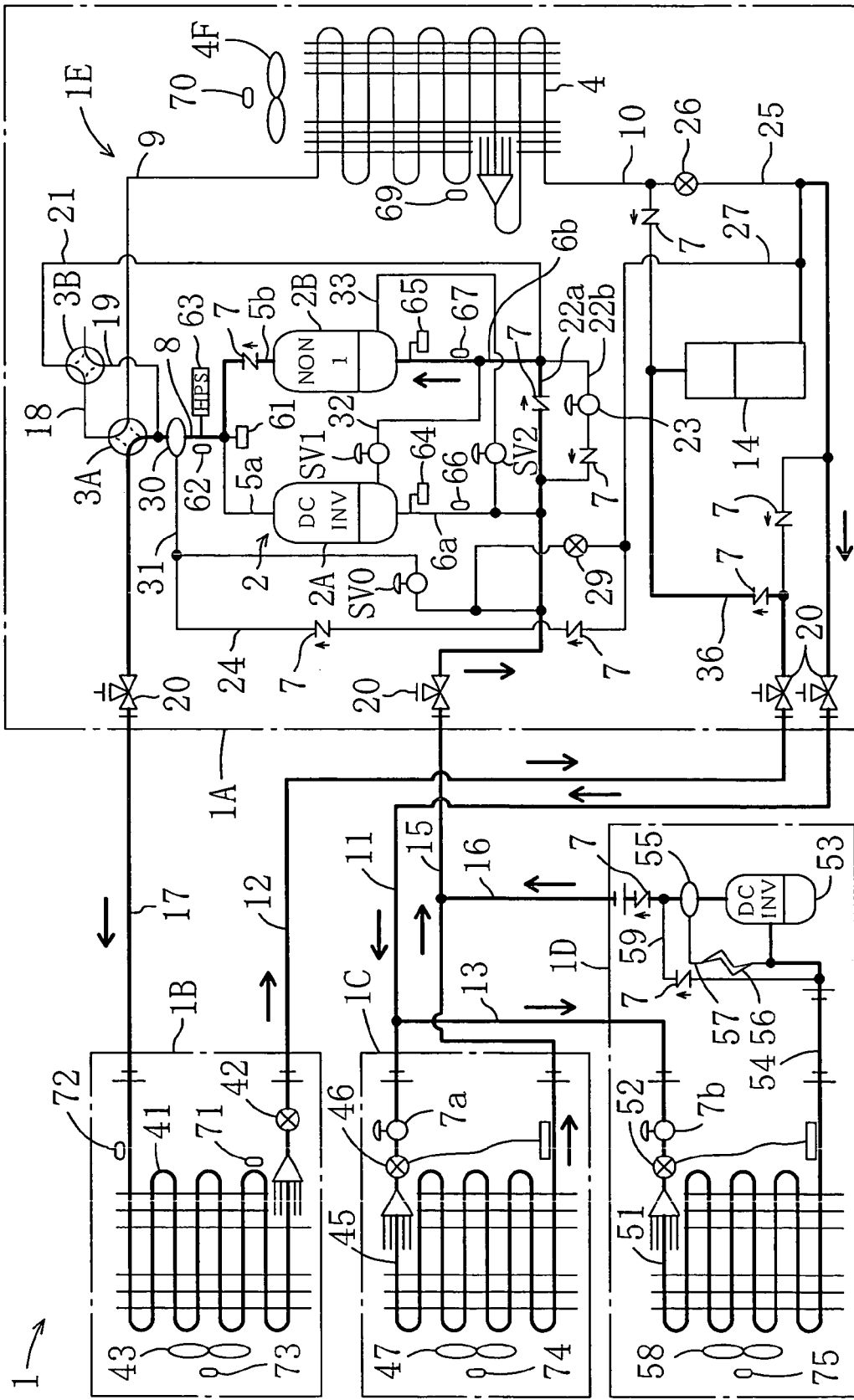
FIG. 29 is a diagram illustrating a refrigerant flow in the refrigerant circuit shown in FIG. 15 at the time of a third pattern for the first air-heating/freezing operation mode.

In accordance with the third pattern for the first air-heating/freezing operation, as shown in FIG. 29, only the non-inverter compressor (2B) is driven and the inverter compressor (2A) is stopped. Settings for valves are the same as those in the first pattern except that the inverter compressor (2A) is stopped.

Under this state, a refrigerant discharged from the non-inverter compressor (2B) is, as in the first and second patterns, circulated in the refrigerant circuit (1E) with the indoor heat exchanger (41) being a condenser and the cold-storage heat exchanger (45) and the freezing heat exchanger (51) being evaporators. The third pattern is different from the first and second patterns only in that the inverter compressor (2A) is not used. By the refrigerant being circulated, as in the first and second patterns, air-heating within a store is performed and the interiors of cold-storage showcases and freezing showcases are cooled.

As described above, in accordance with the first air-heating/freezing operation, there are provided the first pattern of using both of the inverter compressor (2A) and the non-inverter compressor (2B), the second pattern of using only the inverter compressor (2A) and the third pattern of using only the non-inverter compressor (2B). Operation is usually performed in the first pattern of using the both compressors (2A) or the second pattern of using only the inverter compressor (2A). If the inverter compressor (2A) is broken, the third pattern of using the non-inverter compressor (2B) is performed, so that the operation can be continued. Accordingly, in accordance with this embodiment, even if the inverter compressor (2A) is broken, cold-storage/freezing is not stopped and thus quality of products can be maintained. Further, air-heating within a store can be continued.

<⑥ Second Air-Heating/Freezing Operation>

Figure 30:
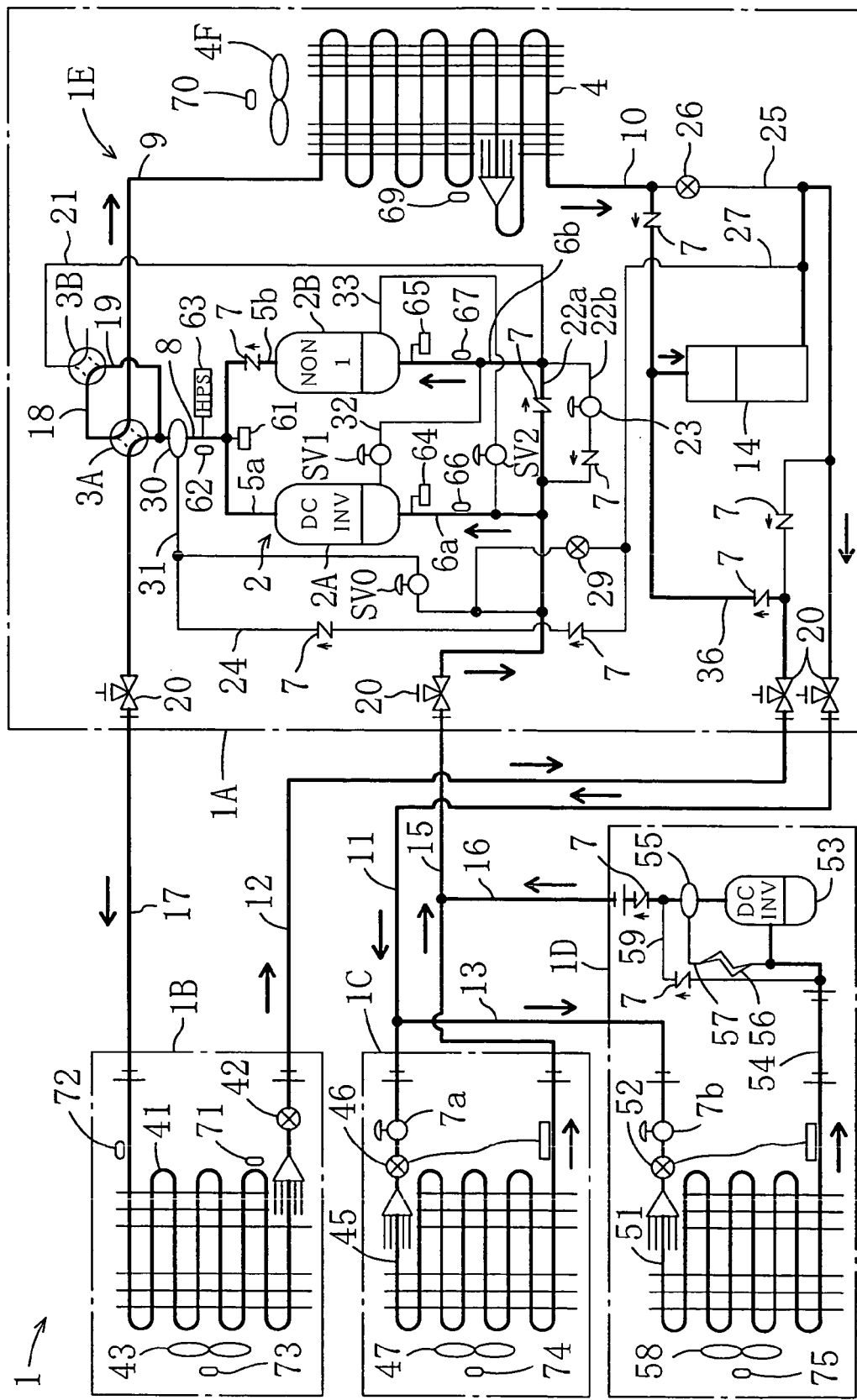
FIG. 30 is a diagram illustrating a refrigerant flow in the refrigerant circuit shown in FIG. 15 at the time of a first pattern for a second air-heating/freezing operation mode.
Figure 31:
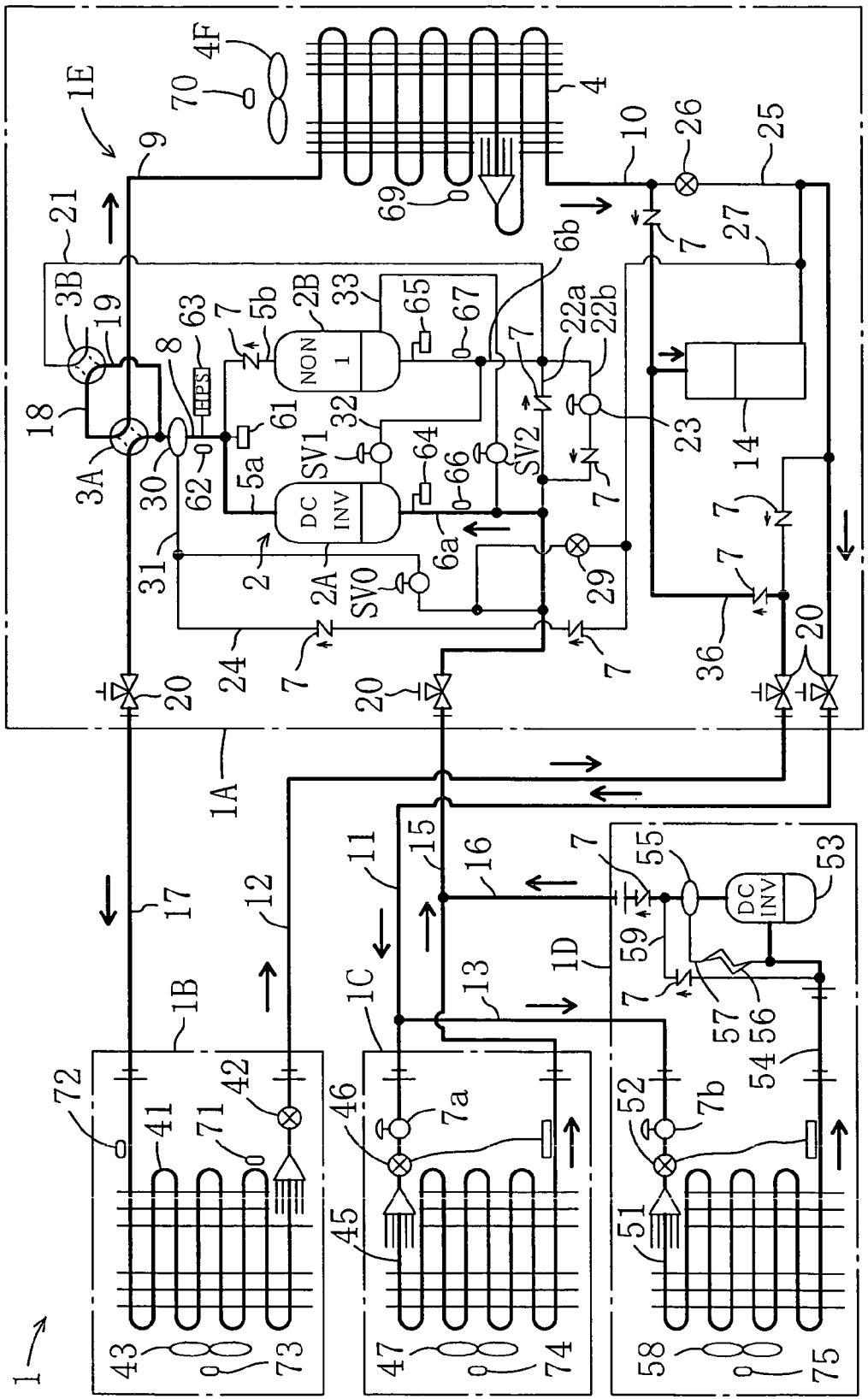
FIG. 31 is a diagram illustrating a refrigerant flow in the refrigerant circuit shown in FIG. 15 at the time of a second pattern for the second air-heating/freezing operation mode.
Figure 32:
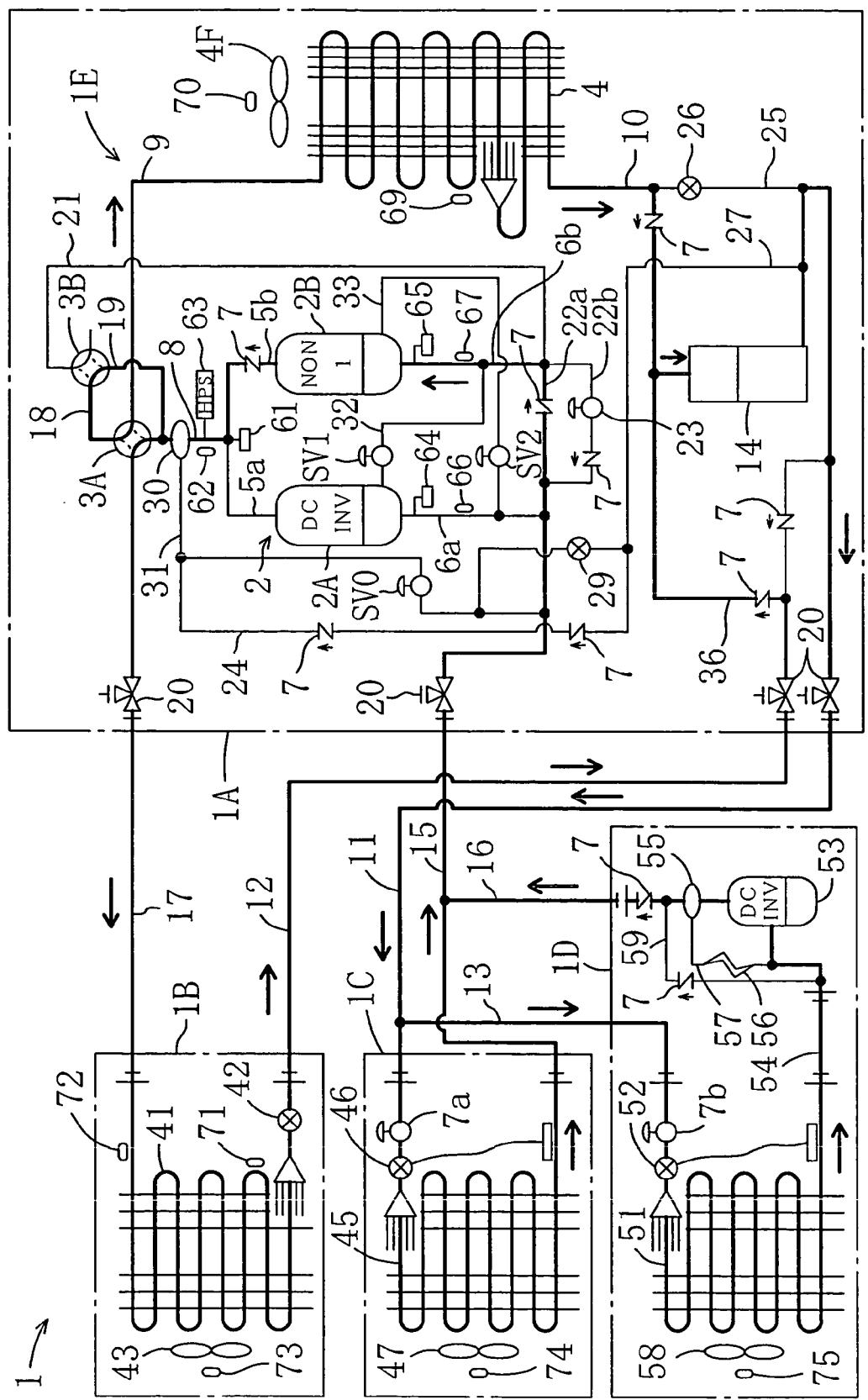
FIG. 32 is a diagram illustrating a refrigerant flow in the refrigerant circuit shown in FIG. 15 at the time of a third pattern for the second air-heating/freezing operation mode.

In accordance with the second air-heating/freezing operation performed when the air-heating ability of the indoor unit (1B) remains, during the first air-heating/freezing operation there are provided a first pattern of driving the inverter compressor (2A) and the non-inverter compressor (2B) as shown in FIG. 30, a second pattern of driving only the inverter compressor (2A) as shown in FIG. 31 and a third pattern of driving only the non-inverter compressor (2B) as shown in FIG. 32. Operation is usually performed in the second pattern. The first pattern is performed at a time of high load, and the third pattern is performed in emergencies, e.g., when the inverter compressor (2A) is broken.

The second air-heating/freezing operation is performed with the basically same settings as those in the first air-heating/freezing operation except that in the first air-heating/freezing operation, the second four-way selector valve (3B) is switched to be in the second state as shown by the solid lines in FIGS. 30 through 32.

First Pattern

In accordance with the first pattern for the second air-heating/freezing operation, a part of refrigerant discharged from the inverter compressor (2A) and the non-inverter compressor (2B) flows in the indoor heat exchanger (41) and then is condensed therein as in the first air-heating/freezing operation. The condensed liquid refrigerant flows from the second communication liquid pipe (12) through the branch liquid pipe (36) and the receiver (14) to the first communication liquid pipe (11).

The other part of the refrigerant discharged from the inverter compressor (2A) and the non-inverter compressor (2B) flows from the auxiliary gas pipe (19) through the second four-way selector valve (3B) and the first four-way selector valve (3A) to the outdoor gas pipe (9). Then, the refrigerant is condensed in the outdoor heat exchanger (4). The condensed liquid refrigerant flows through the liquid pipe (10), joins the liquid refrigerant from the second communication liquid pipe (12). The joined refrigerant flows through the receiver (14) to the first communication liquid pipe (11).

A part of the liquid refrigerant flowing in the first communication liquid pipe (11) flows in the cold-storage heat exchanger (45) and is evaporated therein. The other part of the liquid refrigerant flowing in the first communication liquid pipe (11) flows in the freezing heat exchanger (51), is evaporated therein and sucked into the booster compressor (53). The gas refrigerant evaporated in the cold-storage heat exchanger (45) joins the gas refrigerant discharged from the booster compressor (53) at the low-pressure gas pipe (15). A part of the joined refrigerant returns to the inverter compressor (2A), and the remainder thereof returns through the first communication pipe (22a) to the non-inverter compressor (2B).

By repeating such circulation, air-heating within a store is performed, and the interiors of cold-storage showcases and freezing showcases are cooled. Namely, in accordance with the this operation mode, cooling abilities (amounts of evaporation heat) of the cold-storage unit (1C) and the freezing unit (1D) are not balanced with the air-heating ability (amount of condensation heat) of the indoor unit (1B), and remained heat of condensation is discharged outdoor by the outdoor heat exchanger (4), so that air-heating and cold-storage/freezing are performed.

Second Pattern

In accordance with the second pattern for the second air-heating/freezing operation, as shown in FIG. 31, only the inverter compressor (2A) is driven and the non-inverter compressor (2B) is stopped. Settings for the valves are the same as those of the first pattern.

Under this state, a refrigerant discharged from the inverter compressor (2A) is circulated in the refrigerant circuit (1E) with the indoor heat exchanger (41) and the outdoor heat exchanger (4) being condensers and the cold-storage heat exchanger (45) and the freezing heat exchanger (51) being evaporators as in the first pattern. The second pattern is different from the first pattern only in that the non-inverter compressor (2B) is not used. As in the first pattern, by the circulation of the refrigerant, air-heating within a store is performed and the interiors of cold-storage showcases and freezing showcases are cooled.

Third Pattern

In accordance with the third pattern for the second air-heating/freezing operation, as shown in FIG. 32, only the non-inverter compressor (2B) is driven and the inverter compressor (2A) is stopped. Except that the inverter compressor (2A) is stopped, settings for valves are the same as in the first pattern.

Under this state, a refrigerant discharged from the non-inverter compressor (2B) is circulated in the refrigerant circuit (1E) with the indoor heat exchanger (41) and the outdoor heat exchanger (4) being condensers and the cold-storage heat exchanger (45) and the freezing heat exchanger (51) being evaporators as in the first and second patterns. The third pattern is different from the first and second patterns only in that the inverter compressor (2A) is not used. By the circulation of the refrigerant, air-heating within a store is performed, and the interiors of cold-storage showcases and freezing showcases are cooled.

As described above, in accordance with the second air-heating/freezing operation, there are provided three operation patterns, i.e., the first pattern of using the inverter compressor (2A) and the non-inverter compressor (2B), the second pattern of using only both the inverter compressor (2A) and the third pattern of using only the non-inverter compressor (2B). Operation is usually performed in the second pattern of using only the inverter compressor (2A). If the inverter compressor (2A) is broken, the third pattern is performed by the non-inverter compressor (2B), so that the operation can be continued. In accordance with this embodiment, even if the inverter compressor (2A) is broken, cold-storage/freezing is not stopped and thus quality of products can be maintained. Further, air-heating within the store can be continued.

<⑦ Third Air-Heating/Freezing Operation>

Figure 33:
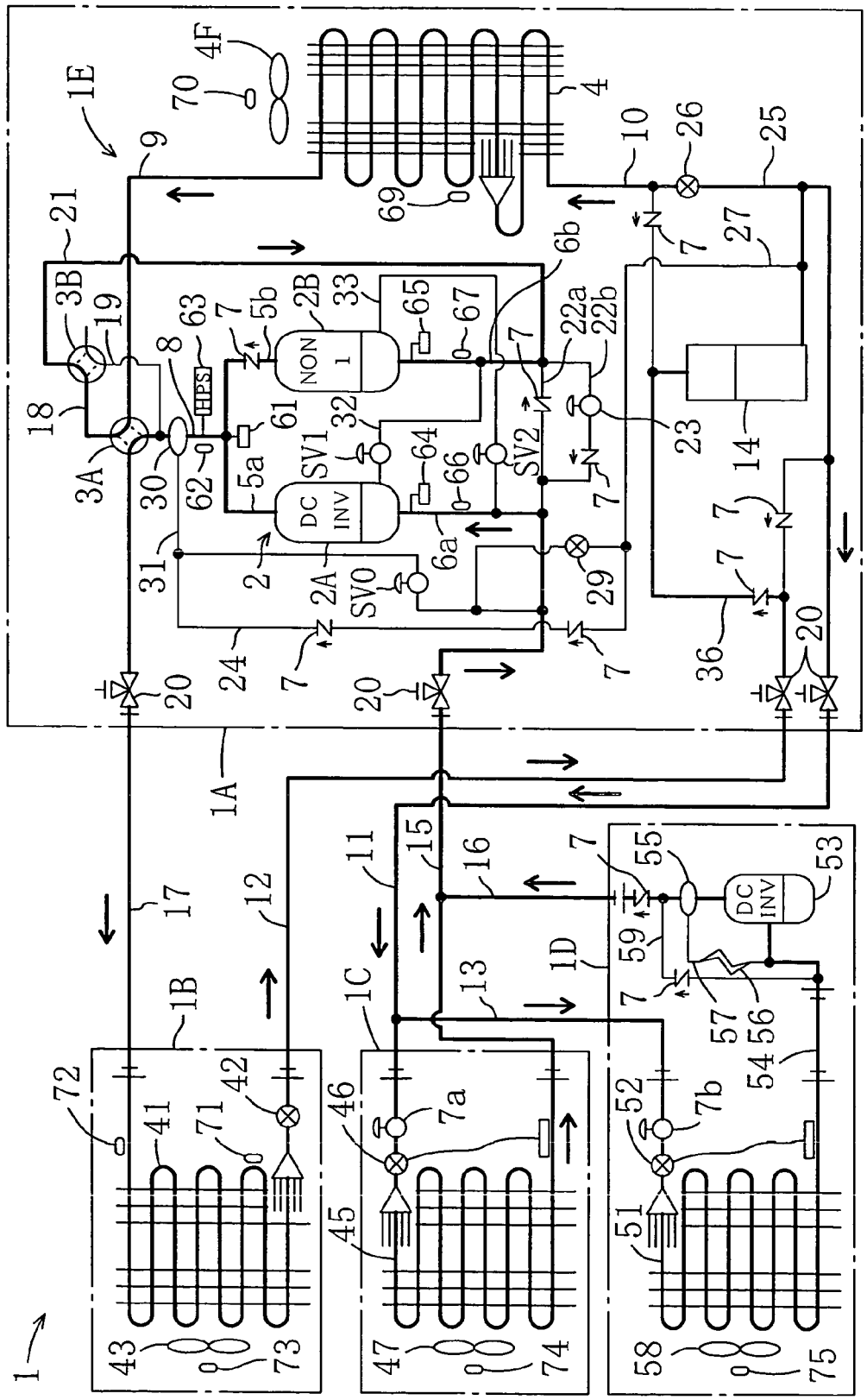
FIG. 33 is a diagram illustrating a refrigerant flow in the refrigerant circuit shown in FIG. 15 at the time of a first pattern for a third air-heating/freezing operation mode.
Figure 34:
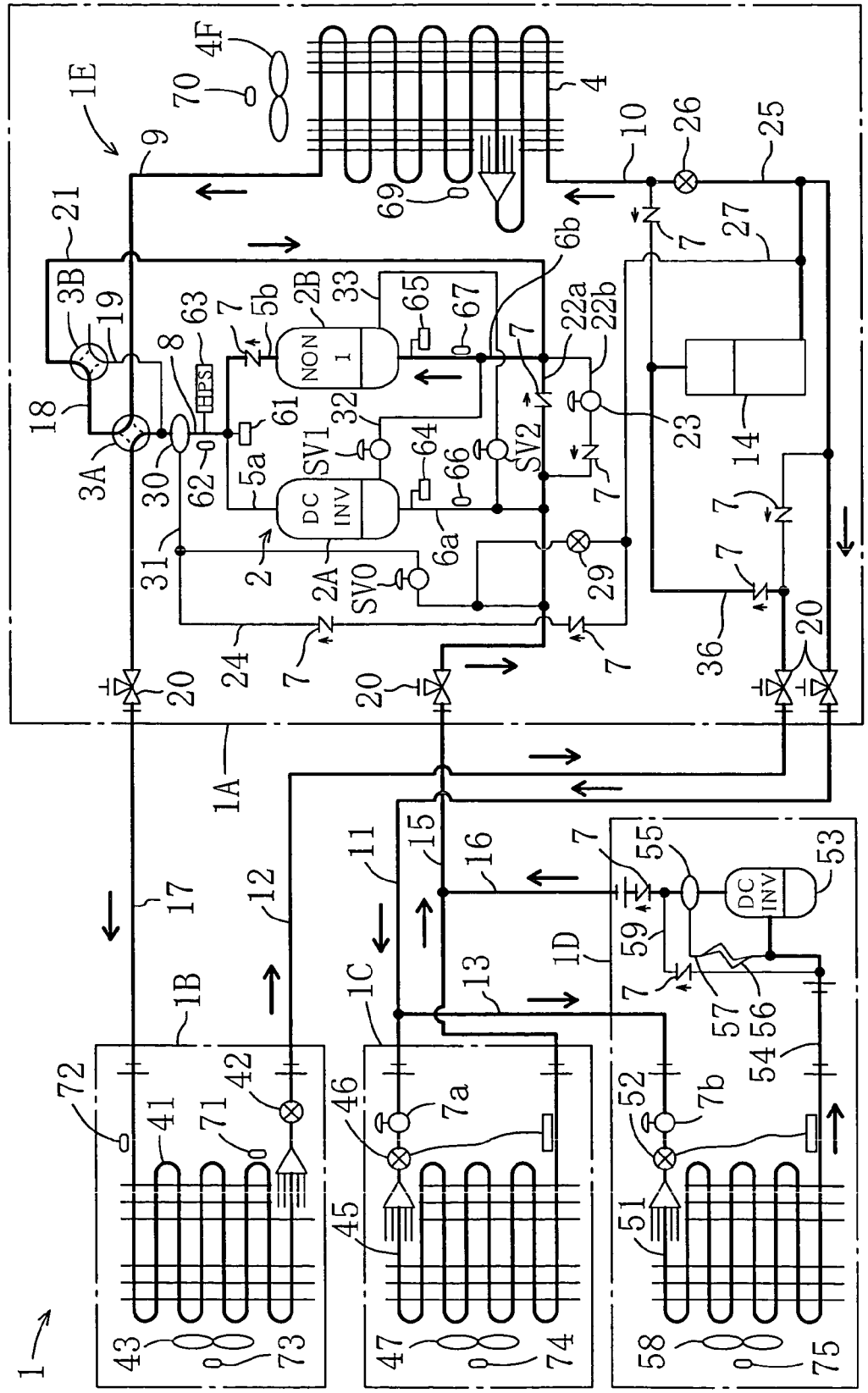
FIG. 34 is a diagram illustrating a refrigerant flow in the refrigerant circuit shown in FIG. 15 at the time of a second pattern for the third air-heating/freezing operation mode.

In accordance with the third air-heating/freezing operation performed when the air-heating ability of the indoor unit (1B) is insufficient during the first air-heating/freezing operation, there are provided a first pattern of driving the inverter compressor (2A) and the non-inverter compressor (2B) as shown in FIG. 33 and a second pattern of stopping the inverter compressor (2A) and driving only the non-inverter compressor (2B) as shown in FIG. 34. In both cases of the first and second patterns, the booster compressor (53) is driven.

Operation is usually performed in the first pattern. The second pattern is performed as an emergency operation performed when the inverter compressor (2A) is broken.

First Pattern

In the third air-heating/freezing operation, settings for the valve are the same as those of the first air-heating/freezing operation except that the outdoor expansion valve (26) is controlled so as to have a predetermined opening.

As shown in FIG. 33, a refrigerant discharged from the inverter compressor (2A) and the non-inverter compressor (2B) flows from the communication gas pipe (17) into the indoor heat exchanger (41) and then is condensed therein. The condensed liquid refrigerant flows from the second communication gas pipe (12) through the branch liquid pipe (36) into the receiver (14).

Then, a part of the liquid refrigerant from the receiver (14) flows through the first communication liquid pipe (11). A part of the liquid refrigerant flowing in the first communication liquid pipe (11) flows in the cold-storage heat exchanger (45) and is evaporated therein. The other part of the liquid refrigerant flowing in the first communication liquid pipe (11) flows in the freezing heat exchanger (51), is evaporated therein, and sucked into the booster compressor (53). The gas refrigerant evaporated by the cold-storage heat exchanger (45) joins the gas refrigerant discharged from the booster compressor (53) at the low-pressure gas pipe (15), and the joined gas refrigerant returns to the inverter compressor (2A).

In the case of the operation condition in which the pressure of the non-inverter compressor (2B) side is lower than that of the inverter compressor (2A) side, a part of the refrigerant flowing in the low-pressure gas pipe (15) flows through the first communication pipe (22a) and is sucked into the non-inverter compressor (2B).

The other part of the liquid refrigerant from the receiver (14) flows through the liquid pipe (10) into the outdoor heat exchanger (4) and then is evaporated therein. The evaporated gas refrigerant flows from the outdoor gas pipe (9) through the first four-way selector valve (3A) and the second four-way selector valve (3B), and returns to the non-inverter compressor (2B).

In accordance with the third air-heating/freezing operation, by repeating such circulation, air-heating within a store is performed and the interiors of cold-storage showcases and freezing showcases are cooled.

Second Pattern

The second pattern for the third air-heating/freezing operation is the same as the first pattern except that the inverter compressor (2A) is stopped. Setting for the valves are the same as those of the first pattern.

As shown in FIG. 34, a refrigerant discharged from the non-inverter compressor (2B) is circulated in the refrigerant circuit with the indoor heat exchanger (41) being a condenser and the cold-storage heat exchanger (45), the freezing heat exchanger (51) and the outdoor heat exchanger (4) being evaporators. The refrigerant evaporated in the cold-storage heat exchanger (45) and the freezing heat exchanger (51) and then flown into the low-pressure gas pipe (15) and the refrigerant evaporated in the outdoor heat exchanger (4) are sucked only into the non-inverter compressor (2B).

By repeating such circulation, air-heating within a store is performed and the interiors of cold-storage showcases and freezing showcases are cooled. Namely, in accordance with the third air-heating/freezing operation, cooling abilities (amounts of evaporation heat) of the cold-storage unit (1C) and the freezing unit (1D) are not balanced with the air-heating ability (amount of condensation heat) of the indoor unit (1B) and insufficient evaporation heat is obtained from the outdoor heat exchanger (4). In this way, air heating and cold-storage/freezing can be performed at the same time.

Effects of Second Embodiment

In accordance with the second embodiment, as shown in FIGS. 16 through 34, seven kinds of operation modes can be performed. Especially, for ① air-cooling operation, ③ freezing operation, ④ air-heating operation, ⑤ first air-heating/freezing operation and ⑥ second air-heating/freezing operation, either of the compressors (2A, 2B) may be used or the both compressors may be used. For ② air-cooling/freezing operation and ⑦ third air-heating/freezing operation, the both compressors (2A, 2B) may be used in combination or only the non-inverter compressor (2B) may be used.

Accordingly, in accordance with the second embodiment, various operations can be performed in the air-conditioning channel, as well as in the cold-storage/freezing channel. Thus, even if one of the two compressors (2A, 2B) is broken during the air-conditioning operation, the operation can be continued.

In the compression mechanism formed of two compressors (2A, 2B), if one of the compressors (2A, 2B) is broken, the operation can be continued by another one. Thus, as in the first embodiment, as compared to the case of using three compressors, the structure and control can be simplified.

[Other Embodiments]

The present invention may be structured as follows with respect to the above-described embodiments.

For example, a first channel for air-conditioning is configured so as to be capable of performing air-cooling/heating in the embodiments. However, the first channel may be configured so as to be capable of performing only air-cooling or air-heating.

Although the first compressor (2A) is an inverter compressor and the second compressor (2B) is a non-inverter compressor in the embodiments, this combination may be inversed or both compressors may be inverter compressors or non-inverter compressors.

In the embodiments, the operation mode that only one of three operation patterns is possible, the operation mode that two of the three operation patterns are possible and the operation mode that all three operation patterns are possible are set. However, it is not limited to the patterns in the embodiments which operation pattern can be set in which operation mode. This may be appropriately determined depending on specific structures of apparatuses.

INDUSTRIAL APPLICABILITY

As described above, the present invention is useful for a refrigerating apparatus.

The invention claimed is:

1. A refrigerating apparatus in which expansion mechanisms (46, 52) and application-side heat exchangers (45, 51) in a first channel and an expansion mechanism (42) and an application-side heat exchanger (41) in a second channel are connected in parallel to a compression mechanism (2) and a heat-source side heat exchanger (4), the compression mechanism (2) is configured by a first compressor (2A) and a second compressor (2B) and a plurality of operation modes can be set,
   wherein the compression mechanism (2) is configured so as to be capable of being switched between at least two operation patterns, in a predetermined operation mode, among a first pattern of driving the first compressor (2A) and the second compressor (2B), a second pattern of driving only the first compressor (2A) and a third pattern of driving only the second compressor (2B).

2. A refrigerating apparatus in which expansion mechanisms (46, 52) and application-side heat exchangers (45, 51) in a first channel and an expansion mechanism (42) and an application-side heat exchanger (41) in a second channel are connected in parallel to a compression mechanism (2) and a heat-source side heat exchanger (4), the compression mechanism (2) is configured by a first compressor (2A) and a second compressor (2B) and a plurality of operation modes can be set,
   wherein the compression mechanism (2) is configured so as to be capable of being switched between a first pattern of driving both the first compressor (2A) and the second compressor (2B), a second pattern of driving only the first compressor (2A) and a third pattern of driving only the second compressor (2B) in a predetermined operation mode.

3. A refrigerating apparatus that expansion mechanisms (46, 52) and application-side heat exchangers (45, 51) in a first channel and an expansion mechanism (42) and an application-side heat exchanger (41) in a second channel are connected in parallel to a compression mechanism (2) and a heat-source side heat exchanger (4), and the compression mechanism (2) is configured by a first compressor (2A) and a second compressor (2B),
   wherein discharge pipes (5a, 5b) of the compressors (2A, 2B) are connected in parallel to a high-pressure gas pipe (8), and the high-pressure gas pipe (8) is connected via directional selector valves (3A, 3B) to high-pressure gas lines (9, 17) in the first and channels,
   a four-way selector valve (3C) which is configured so as to be capable of being switched between a first state in which a first port (P1) communicates with a fourth port (P4) and a second port (P2) communicates with a third port (P3) and a second state in which the first port (P1) communicates with the second port (P2) and the third port (P3) communicates with the fourth port (P4) is provided on the suction side of the compression mechanism (2),
   a low-pressure gas line (15) in the first channel connected to a suction pipe (6a) for the first compressor (2A) is connected to the first port (P1) for the four-way selector valve (3C),
   a suction pipe (6b) for the second compressor (2B) is connected to the second port (P2),
   low-pressure gas lines (17, 9) in the second channel are connected via the directional selector valves (3A, 3B) to the third port (P3), and
   a high-pressure side pipe (28a) for a refrigerant circuit (1E) is connected to the fourth port (P4).

4. A refrigerating apparatus that expansion mechanisms (46, 52) and application-side heat exchangers (45, 51) in a first channel and an expansion mechanism (42) and an application-side heat exchanger (41) in a second channel are connected in parallel to a compression mechanism (2) and a heat-source side heat exchanger (4), and the compression mechanism (2) is configured by a first compressor (2A) and a second compressor (2B),
   wherein discharge pipes (5a, 5b) for the compressors (2A, 2B) are connected in parallel to a high-pressure gas pipe (8), and the high-pressure gas pipe (8) is connected via directional selector valves (3A, 3B) to high-pressure gas lines (9, 17) in the first and second channels,
   a suction pipe (6a) for the first compressor (2A) is connected to a low-pressure gas line (15) in the first channel, a suction pipe (6b) for the second compressor (2B) is connected via the directional selector valves (3A, 3B) to low-pressure gas lines (17, 9) in the second channel, the suction pipes (6a, 6b) for the compressors (2A, 2B) are connected with each other by a first communication pipe (22a) and a second communication pipe (22b) provided in parallel, the first communication pipe (22a) is provided with a check valve (7) for allowing only a refrigerant flow from the first compressor (2A) side toward the second compressor (2B) side, and the second communication pipe (22b) is provided with a check valve (7) for allowing only a refrigerant flow from the second compressor (2B) side toward the first compressor (2A) side and an open/close valve (23) for opening/closing the second communication pipe (22b).

5. The refrigerating apparatus of claim 3 or 4, wherein the application-side heat exchangers (45, 51) in the first channel are configured by cooling heat exchangers used for cold-storage/freezing, and the application-side heat exchanger (41) in the second channel is configured by an air-conditioning heat exchanger used for air-conditioning.

6. The refrigerating apparatus of claim 3 or 4 comprising the first four-way selector valve (3A) and the second four-way selector valve (3B) as the directional selector valves (3A, 3B), wherein the discharge pipes (5a, 5b) for the first compressor (2A) and the second compressor (2B) are joined and the joined pipe is connected via the first four-way selector valve (3A) to the heat-source side heat exchanger (4) and the application-side heat exchanger (41) in the second channel so as to be switchable therebetween, and the suction pipes (6a, 6b) for the compression mechanism (2) are connected via the first four-way selector valve (3A) and the second four-way selector valve (3B) to the application-side heat exchanger (41) in the second channel and the heat-source side heat exchanger (4) so as to be switchable therebetween.

* * * * *

UNITED STATES PATENT AND TRADEMARK OFFICE
CERTIFICATE OF CORRECTION

| | |
|---|---|
| PATENT NO. | : 7,028,502 B2 |
| APPLICATION NO. | : 10/489322 |
| DATED | : April 18, 2006 |
| INVENTOR(S) | : Masaaki Takegami et al. |

Page 1 of 1

It is certified that error appears in the above-identified patent and that said Letters Patent is hereby corrected as shown below:

In item (54), on the cover of the patent, the title of the Invention "REFRIGERATION EQUIPMENT" should read --REFRIGERATION APPARATUS--.

In column 1 of the patent, directly above the Subtitle "Technical Field", "REFRIGERATION EQUIPMENT' should read --REFRIGERATION APPARATUS--.

Signed and Sealed this

Sixteenth Day of March, 2010

David J. Kappos
*Director of the United States Patent and Trademark Office*